United States Patent
Sun

(10) Patent No.: US 11,232,057 B2
(45) Date of Patent: Jan. 25, 2022

(54) TERMINAL DEVICE AND CONTROL METHOD THEREOF

(71) Applicant: Hisense Visual Technology Co., Ltd., Qingdao (CN)

(72) Inventor: Xuebin Sun, Qingdao (CN)

(73) Assignee: Hisense Visual Technology Co., Ltd., Qingdao (CN)

( * ) Notice: Subject to any disclaimer, the term of this patent is extended or adjusted under 35 U.S.C. 154(b) by 0 days.

(21) Appl. No.: 16/747,296

(22) Filed: Jan. 20, 2020

(65) Prior Publication Data

US 2020/0226087 A1 Jul. 16, 2020

Related U.S. Application Data

(63) Continuation of application No. PCT/CN2018/096527, filed on Jul. 20, 2018.

(30) Foreign Application Priority Data

Jul. 20, 2017 (CN) .......................... 201710598183.5
Jan. 26, 2018 (CN) .......................... 201810076150.9
(Continued)

(51) Int. Cl.
*G06F 13/36* (2006.01)
*G06F 13/40* (2006.01)
(Continued)

(52) U.S. Cl.
CPC ...... *G06F 13/4022* (2013.01); *G06F 13/4282* (2013.01); *H04N 21/43635* (2013.01); *G06F 2213/0042* (2013.01)

(58) Field of Classification Search
CPC .. G06F 13/00; G06F 13/4022; G06F 13/4282; G06F 2213/0042; H04N 21/43635
See application file for complete search history.

(56) References Cited

U.S. PATENT DOCUMENTS

2012/0144076 A1 6/2012 Yang et al.
2016/0110305 A1* 4/2016 Hundal et al. ...... G06F 13/4022
(Continued)

FOREIGN PATENT DOCUMENTS

CN 201919041 U 8/2011
CN 102687520 A 9/2012
(Continued)

OTHER PUBLICATIONS

Office Action from Chinese Application No. 201810076150.9 dated Jun. 1, 2020 (8 pages).
(Continued)

*Primary Examiner* — Tim T Vo
*Assistant Examiner* — Kim T Huynh
(74) *Attorney, Agent, or Firm* — Harness, Dickey & Pierce, P.L.C.

(57) ABSTRACT

The present application is directed to a television device and a control method therefor. The television device comprises an SOC chip, a DFP interface thereof being connected to a switch module via a USB D+/D− differential pair, and the USB D+/D− differential pair between the DFP interface and the switch module being a first channel; a USB Type-C interface main control module provided with a UFP interface, the UFP interface being connected to the switch module via a USB D+/D− differential pair, and the USB D+/D− differential pair between the UFP interface and the switch module being a second channel; and a USB Type-C interface connected to the switch module via a USB D+/D− differential pair. The USB Type-C interface main control module is also connected to the switch module via a control signal line.

12 Claims, 21 Drawing Sheets

(30) Foreign Application Priority Data

| Jan. 26, 2018 | (CN) | .......................... 201810076750.5 |
| Jan. 26, 2018 | (CN) | .......................... 201810077730.X |
| Jan. 26, 2018 | (CN) | .......................... 201810077737.1 |
| Jan. 26, 2018 | (CN) | .......................... 201810078504.3 |
| Jan. 26, 2018 | (CN) | .......................... 201810078871.3 |
| Jan. 26, 2018 | (CN) | .......................... 201810079012.6 |

(51) Int. Cl.
*G06F 13/42* (2006.01)
*H04N 21/4363* (2011.01)

(56) References Cited

U.S. PATENT DOCUMENTS

| 2016/0147704 | A1 | 5/2016 | Guillerm et al. |
| 2017/0109312 | A1 | 4/2017 | Voor et al. |
| 2017/0154743 | A1 | 6/2017 | Ando |
| 2017/0192924 | A1* | 7/2017 | Chiba ................. G06F 13/4282 |
| 2019/0073329 | A1* | 3/2019 | Tao ..................... G06F 13/1673 |

FOREIGN PATENT DOCUMENTS

| CN | 102761624 | A | 10/2012 |
| CN | 103888829 | A | 6/2014 |
| CN | 105138365 | A | 12/2015 |
| CN | 205017486 | U | 2/2016 |
| CN | 105491421 | A | 4/2016 |
| CN | 205139907 | U | 4/2016 |
| CN | 205265858 | U | 5/2016 |
| CN | 105630726 | A | 6/2016 |
| CN | 105703185 | A | 6/2016 |
| CN | 105824383 | A | 8/2016 |
| CN | 105867593 | A | 8/2016 |
| CN | 105867874 | A | 8/2016 |
| CN | 105915898 | A | 8/2016 |
| CN | 106021150 | A | 10/2016 |
| CN | 106060633 | A | 10/2016 |
| CN | 205644533 | U | 10/2016 |
| CN | 205680089 | U | 11/2016 |
| CN | 106201951 | A | 12/2016 |
| CN | 205844970 | U | 12/2016 |
| CN | 106292973 | A | 1/2017 |
| CN | 106445858 | A | 2/2017 |
| CN | 106796564 | A | 5/2017 |
| CN | 106815160 | A | 6/2017 |
| CN | 106844252 | A | 6/2017 |
| CN | 107277416 | A | 10/2017 |
| CN | 108235129 | A | 6/2018 |
| CN | 108259803 | A | 7/2018 |
| WO | WO-2014035123 | A1 | 3/2014 |

OTHER PUBLICATIONS

Office Action from Chinese Application No. 201810078871.3 dated Jun. 10, 2020 (9 pages).

Texas Instruments, TPS65981, USB Type-C and USB PD Controller, Power Switch, and High Speed Multiplexer, Aug. 2016, 100 pages.

Office Action from Chinese Application No. 201810076750.5 dated Oct. 28, 2019 (7 pages).

Office Action from Chinese Application No. 201810077730.X dated Jan. 2, 2020 (5 pages).

Office Action from Chinese Application No. 201810077737.1 dated Dec. 11, 2019 (7 pages).

Office Action from Chinese Application No. 201810078504.3 dated Dec. 4, 2019 (12 pages).

HDMI Over USB Type-C, Legendary USB Implementers Forum, Oct. 19, 2016, pp. 1-36, http://www.legendary.net.cn/html/downloads/HDMI_Alt_Mode_USB_Type-c.pdf.

Extended European Search Report for European Application No. 18835936.8 dated Mar. 15, 2021 (10 pages).

\* cited by examiner

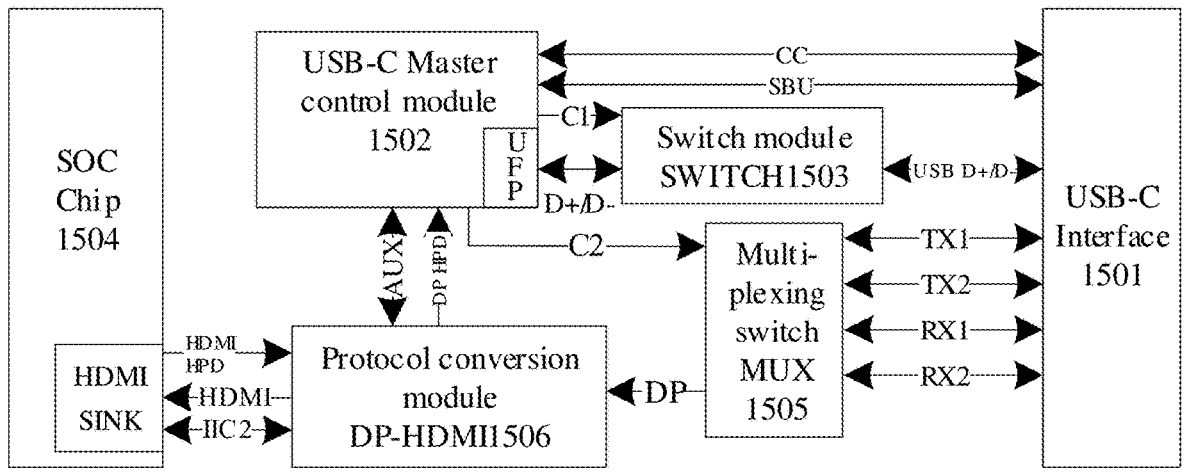

Fig. 18

| Interacting a CC signal between a USB-C master control module and a USB-C interface to recognize a type of an external device of the USB-C interface | 1901 |

| Controlling, by the USB-C master control module, the state of a switch module SWITCH according to the type to control the data interaction between the external device of the USB-C interface and an SOC chip in the television terminal | 1902 |

Fig. 19

FUNCTION TABLE

| SEL1 | SEL0 | SWITCH STATUS |
|------|------|---------------|
| Low  | Low  | D+/D- to USB1+/USB1- |
| Low  | High | D+/D- to USB2+/USB2- |
| High | Low  | D+/D- to MHL+/MHL- |
| High | High | USB and MHL switches in High-Z | ns are incorporated herein by reference.

TERMINAL DEVICE AND CONTROL METHOD THEREOF

CROSS-REFERENCE TO RELATED APPLICATIONS

This application is a continuation of International Application No. PCT/CN2018/096527 filed Jul. 20, 2018, which claims the benefit and priority of Chinese Patent Application No. 201710598183.5 filed Jul. 20, 2017, Chinese Patent Application No. 201810077730.X filed Jan. 26, 2018, Chinese Patent Application No. 201810077737.1 filed Jan. 26, 2018, Chinese Patent Application No. 201810079012.6 filed Jan. 26, 2018, Chinese Patent Application No. 201810078504.3 filed Jan. 26, 2018, Chinese Patent Application No. 201810076750.5 filed Jan. 26, 2018, Chinese Patent Application No. 201810078871.3 filed Jan. 26, 2018, and Chinese Patent Application No. 201810076150.9 filed Jan. 26, 2018. The entire disclosures of the above applications are incorporated herein by reference.

FIELD

The present disclosure relates to the field of communication technology and in particular relate to a television device and a control method thereof.

BACKGROUND

This section provides background information related to the present disclosure which is not necessarily prior art.

A USB-Type-C interface is for transmitting a USB2.0 signal, a USB3.0 signal and a non-USB signal and is generally applied to a mobile phone terminal or a computer. Generally, the USB-Type-C interface is connected to a mobile phone, the computer or a PAD to perform high-speed data transmission. The USB-Type-C interface in related art may also be applied to a display screen (Monitor) device, but is rarely applied to a television device.

The main reason of limiting the application of the USB-Type-C interface to the television device is that there is a problem that the compatibility between a billboard signal transmission function and a USB2.0 signal transmission function cannot be met when the USB-Type-C interface is applied to the television device.

When a USB2.0 signal is interacted between the television device and an external device of the USB-Type-C interface, the television device may be used as a host of the external device of the USB-Type-C interface, and the external device of the USB-Type-C interface may be used as a peripheral of the television device. When a billboard signal is interacted between the television device and the external device of the USB-Type-C interface, the television device may be used as a peripheral of the external device of the USB-Type-C interface, and the external device of the USB-Type-C interface may be used as a host of the television device. However, the number of USB D+/D− differential terminals of the USB-Type-C interface is fixed, and therefore, the two application demands cannot be simultaneously met.

Based on the above, due to the incompatibility between the billboard signal transmission function and the USB2.0 signal transmission function when the USB-Type-C interface is applied to the television device, the USB-Type-C interface may not be used as a multifunctional interface to be applied to the television device.

SUMMARY

This section provides a general summary of the disclosure, and is not a comprehensive disclosure of its full scope or all of its features.

Embodiments of the present disclosure provide a television device and a control method thereof, and the television device may be a television device, so that a USB Type-C interface may be applied to the television device, and the compatibility between a billboard signal transmission function and a USB2.0 signal transmission function may be realized.

According to a first aspect, a television device is provided, which includes:

an SOC chip provided with a DFP interface, the DFP interface being connected to a switch module via a USB D+/D− differential pair, and the USB D+/D− differential pair between the DFP interface and the switch module being a first channel;

a USB Type-C interface master control module provided with a UFP interface, the UFP interface being connected to the switch module via a USB D+/D− differential pair, and the USB D+/D− differential pair between the UFP interface and the switch module being a second channel; and the USB Type-C interface connected to the switch module via a USB D+/D− differential pair;

where the USB Type-C interface master control module is connected to the switch module via a control signal line to control the switch module to turn on the first channel and turn off the second channel or turn on the second channel and turn off the first channel.

In some embodiments, the USB Type-C interface master control module is connected to the USB Type-C interface via a control signal line to interact a CC signal with the USB Type-C interface to identify a type of an external device of the USB-Type-C interface and control the switch module to turn on the first channel and turn off the second channel or turn on the second channel and turn off the first channel according to the identified type.

In some embodiments, when the USB Type-C interface master control module is configured to control the switch module to turn on the first channel and turn off the second channel when identifying that the external device of the USB Type-C interface is a USB device and control the switch module to turn on the second channel and turn off the first channel when identifying that the external device of the USB Type-C interface is an ALT MODE device.

In some embodiments, the television device further includes a multiplexing switch; the multiplexing switch is connected to the USB Type-C interface via a USB SSTX/RX differential pair and is connected to the DFP interface via a USB SSTX/RX differential pair, and the USB SSTX/RX differential pair between the multiplexing switch and the DFP interface is a third channel;

the SOC chip further includes an HDMI interface for receiving or transmitting an HDMI signal;

the multiplexing switch is connected to the HDMI interface via an HDMI signal channel, and the HDMI signal channel between the multiplex switch and the HDMI interface is a fourth channel; and the USB Type-C interface master control module is connected to the multiplexing switch via a control signal line to control the multiplexing switch to turn on the third channel and turn off the fourth channel when identifying that the external device of the USB Type-C interface is the USB device, or control the multiplexing switch to turn on the fourth channel and turn off the third channel when identifying that the external device of the USB Type-C interface is the ALT MODE device.

In some embodiments, the television device further includes a protocol conversion module between the multiplexing switch and the HDMI interface. The protocol conversion module is configured to convert a DP signal into the HDMI signal when the DP signal is transmitted by the ALT MODE device, so that the HDMI signal is transmitted to the HDMI interface of the SOC chip.

In some embodiments, the DFP interface includes a USB2.0 interface and a USB3.0 interface; and when the external device of the USB Type-C interface is the USB device, a USB2.0 signal is interacted between the DFP interface and the external device of the USB Type-C interface via the first channel; or a USB3.0 signal is interacted between the DFP interface and the external device of the USB Type-C interface via the third channel.

In some embodiments, when the external device is a USB DFP device, the USB Type-C interface is adapted to be in a USB UFP mode; and when the external device supports a DP DFP mode, the USB Type-C interface is switched to be in a DP DFP mode to perform DP signal transmission.

In some embodiments, when the external device is a USB UFP device, the USB Type-C interface is adapted to be in a USB DFP mode.

In some embodiments, the UFP interface is a billboard signal output interface for outputting a billboard signal; and when the external device of the USB Type-C interface is the ALT MODE device, the billboard signal output interface may transmit the billboard signal to the ALT MODE device externally connected to the USB Type-C interface via the second channel.

In some embodiments, the switch module is default to turn on the first channel.

In some embodiments, the billboard signal includes transmission mode information supported by the television device; and the USB Type-C interface master control module is configured to: control the switch module to be switched to the second channel when detecting that a computer is plugged into the USB Type-C interface and to control the switch module to be switched to the first channel after the computer acquires the transmission mode information.

According to a second aspect, some embodiments of the present disclosure provide a control method of a television device, including: transmitting, by a USB Type-C interface master control module, a first control signal or a second control signal to a switch module, where the first control signal is configured to control the switch module to turn on a first channel and turn off a second channel, and the second control signal is configured to control the switch module to turn on the second channel and turn off the first channel.

In some embodiments, before the USB Type-C interface master control module transmits the first control signal, the control method further includes: interacting a CC signal between the USB Type-C interface master control module and a USB Type-C interface; and identifying a type of an external device of the USB Type-C interface according to the CC signal.

In some embodiments, transmitting, by the USB Type-C interface master control module, the first control signal or the second control signal to the switch module, includes: transmitting the first control signal to the switch module when identifying that the external device of the USB Type-C interface is a USB device; and transmitting the second control signal to the switch module when identifying that the external device of the USB Type-C interface is an ALT MODE device.

In some embodiments, the method further includes: transmitting a third control signal to a multiplexing switch when identifying that the external device of the USB Type-C interface is the USB device, where the third control signal is configured to control the multiplexing switch to turn on a third channel and turn off a fourth channel; and transmitting a fourth control signal to the multiplexing switch when identifying that the external device of the USB Type-C interface is the ALT MODE device, where the fourth control signal is configured to control the multiplexing switch to turn on the fourth channel and turn off the third channel.

According to a third aspect, some embodiments of the present disclosure provide a television device including:

an SOC chip provided with USB D+/D− differential terminals for inputting or outputting a USB D+/D− signal and electrically connected to USB D+/D− differential terminals provided by a switch module to form a selectable first channel;

a C interface master control module provided with USB D+/D− differential terminals for inputting the USB D+/D− signal or outputting a billboard signal and electrically connected to the USB D+/D− differential terminals provided by the switch module to form a selectable second channel; and a USB Type-C interface provided with USB D+/D− differential terminals for inputting or outputting the USB D+/D− signal and electrically connected to the USB D+/D− differential terminals provided by the switch module;

where the C interface master control module is further provided with a control signal output pin for outputting a first control signal or a second control signal and electrically connected to a control signal input pin of the switch module; and the first control signal is configured to turn on the first channel and turn off the second channel, and the second control signal is configured to turn on the second channel and turn off the first channel.

In some embodiments, the C interface master control module is provided with a CC pin, the CC pin is electrically connected to a CC pin in the USB Type-C interface and is for inputting or outputting a CC signal so as to identify a type of an external device of a C interface.

In some embodiments, the C interface master control module is configured to input the first control signal to the control signal input pin of the switch module when identifying that an external device of the USB Type-C interface is a USB device and to input the second control signal to the control signal input pin of the switch module when identifying that the external device of the USB Type-C interface is an ALT MODE device.

In some embodiments, the television device further includes a multiplexing switch; the SOC chip is further provided with USB SSTX/RX differential terminals for inputting or outputting a USB3.0 signal and electrically connected to USB SSTX/RX differential terminals of the multiplexing switch to form a third channel; the USB Type-C interface is further provided with USB SSTX/RX differential terminals for inputting or outputting the USB3.0 signal and electrically connected to the USB SSTX/RX differential terminals of the multiplexing switch; and the C interface master control module is further provided with a control signal output pin configured to output a third control signal and electrically connected to a control signal input pin of the multiplexing switch; and the third control signal is configured to turn on the third channel and turn off a fourth channel.

In some embodiments, the SOC chip is further provided with an HDMI differential terminal for receiving or transmitting an HDMI signal. The HDMI differential terminal is electrically connected to an HDMI differential terminal of the multiplexing switch to form the selectable fourth channel; and the C interface master control module is further provided with a control signal output pin configured to output a fourth control signal and electrically connected to the other control signal input pin of the multiplexing switch; and the fourth control signal is configured to turn on the fourth channel and turn off the third channel.

In some embodiments, the television device further includes a protocol conversion module, where the protocol conversion module is configured to convert a DP signal into an HDMI signal when the DP signal is transmitted by the ALT MODE device, so that the HDMI signal is transmitted to an HDMI interface of the SOC chip; and the HDMI differential terminal of the SOC chip is electrically connected to an HDMI differential terminal of the protocol conversion module, and DP differential terminals of the protocol conversion module is electrically connected to DP differential terminals of the multiplexing switch. The DP differential terminals are configured for inputting or outputting the DP signal.

In some embodiments, the C interface master control module is further configured to input the third control signal to the control signal input pin of the multiplexing switch when identifying that the external device of the USB Type-C interface is the USB device and input the fourth control signal to the control signal input pin of the multiplexing switch when identifying that the external device of the USB Type-C interface is the ALT MODE device.

According to a fourth aspect, some embodiments of the present disclosure provide a television device with a USB Type-C interface, including the USB Type-C interface, a controller, a selective switch unit and an SoC chip; where the USB Type-C interface is provided with a CC pin and a USB D+/D− signal pin, and the USB Type-C interface is configured to be connected to an external device; the controller is electrically connected to the CC pin and is configured to determine a working mode of the external device according to a CC signal in the CC pin; and the controller is further connected to the selective switch unit and is configured to select the USB D+/D− signal pin to be connected to an interface for transmitting a USB D+/D− signal in the SoC chip or select the USB D+/D− signal pin to be connected to an interface for transmitting billboard information in the controller according to the working mode of the external device.

In some embodiments, the controller is configured to select the USB D+/D− signal pin to be connected to the interface for transmitting the USB D+/D− signal in the SoC chip when determining that the working mode of the external device is a USB mode so as to transmit the USB D+/D− signal to the SoC chip; and the controller is configured to transmit a second control signal to the selective switch unit when determining that the working mode of the external device is an Alt Mode, so that the selective switch unit selects the USB D+/D− signal pin to work to connect to the interface for transmitting the billboard information in the controller according to the second control signal and furthermore, the external device performs operation indicated by the billboard information.

In some embodiments, the television device further includes a multiplexing switch unit; the USB Type-C interface further includes TX1/RX1 and TX2/RX2 pins; the multiplexing switch unit is electrically connected to the TX1/RX1 and TX2/RX2 pins; the multiplexing switch unit is configured to be connected to the SoC chip to transmit a USB SSTX/SS RX signal or an audio/video signal to the SoC chip; and the controller is connected to the multiplexing switch unit and is configured to select the TX1/RX1 and TX2/RX2 pins to be connected to an interface for transmitting the USB SSTX/SS RX signal in the SoC chip or select the TX1/RX1 and TX2/RX2 pins to be connected to an interface for transmitting the audio/video signal in the SoC chip according to the working mode of the external device.

In some embodiments, the controller is configured to transmit a third control signal to the multiplexing switch unit when determining that the working mode of the external device is the USB mode, so that the multiplexing switch unit selects the TX1/RX1 and TX2/RX2 pins to be connected to the interface for transmitting the USB SSTX/SS RX signal in the SoC chip, and furthermore, the USB SSTX/SS RX signal is transmitted to the SoC chip; and the controller is configured to transmit a fourth control signal to the multiplexing switch unit when determining that the working mode of the external device is the Alt Mode, so that the multiplexing switch unit selects the TX1/RX1 and TX2/RX2 pins to be connected to the interface for transmitting the audio/video signal in the SoC chip, and furthermore, the audio/video signal is transmitted to the SoC chip.

In some embodiments, the interface for transmitting the audio/video signal in the SoC chip is an HDMI interface.

In some embodiments, the television device further includes a format conversion unit; where the input end of the format conversion unit is connected to the selective switch unit and is configured to perform format conversion on the audio/video signal transmitted by the selective switch unit to obtain a format-converted audio/video signal; and the output end of the format conversion unit is configured to be connected to the interface for transmitting the audio/video signal in the SoC chip to transmit the format-converted audio/video signal to the SoC chip.

In some embodiments, the working mode of the external device includes any one of USB2.0, USB3.0, USB3.1 and USB PD.

In some embodiments, the controller is further configured to set the CC signal on the CC pin as a power delivery instruction when determining that the working mode of the external device is the USB PD to make the television device deliver power to the external device.

According to a fifth aspect, some embodiments of the present disclosure provide a data communication method applied to a television device with a USB Type-C interface. The television device includes the USB Type-C interface, a controller, a selective switch unit and an SoC chip, where the USB Type-C interface is configured to be connected to an external device, the controller is respectively connected to the USB Type-C interface and the selective switch unit, and the selective switch unit is further connected to the SoC chip; and the method includes:

determining a working mode of the external device;

transmitting a USB D+/D− signal in the external device to the SoC chip according to the working mode of the external device; or transmitting billboard information to the external device according to the working mode of the external device to make the external device perform the operation indicated by the billboard information.

In some embodiments, transmitting the USB D+/D− signal in the external device to the SoC chip according to the working mode of the external device includes: transmitting the USB D+/D− signal in the external device to the SoC chip when determining that the working mode of the external device is a USB mode; and transmitting the billboard information to the external device according to the working mode of the external device to make the external device perform the operation indicated by the billboard information includes: transmitting the billboard information to the external device when determining that the working mode of the external device is an Alt Mode to make the external device perform the operation indicated by the billboard information.

In some embodiments, the television device further includes a multiplexing switch unit, where the multiplexing switch unit is respectively connected to the USB Type-C interface, the controller and the SoC chip; and the method further includes: transmitting a USB SSTX/SS RX signal in the external device to the SoC chip according to the working mode of the external device; or transmitting an audio/video signal in the external device to the SoC chip according to the working mode of the external device.

In some embodiments, transmitting the USB SSTX/SS RX signal in the external device to the SoC chip according to the working mode of the external device includes: transmitting the USB SSTX/SS RX signal in the external device to the SoC chip when determining that the working mode of the external device is a USB mode; and transmitting the audio/video signal in the external device to the SoC chip according to the working mode of the external device includes: transmitting the audio/video signal in the external device to the SoC chip when determining that the working mode of the external device is an Alt Mode.

In some embodiments, the television device further includes a format conversion unit, where the format conversion unit is respectively connected to the selective switch unit and the SoC chip; and before the audio/video signal in the external device is transmitted to the SoC chip, the method further includes: performing format conversion on an audio/video signal transmitted by the selective switch unit to obtain a format-converted audio/video signal.

According to a sixth aspect, some embodiments of the present disclosure provide a control method for a USB-C interface of a television to be connected to an external device, including the following steps:

monitoring that the external device is plugged into the USB-C interface of the television;

if the external device is a USB disk, connecting a low-speed differential pair pin of the USB-C interface to a master chip of the television; and if the external device is a computer, connecting the low-speed differential pair pin of the USB-C interface to a module of the television containing Billboard information.

In some embodiments, the low-speed differential pair pin of the USB-C interface is connected to a first terminal of one SWICH switch, second and third terminals of the SWICH switch are respectively connected to the master chip and the module containing Billboard information, and the SWICH switch may be controlled to connect the first terminal and the second terminal or connect the first terminal and the third terminal.

According to a seventh aspect, some embodiments of the present disclosure provide a television adopting the control method as shown in the sixth aspect.

According to an eighth aspect, the embodiment of the present invention provides a television including a master chip;

the master chip is connected to an SWICH switch;

the SWICH switch is respectively connected to a CC+PD chip and a module containing Billboard information;

the television further includes a USB-C interface for connecting with an external device; and the USB-C interface is respectively connected to the CC+PD chip and the SWICH switch.

In some embodiments, the module containing the Billboard information is integrated in the CC+PD chip.

In some embodiments, the module containing the Billboard information is an independent hardware module.

In some embodiments, the SWICH switch is connected to the CC+PD chip via a control signal line and a data signal line; the data signal line is configured to transmit the Billboard information in a Billboard module built in the CC+PD chip to a USB-C interface via the SWICH switch; and the control signal line is configured to transmit an instruction indicating the SWICH switch to be connected to the master chip or to be connected to the CC+PD chip via the data signal line.

According to a ninth aspect, some embodiments of the present disclosure provide a control method for a USB-C interface of a television to be connected to an external device, including the following steps:

when a CC+PD chip of the television does not detect an external device plugged into the USB-C interface of the television, controlling an SWICH switch to connect a low-speed differential pair pin of the USB-C interface to an SOC chip master chip of the television;

when the CC+PD chip of the television detects that a USB disk is plugged into the USB-C interface of the television, not controlling the action of the SWICH switch; and when the CC+PD chip of the television detects that a computer is plugged into the USB-C interface of the television, controlling the low-speed differential pair pin of the USB-C interface of the television to be connected to a module containing Billboard information of the television, and after Billboard information is transmitted to the computer, controlling, by the CC+PD chip, the action of the SWICH switch to connect the low-speed differential pair pin of the USB-C interface of the television to a path connected to the SOC chip master chip of the television.

According to a tenth aspect, some embodiments of the present disclosure provide a television adopting the control method as shown in the ninth aspect.

According to an eleventh aspect, some embodiments of the present disclosure provide an electronic television device for receiving data from an external device via a USB TYPE-C interface, including:

the USB TYPE-C interface provided with a USB D+/D− signal pin;

an SOC chip provided with a pin for inputting a USB D+/D− signal;

a control chip electrically connected to a CC pin in the USB TYPE-C interface and provided with a pin for inputting the USB D+/D− signal; and a selective switch device, where a control pin of the selective switch device is electrically connected to a control signal output pin in the control chip; an input pin of the selective switch device is electrically connected to the USB D+/D− signal pin in the USB TYPE-C interface; in any two selectable output pins, one is electrically connected to the pin for inputting the USB D+/D− signal in the SOC chip; and the other one is electrically connected to the pin for connecting the USB D+/D− signal in the control chip.

In some embodiments, the electronic television device further includes: the SOC chip including a pin for inputting a USB SSTX/RX signal and a pin for inputting an HDMI format signal; and a multiplexing switch chip provided with two high-speed differential pair signal input pins connected to USB TX1/2 and RX1/2 of the USB TYPE-C interface; where a control pin of the multiplexing switch chip is electrically connected to the other control signal output pin in the control chip, in two selectable output pins in the multiplexing switch chip, one is electrically connected to the pin for inputting the USB SSTX/RX signal in the SOC chip; and the other is electrically connected to the pin for inputting the HDMI format signal in the SOC chip.

In some embodiments, the electronic television device further includes that: a connecting terminal in the control chip electrically connected to the USB D+/D− signal pin, so that the control chip can transmit billboard information to the external device.

According to a twelfth aspect, some embodiments of the present disclosure provide an electronic television device for receiving data from an external device via a USB TYPE-C interface, including: a control chip configured to control electrical connection between a D+/D− signal input pin in the USB TYPE-C interface and an SOC chip and electrical connection between a D+/D− input terminal in the USB TYPE-C interface and the control chip for interacting billboard information according to a identified type of a device connected to the USB TYPE-C interface, and only one of the two electrical connection is only conducted at the same moment.

In some embodiments, the SOC chip is provided with a pin for inputting a USB D+/D− signal; the control chip is electrically connected to a CC pin in the USB TYPE-C interface and provided with a pin for inputting the USB D+/D− signal; and a selective switch device is provided, where a control pin of the selective switch device is electrically connected to a control signal output pin in the control chip; an input pin of the selective switch device is electrically connected to the USB D+/D− signal pin in the USB TYPE-C interface; in any two selectable output pins, one is electrically connected to the pin for inputting the USB D+/D− signal in the SOC chip; and the other one is electrically connected to the pin for inputting the USB D+/D− signal in the control chip.

In some embodiments, the SOC chip includes a pin for inputting a USB SSTX/RX signal and a pin for inputting an HDMI format signal; a multiplexing switch chip is provided with two high-speed differential pair signal input pins connected to the USB TX1/2 and RX1/2 of the USB TYPE-C interface; where a control pin of the multiplexing switch chip is electrically connected to the other control signal output pin in the control chip, in any two selectable output pins in the multiplexing switch chip, a selectable output pin is electrically connected to the pin for inputting the USB SSTX/RX signal in the SOC chip; and the other selectable output pin is electrically connected to the pin for inputting the HDMI format signal in the SOC chip.

According to a thirteenth aspect, some embodiments of the present disclosure provide an electronic television device for receiving data from an external device via a USB TYPE-C interface, including:

the USB TYPE-C interface provided with a USB D+/D− signal pin;

an SOC chip provided with a pin for inputting a USB D+/D− signal;

a CC module electrically connected to a CC pin in the USB TYPE-C interface;

a PD module provided with a pin for inputting the USB D+/D− signal; and a selective switch device, where a control pin of the selective switch device is electrically connected to a control signal output pin in the CC module; an input pin of the selective switch device is electrically connected to the USB D+/D− signal pin in the USB TYPE-C interface; in two gateable output pins, one gateable output pin is electrically connected to the pin for inputting the USB D+/D− signal in the SOC chip; and the other gateable output pin is electrically connected to the pin for connecting the USB D+/D− signal in the PD module.

In some embodiments, the SOC chip includes a pin for inputting a USB SSTX/RX signal and a pin for inputting an HDMI format signal; a multiplexing switch chip is provided with two high-speed differential pair signal input pins connected to the USB TX1/2 and RX1/2 of the USB TYPE-C interface; where a control pin of the multiplexing switch chip is electrically connected to the other control signal output pin in the CC module, in two gateable output pins in the multiplexing switch chip, one gateable output pin is electrically connected to the pin for inputting the USB SSTX/RX signal in the SOC chip; and the other gateable output pin is electrically connected to the pin for inputting the HDMI format signal in the SOC chip.

In some embodiments, the PD module is provided with a billboard function, a connecting terminal of the PD module is electrically connected to the USB D+/D− signal pin to allow the PD module feed billboard information back to the external device.

According to a fourteenth aspect, some embodiments of the present disclosure provide an electronic television device for receiving data from an external device via a USB TYPE-C interface, including:

the USB TYPE-C interface provided with a USB D+/D− signal pin;

an SOC chip provided with a pin for inputting a USB D+/D− signal; and a control chip configured to detect a type of a device connected to the USB TYPE-C interface, when the USB TYPE-C interface is detected to be connected to a USB protocol type device, the connection between the USB D+/D− signal pin in the USB TYPE-C interface and the pin for inputting the USB D+/D− signal in the SOC chip is selected to be conducted; and when the USB TYPE-C interface is connected to an ALT MODE protocol type device, the connection between the USB D+/D− signal pin in the USB TYPE-C interface and a signal pin for interacting billboard information in the control chip is selected to be conducted.

In some embodiments, the SOC chip includes a pin for inputting a USB SSTX/RX signal and a pin for inputting an HDMI format signal; a multiplexing switch chip is provided with two high-speed differential pair signal input pins connected to the USB TX1/2 and RX1/2 of the USB TYPE-C interface; where a control pin of the multiplexing switch chip is electrically connected to the other control signal output pin in the control chip, in two gateable output pins in the multiplexing switch chip, one gateable output pin is electrically connected to the pin for inputting the USB SSTX/RX signal in the SOC chip; and the other gateable output pin is electrically connected to the pin for inputting the HDMI format signal in the SOC chip.

According to a fifteenth aspect, some embodiments of the present disclosure provide a television device including a display screen configured to display an image; a power delivery circuit configured to deliver power to a device and a signal input circuit configured to receive data from an external device, where the signal input circuit includes:

a USB TYPE-C interface provided with a USB D+/D− signal pin;

an SOC chip provided with a pin for inputting a USB D+/D− signal;

a control chip electrically connected to a CC pin in the USB TYPE-C interface and provided with a pin for inputting the USB D+/D− signal; and a selective switch device, where a control pin of the selective switch device is electrically connected to a control signal output pin in the control chip; an input pin of the selective switch device is electrically connected to the USB D+/D− signal pin in the USB TYPE-C interface; in two gateable output pins, one gateable output pin is electrically connected to the pin for inputting the USB D+/D− signal in the SOC chip; and the other gateable output pin is electrically connected to the pin for connecting the USB D+/D− signal in the control chip.

In some embodiments, the signal input circuit further includes: the SOC chip including a pin for inputting a USB SSTX/RX signal and a pin for inputting an HDMI format signal; and a multiplexing switch chip provided with two high-speed differential pair signal input pins connected to the USB TX1/2 and RX1/2 of the USB TYPE-C interface; where a control signal input pin of the multiplexing switch chip is electrically connected to the other control signal output pin in the control chip, in two gateable output pins in the multiplexing switch chip, one gateable output pin is electrically connected to the pin for inputting the USB SSTX/RX signal in the SOC chip; and the other gateable output pin is electrically connected to the pin for inputting the HDMI format in the SOC chip.

In some embodiments, the control chip is provided with a billboard function, and a connecting terminal in the control chip is electrically connected to a USB D+/D− signal pin point so that billboard information may be interacted between the control chip and the external device.

According to a sixteenth aspect, some embodiments of the present disclosure provide a television device including:

a display screen configured to display an image;

a power delivery circuit configured to deliver power to a device;

and a signal input circuit configured to receive data from an external device;

where the signal input circuit includes:

a USB TYPE-C interface provided with a USB D+/D− signal pin;

an SOC chip provided with a pin for inputting a USB D+/D− signal;

a control chip configured to detect a type of a device connected to the USB TYPE-C interface, when the USB TYPE-C interface is detected to be connected to a USB device, the connection between the USB D+/D− signal pin in the USB TYPE-C interface and the pin for inputting the USB D+/D− signal in the SOC chip is selected to be conducted; and when the USB TYPE-C interface is connected to an ALT MODE device, the connection between the USB D+/D− signal pin in the USB TYPE-C interface and a signal pin for interacting billboard information in the control chip is selected to be conducted.

In some embodiments, the SOC chip includes a pin for inputting a USB SSTX/RX signal and a pin for inputting an HDMI format signal; a multiplexing switch chip is provided with two high-speed differential pair signal input pins connected to the USB TX1/2 and RX1/2 of the USB TYPE-C interface; where a control pin of the multiplexing switch chip is electrically connected to the other control signal output pin in the control chip, in two gateable output pins in the multiplexing switch chip, one gateable output pin is electrically connected to the pin for inputting the USB SSTX/RX signal in the SOC chip; and the other gateable output pin is electrically connected to the pin for inputting the HDMI format in the SOC chip.

In some embodiments, an electronic television device further includes a DP-HDMI module, an HPD terminal of the DP-HDMI module is connected to a CC module so as to determine a communication state between the external device and the DP-HDMI module, the other HPD terminal is electrically connected to the input end of the DP-HDMI module, and the output end of the DP-HDMI module is electrically connected to the pin for inputting the HDMI format in the SOC chip.

According to a seventeenth aspect, some embodiments of the present disclosure provide a signal input circuit compatible for inputting data of a USB device and ALT MODE device and realizing interaction of billboard information, including:

a USB TYPE-C interface provided with a USB D+/D− signal pin;

an SOC chip provided with a pin for inputting a USB D+/D− signal;

a control chip electrically connected to a CC pin in the USB TYPE-C interface and provided with a pin for inputting the USB D+/D− signal; and a selective switch device, where a control pin of the selective switch device is electrically connected to a control signal output pin in the control chip; an input pin of the selective switch device is electrically connected to the USB D+/D− signal pin in the USB TYPE-C interface; in two gateable output pins, one gateable output pin is electrically connected to the pin for inputting the USB D+/D− signal in the SOC chip; and the other gateable output pin is electrically connected to the pin for connecting the USB D+/D− signal in the control chip.

In some embodiments, the signal input circuit further includes: the SOC chip including a pin for inputting a USB SSTX/RX signal and a pin for inputting an HDMI format signal; and a multiplexing switch chip provided with two high-speed differential pair signal input pins connected to the USB TX1/2 and RX1/2 of the USB TYPE-C interface; where a control pin of the multiplexing switch chip is electrically connected to the other control signal output pin in the control chip, in two gateable output pins in the multiplexing switch chip, one gateable output pin is electrically connected to the pin for inputting the USB SSTX/RX signal in the SOC chip; and the other gateable output pin is electrically connected to the pin for inputting the HDMI format in the SOC chip.

In some embodiments, the control chip is provided with a billboard function, and a connecting terminal in the control chip is electrically connected to the USB D+/D− signal pin to allow the control chip feed billboard information back to the external device.

According to an eighteenth aspect, some embodiments of the present disclosure provide a signal input circuit compatible for inputting data of a USB device and ALT MODE device and realizing interaction of billboard information, including:

a control chip configured to control electrical connection between a D+/D− input terminal in a USB TYPE-C interface and a connecting terminal of an SOC chip and electrical connection between the D+/D− input terminal in the USB TYPE-C interface and a connecting terminal for interacting billboard information in the control chip according to a identified type of a device connected to the USB TYPE-C interface, and one of two electrical connections is selected to be conducted at the same moment.

In some embodiments, the USB TYPE-C interface is provided with a USB D+/D− signal pin; the SOC chip is provided with a pin for inputting a USB D+/D− signal; the control chip is electrically connected to a CC pin in the USB TYPE-C interface and provided with a pin for inputting the USB D+/D− signal; and a selective switch device is provided, where a control pin of the selective switch device is electrically connected to a control signal output pin in the control chip; an input pin of the selective switch device is electrically connected to the USB D+/D− signal pin in the USB TYPE-C interface; in two gateable output pins, one gateable output pin is electrically connected to the pin for inputting the USB D+/D− signal in the SOC chip; and the other gateable output pin is electrically connected to the pin for inputting the USB D+/D− signal in the control chip.

In some embodiments, the SOC chip includes a pin for inputting a USB SSTX/RX signal and a pin for inputting an HDMI format signal; a multiplexing switch chip is provided with two high-speed differential pair signal input pins connected to the USB TX1/2 and RX1/2 of the USB TYPE-C interface; where a control pin of the multiplexing switch chip is electrically connected to the other control signal output pin in the control chip, in two gateable output pins in the multiplexing switch chip, one gateable output pin is electrically connected to the pin for inputting the USB SSTX/RX signal in the SOC chip; and the other gateable output pin is electrically connected to the pin for inputting the HDMI format in the SOC chip.

According to a nineteenth aspect, some embodiments of the present disclosure provide a signal input method compatible for inputting data of an external USB device and ALT MODE device and realizing interaction of billboard information, including:

detecting a type of a signal connected to a USB TYPE-C interface, controlling electrical connection between a D+/D− input terminal in the USB TYPE-C interface and a connecting terminal of an SOC chip and electrical connection between the D+/D− input terminal in the USB TYPE-C interface and a connecting terminal for interacting billboard information in a control chip, and making one of the two electrical connections be conducted at the same moment.

In some embodiments, a multiplexing switch chip receives a control signal of the control chip, according to the control signal, in two gateable output pins, one gateable output pin is electrically connected to the pin for inputting the USB SSTX/RX signal in the SOC chip; and the other gateable output pin is electrically connected to the pin for inputting the HDMI format in the SOC chip.

In some embodiments, when a type of a USB protocol signal connected to the USB TYPE-C interface is identified, a connection between a USB D+/D− terminal in the USB TYPE-C interface and the connecting terminal of the SOC chip is selected to be conducted; when a type of an ALT MODE protocol signal connected to the USB TYPE-C interface is identified, a connection between the USB D+/D− terminal in the USB TYPE-C interface and the connecting terminal for interacting billboard information in the control chip is selected to be conducted.

In some embodiments, when the type of the ALT MODE protocol signal connected to the USB TYPE-C interface is identified, whether VDM information of the external device is matched with VDM information prestored in the control chip is judged, if the VDM information of the external device is not matched with the VDM information prestored in the control chip, the connection between the USB D+/D− terminal in the USB TYPE-C interface and the connecting terminal for interacting the billboard information in the control chip is selected to be conducted.

According to a twentieth aspect, some embodiments of the present disclosure provide a signal input method for inputting data of a USB and ALT MODE compatible external device and realizing interaction of billboard information, including:

detecting a type of a signal input to a USB TYPE-C interface;

when a type of a USB protocol signal input to the USB TYPE-C interface is identified, selecting a connection between a USB D+/D− terminal in the USB TYPE-C interface and a connecting terminal of an SOC chip to be conducted so that data is transmitted between a USB external device and the SOC chip via the USB D+/D− terminal; and when a type of an ALT MODE protocol signal input to the USB TYPE-C interface is identified, selecting a connection between the USB D+/D− terminal in the USB TYPE-C interface and the connecting terminal for interacting billboard information in a PD module to be conducted so that the billboard information is interacted between an ALT MODE external device and the PD module via the USB D+/D− terminal.

In some embodiments, when the type of the USB protocol signal connected to the USB TYPE-C interface is identified, a multiplexing switch chip selects the connection between one high-speed differential pair signal pin in the USB TYPE-C interface and a USB signal connecting terminal of an SOC chip to be conducted so that data is transmitted between the USB external device and the SOC chip via a USB SSTX/RX terminal; and when the type of the ALT MODE protocol signal connected to the USB TYPE-C interface is identified, a multiplexing switch chip selects the connection between at least one high-speed differential pair signal pin in the USB TYPE-C interface and an HDMI signal connecting terminal of the SOC chip to be conducted so that the ALT MODE external device and the SOC chip interact audio/video data via a terminal for transmitting an HDMI signal.

According to a twenty-first aspect, some embodiments of the present disclosure provide a signal input method compatible for inputting data of an external USB and ALT MODE device and realizing interaction of billboard information, including:

detecting a type of a signal input to a USB TYPE-C interface;

when a type of an ALT MODE protocol signal input to the USB TYPE-C interface is detected, selecting a connection between a USB D+/D− terminal in the USB TYPE-C interface and a connecting terminal for interacting billboard information in a control chip to be conducted so that the billboard information is interacted between an ALT MODE external device and the control chip via the USB D+/D− terminal;

otherwise, the connection between the USB D+/D− input terminal and a connecting terminal of an SOC chip is conducted as default state.

According to a twenty-second aspect, some embodiments of the present disclosure provide an electronic television device for receiving data from an external device via a USB TYPE-C interface, characterized by including:

the USB TYPE-C interface provided with a USB D+/D− signal pin; and an SOC chip provided with a pin for inputting a USB D+/D− signal;

where the USB D+/D− signal pin in the USB TYPE-C interface is electrically connected to the pin for inputting the USB D+/D− signal in the SOC chip so that data is transmitted between a USB connected device and the SOC chip via a USB D+/D− channel.

In some embodiments, the SOC chip includes a pin for inputting a USB SSTX/RX signal and a pin for inputting an HDMI format signal; and a multiplexing switch chip is provided with two high-speed differential pair signal input pins connected to the USB TX1/2 and RX1/2 of the USB TYPE-C interface; where a control pin of the multiplexing switch chip is electrically connected to the other control signal output pin in a control chip, in any two gateable output pins in the multiplexing switch chip, one gateable output pin is electrically connected to the pin for inputting the USB SSTX/RX signal in the SOC chip; and the other gateable output pin is electrically connected to the pin for inputting the HDMI format in the SOC chip.

According to a twenty-third aspect, some embodiments of the present disclosure provide a television device including a display screen configured to display an image; a power delivery circuit configured to deliver power to a device and a signal input circuit configured to receive data from an external device, where the signal input circuit includes:

a USB TYPE-C interface provided with a USB D+/D− signal pin; and an SOC chip provided with a pin for inputting a USB D+/D− signal;

where the USB D+/D− signal pin in the USB TYPE-C interface is electrically connected to the pin for inputting the USB D+/D− signal in the SOC chip so that data are transmitted between a USB connected device and the SOC chip via a USB D+/D− channel.

In some embodiments, the television device further includes: the SOC chip including a pin for inputting a USB SSTX/RX signal and a pin for inputting an HDMI format signal; and a multiplexing switch chip provided with two high-speed differential pair signal input pins connected to the USB TX1/2 and RX1/2 of the USB TYPE-C interface; where a control signal input pin of the multiplexing switch chip is electrically connected to the other control signal output pin in a control chip, in any two gateable output pins in the multiplexing switch chip, one gateable output pin is electrically connected to the pin for inputting the USB SSTX/RX signal in the SOC chip; and the other gateable output pin is electrically connected to the pin for inputting the HDMI format in the SOC chip.

According to a twenty-fourth aspect, some embodiments of the present disclosure provide a signal input circuit compatible for inputting data of an external USB and ALT MODE device, the signal input circuit includes:

a USB TYPE-C interface provided with a USB D+/D− signal pin; and an SOC chip provided with a pin for inputting a USB D+/D− signal;

where the USB D+/D− signal pin in the USB TYPE-C interface is electrically connected to the pin for inputting the USB D+/D− signal in the SOC chip so that data are transmitted between a USB connected device and the SOC chip via a USB D+/D− channel.

In some embodiments, the SOC chip includes a pin for inputting a USB SSTX/RX signal and a pin for inputting an HDMI format signal; and a multiplexing switch chip is provided with two high-speed differential pair signal input pins connected to the USB TX1/2 and RX1/2 of the USB TYPE-C interface; where a control signal input pin of the multiplexing switch chip is electrically connected to the other control signal output pin in a control chip, in any two gateable output pins in the multiplexing switch chip, one gateable output pin is electrically connected to the pin for inputting the USB SSTX/RX signal in the SOC chip; and the other gateable output pin is electrically connected to the pin for inputting the HDMI format signal in the SOC chip.

According to a twenty-fifth aspect, some embodiments of the present disclosure provide a signal input method compatible for inputting data of an external USB and ALT MODE device, including:

detecting a type of a signal input to a USB TYPE-C interface;

when a type of a USB protocol signal input to the USB TYPE-C interface is identified, selecting, by a multiplexing switch chip, a connection between one high-speed differential pair signal pin in the USB TYPE-C interface and a USB signal connecting terminal of an SOC chip to be conducted so that data is transmitted between a USB external device and the SOC chip via a USB SSTX/RX terminal; and when a type of an ALT MODE protocol signal input to the USB TYPE-C interface is identified, selecting, by the multiplexing switch chip, a connection between at least one high-speed differential pair signal pin in the USB TYPE-C interface and an HDMI signal connecting terminal of the SOC chip to be conducted so that an ALT MODE external device and the SOC chip interact audio/video data via a terminal for transmitting an HDMI signal.

According to a twenty-sixth aspect, some embodiments of the present disclosure provide a television with a USB TYPE-C interface, including:

the USB TYPE-C interface configured for connecting to an external device;

an SOC chip provided with the USB DFP interface and configured to implement a USB2.0/3.0 DFP function;

a microprocessor chip connected to the SOC chip and the USB TYPE-C interface, for supporting a USB Type-C CC communication and PD protocol, provided with a billboard UFP interface and configured to output a billboard signal outwards under an ALT MODE condition; and a switch device controlled by the microprocessor chip and configured to make a USB D+/D− terminal of the USB TYPE-C interface connect with a USB DFP interface of the SOC chip or the billboard UFP interface of the microprocessor chip.

In some embodiments, the microprocessor chip detects a type of an connected device, and when a USB protocol device is connected, the switch device is in a default state, so that the USB D+/D− terminal of the USB Type-C interface communicates with the USB DFP interface of the SOC chip; and when an ALT MODE device is connected, the switch device is controlled by the microprocessor chip, so that the USB D+/D− terminal of the USB Type-C interface is switched to connect with the billboard UFP interface of the microprocessor chip.

In some embodiments, the television further includes a multiplexing switch chip, when the USB protocol device is connected, the microprocessor chip controls the multiplexing switch chip to be switched, so that TX1/RX1 and TX2/RX2 terminals of the USB Type-C interface connect with the USB DFP interface of the SOC chip.

In some embodiments, the SOC chip further includes an HDMI SINK interface; and the television further includes the multiplexing switch chip and a DP-HDMI module connected between the multiplexing switch chip and the HDMI SINK interface, and the DP-HDMI module is configured to convert a DP signal into an HDMI signal to be displayed by the SOC chip.

In some embodiments, the USB Type-C interface is initially set to be in a double-role USB mode and performs role change when being connected to devices playing different roles to match the device.

In some embodiments, the USB Type-C interface is adapted to be a USB UFP device when being connected to a USB DFP device; and if the connected device supports a DP DFP mode, the device is switched to be in a DO DFP mode to transmit the DP signal.

In some embodiments, the USB Type-C interface is adapted to be the USB DFP device when being connected to the USB UFP device.

In some embodiments, the USB Type-C interface negotiates with the external device and is adapted to be a DP UFP device when being connected to a double-role USB device supporting an ALT MODE.

In some embodiments, the television is used as a POWER SOURCE to deliver power to the outside.

In the above-mentioned embodiments, based on circuit connection relationships among the switch module, the USB Type-C interface master control module and the SOC chip in the television device, switching between gateable links for the USB2.0 signal and the billboard signal is realized, and the compatibility between the USB2.0 signal transmission function and the billboard signal transmission function may be realized. When the USB device is externally connected to the USB Type-C interface, a link between the USB device and the SOC chip is turned on by the USB Type-C interface master control module, so that the transmission function of the USB2.0 signal is realized. When the ALT MODE device is externally connected to the USB Type-C interface, a link between the billboard signal output interface and the ALT MODE device is turned on by the USB Type-C interface master control module 220, and thus the Billboard function is realized.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 18 is a schematic structural diagram of a USB of the television device when the external device is a DP device according to some embodiments of the present disclosure;

FIG. 19 is a schematic flow diagram of a control method for the television device according to some embodiments of the present disclosure;

Corresponding reference numerals indicate corresponding parts or features throughout the several views of the drawings.

DETAILED DESCRIPTION

Figure 1A:
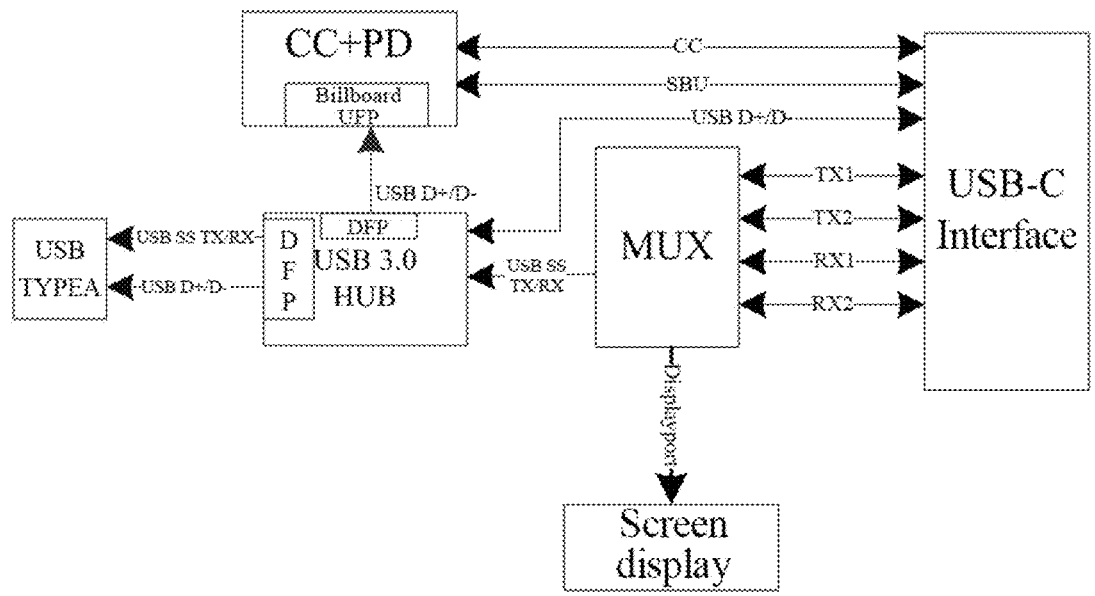
FIG. 1A is a schematic architectural diagram of a Monitor device when a USB-Type-C interface is applied to the Monitor device in related art.

Example embodiments will now be described more fully with reference to the accompanying drawings.

"A plurality of" in this application refers to two or more. In addition, it should be understood that in the description of this application, terms such as "first" and "second" are merely intended to distinguish the purpose of the description, but cannot be intended to indicate or hint the relative importance or an order.

Before embodiments of this application are introduced, nouns related to this application are firstly described below.

DP is short for Display Port, which is a high definition digital display interface standard and may be connected to a computer or a display to transmit a DP signal, a Display Port 1.1 standard supports the maximum transmission bandwidth reaching up to 10.8 Gb/S, and an HDMI 1.3 standard supports the transmission bandwidth reaching up to 10.2 G/s.

HDMI is short for High Definition Multimedia Interface, which is a high definition multimedia interface and a digital video/audio interface technology. It is used as a special digital interface suitable for transmitting videos, for simultaneously transmitting audio and video signals, and has the highest data transmission speed reaching 48 Gbps and it is for transmitting 4K videos.

DP ALT MODE is short for a DP alternative mode which is designed with respect to the specification of a USB Type-C interface, so that an application apparatus carrying the USB Type-C interface is for simultaneously supporting high-speed transmission of a USB signal and a DP signal via only one cable and supporting power delivery to an external device of the USB Type-C interface.

HDMI ALT MODE is short for an HDMI alternative mode which is designed with respect to the specification of the USB Type-C interface, so that the application apparatus carrying the USB Type-C interface is for simultaneously supporting high-speed transmission of the USB signal and an HDMI signal via only one cable and supporting power delivery to the external device of the USB Type-C interface.

An ALT MODE device such as a computer, a notebook computer, a PAD mobile terminal and other electronic devices in this application is for supporting DP ALT MODE or HDMI ALT MODE.

The USB Type-C interface is for supporting the transmission of a USB 2.0 signal, a USB 3.0 signal and a high definition digital display signal (DP signal for short). The highest transmission rate of the USB Type-C interface is 10 Gb/s, the power transmission of the USB Type-C interface is two-way, and when being applied to a television device, the USB Type-C interface supports the television device to charge the external device of the USB Type-C interface and also supports the external device of the USB Type-C interface to charge the television device. The USB Type-C interface may be disposed as a downstream facing port (DFP), an upstream facing port (UFP) or a double-role port (DRP port for short).

A UFP interface is an upstream interface, which is also called the upstream port and may be used as a USB peripheral interface, the UFP interface may be used as a peripheral port, a port interacting with the UFP interface may be used as a host port, and the UFP interface is used as a peripheral to be connected to a host device. For example, in this application, when a television device is externally connected to the ALT MODE device via the USB Type-C interface, a billboard signal output interface of a PD module is equivalent to a UFP interface once there is a demand of transmitting a billboard signal, at the moment, the external device of the USB Type-C interface is the host device, and the television device is equivalent to the peripheral of the external device of the USB Type-C interface.

A DFP interface is a downstream interface and is also called the downstream port, namely a USB host interface. The DFP interface may be used as a host port, a port interacting with the DFP interface may be used as a peripheral port, the DFP interface is used as a host to be connected to a peripheral, and similar to a USB interface on a household computer, the DFP interface may allow the peripheral to be plugged. For example, in this application, when the television device is externally connected to a USB device via the USB Type-C interface, a USB interface on an SOC chip is used as the DFP interface once there is a demand of transmitting a USB2.0 signal or a USB3.0 signal, at the moment, the USB device externally connected to the USB Type-C interface is the peripheral, and the television device is equivalent to the host of the external device of the USB Type-C interface.

A USB signal is a differential signal and is transmitted via a differential pair such as a D+D− differential pair, D+ and D− are a pair of differential signals. The differential pair is configured to transmit data. A pair of lines transmits one signal, and signals transmitted by two lines are same in amplitude and opposite in polarity. The called differential signals mean that when a high level is required to be transmitted, the high level is transmitted on one line (such as D+) and a low level is transmitted on the other paired line, and when the low level is required to be transmitted, the low level is transmitted on D+ and the high level is transmitted on the D−, in this way, phases of the signals transmitted on the two lines are opposite, so that the anti-interference capability may be improved, and furthermore, the data transmission rate may be increased.

The USB signal includes the USB2.0 signal and the USB3.0 signal, the USB2.0 signal is a half-duplex differential signal and supports one-way data transmission, and the transmission direction may be negotiated in advance; and a data signal line of the USB2.0 signal is a low-speed differential pair with the data transmission rate being 1.5 Mbps, 12 Mbps or 480 Mbps. While the USB3.0 signal is a full-duplex differential signal and supports simultaneous two-way data transmission. A data signal line of the USB3.0 signal is a high-speed differential pair with the data transmission rate being 5.0 Gbps, In order to distinguish the differential pair of the USB2.0 signal, in this application, a data transmission line of the USB2.0 signal is defined as a USB D+/D− pair, and a data transmission line of the USB3.0 signal is defined as a USB SSTX/RX differential pair.

Accordingly, a data input pin or a data output pin of the USB2.0 signal is defined as a USB D+/D− differential terminal, and a data input pin or a data output pin of the USB3.0 signal is defined as a USB SSTX/RX differential terminal.

Figure 3:
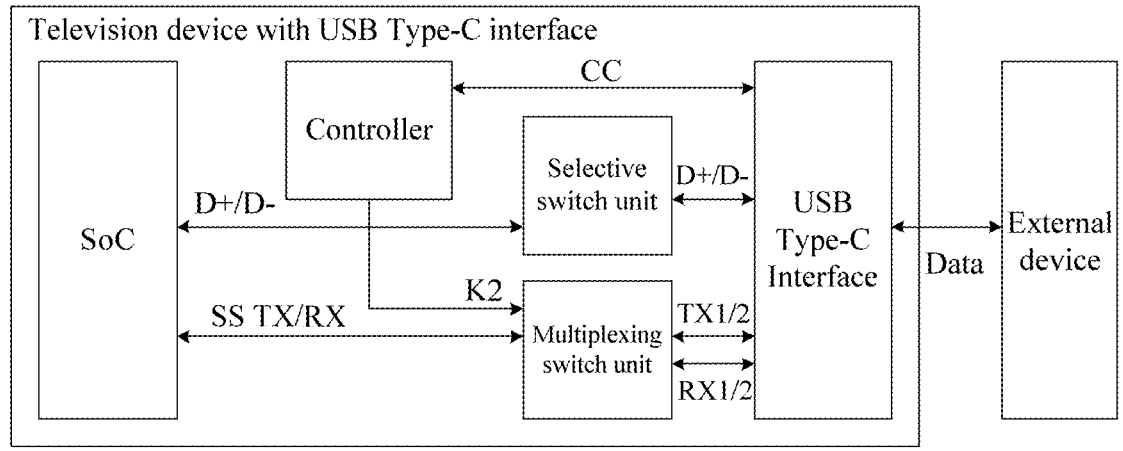
FIG. 3 is a schematic diagram of data transmission of a television device with the USB-Type-C interface in a USB mode according to some embodiments of the present disclosure.

In addition, in this application, a data transmission line of the HDMI signal is also a high-speed differential pair and is defined as an HDMI signal channel shown as D0 P/N, D1 P/N, D2 P/N and CLK P/N (P/N is a high-speed differential pair and corresponds to two transmission lines, and signals transmitted by the two transmission lines are same in amplitude and opposite in polarity) in FIG. 3.

Accordingly, a data transmission line of the DP signal is also a high-speed differential pair and is defined as a DP signal channel shown as DP0 P/N, DP1 P/N, DP2 P/N and DP3 P/N in FIG. 3.

Accordingly, a data input pin or a data output pin of the DP signal is defined as a DP differential terminal, and a data input pin or a data output pin of the HDMI signal is defined as an HDMI differential terminal.

The Billboard signal refers to a Billboard communication signal specified in a Billboard standard and supports the ALT MODE, that is, when a television device is externally connected to the ALT MODE device (such as the computer, the notebook computer, the mobile terminal and other electronic devices) via the USB Type-C interface, the television device should feed the billboard signal back to the ALT MODE device if the abnormal display of the television device occurs, so that the ALT MODE device detects an abnormal cause according to the billboard signal.

In this application, a Billboard signal output interface (including a Billboard signal output pin) is arranged in a PD module of a Type-C interface master control module, and the PD module is short for a USB power delivery specification supporting a USB Type-C interface protocol standard and supports different power delivery demands of the external device of the USB Type-C interface.

In this application, a CC module supports CC communication of a USB Type-C interface protocol and is configured to perform CC communication with the external device of the USB Type-C interface, and a signal for performing CC communication between the CC module and the external device of the USB Type-C interface is defined as a CC signal.

For the Monitor device, when the USB Type-C interface is applied to the Monitor device, the Monitor device has two application demands for the USB D+/D− differential terminals of the USB Type-C interface, one of the demands is a demand for transmitting the USB2.0 signal, and the other demand is a demand for transmitting the billboard signal. An inventor of the present disclosure found that, when the USB Type-C interface is applied to the Monitor device, a USB3.0HUB device may be used as a connector to meet the two demands so that the compatibility between a USB2.0 transmission function and a billboard function is realized.

Specifically, when the USB Type-C interface is applied to the Monitor device, as shown in FIG. 1A, the Monitor device is externally connected to the USB device or the ALT MODE device via the USB Type-C interface. The Monitor device is equivalent to a peripheral of the external device, and therefore, the USB interface and the billboard signal output interface of the Monitor device are equivalent to the UFP port. When the USB Type-C interface is used, in order to realize the compatibility between the USB2.0 transmission function and the billboard function in the Monitor device, the USB interface of the Monitor device is integrated with one USB3.0HUB device, the USB3.0HUB device includes two output interfaces, the first output interface is electrically connected to the billboard signal output interface to form a first path, the second output interface is electrically connected to the USB interface of the Monitor device to form a second path, a data input interface of the USB3.0HUB device is electrically connected to the USB Type-C interface. The USB3.0HUB device plays a role in providing two channels, when USB data of the external device are transmitted by using the USB Type-C interface, the USB data are transmitted via the second path to the USB interface of the Monitor device, when high definition display video/audio data (HDMI data) of the external device are transmitted by using the USB Type-C interface, the HDMI data are transmitted to a display of the Monitor device, and when the HDMI data are abnormally displayed, the billboard signal is transmitted to the external device of the USB Type-C interface via the second path, so that a whole USB system of a mobile phone or the computer is enabled to normally work.

For the television device, when the USB Type-C interface is applied to the television device, the television device also has demands of transmitting the USB2.0 signal and transmitting the billboard signal with specific to the USB D+/D− differential terminals of the USB Type-C interface.

When the external device of the USB Type-C interface is the USB device (a USB2.0 device or a USB3.0 device), the USB2.0 signal is required to be transmitted to the SOC chip of the television device via the USB D+/D− differential terminals in the USB Type-C interface; when the external device is the ALT MODE device (such as the computer, the notebook computer, the mobile terminal and other electronic devices), if the abnormal display of the television device appears, the television device may generally feed billboard information in the PD module back to the ALT MODE device via the USB Type-C interface because the billboard information is required to be transmitted to the ALT MODE device via the USB D+/D− signal pin in the Type-C interface. Since the number of the USB D+/D− differential terminals which may be used when the Type-C interface is connected to the external device is fixed, together with one-way transmission being supported, and data transmission links of the USB 2.0 signal and the Billboard signal may not be reused on the USB D+/D− differential terminals of the USB Type-C interface at the same time, if the USB D+/D− differential terminals of the USB Type-C interface is directly connected to a pin for inputting a USB D+/D− signal in the SOC chip, the Billboard function may not be realized when a DP ALT MODE device is externally connected to the USB Type-C interface; and if the USB D+/D− differential terminals of the USB Type-C interface is connected to a pin for inputting a USB D+/D− signal in the PD module to realize the Billboard function, the transmission function of the USB 2.0 signal may not be realized when the USB device is externally connected to the USB Type-C interface.

Figure 1B:
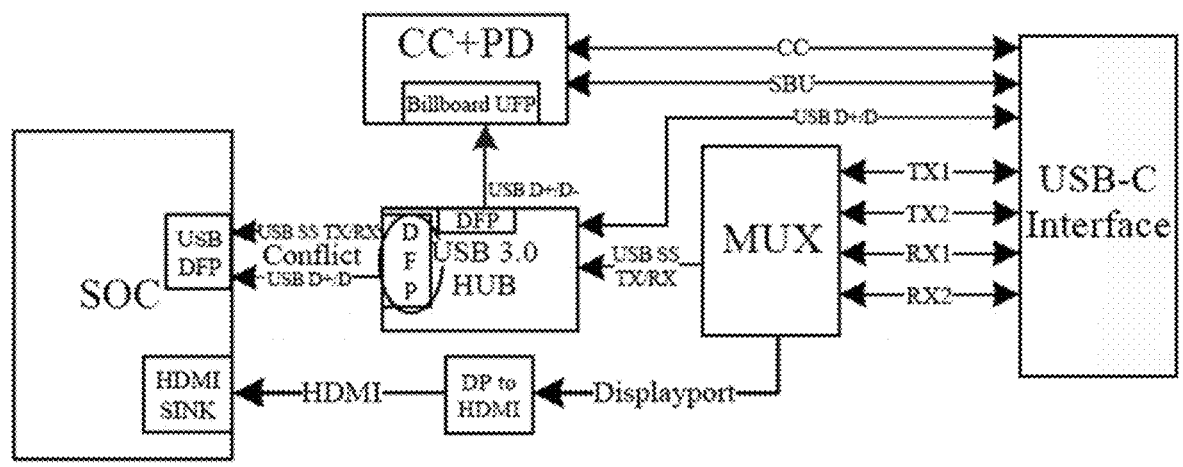
FIG. 1B is a schematic architectural diagram of a television device having interface conflicts when the USB-Type-C interface is applied to the television device.

When the USB Type-C interface is applied to the television device, the problem of incompatibility between the Billboard function and the USB 2.0 signal transmission function may not be solved even if USB3.0HUB is used. As shown in FIG. 1B, when the USB2.0 signal is interacted between the television device and the external device of the USB Type-C interface, the television device may be used as the host of the external device of the USB Type-C interface, and the external device of the USB Type-C interface may be used as the peripheral of the television device. At the moment, the USB interface on the SOC chip of the television device is equivalent to the DFP interface which is not matched with DFP interfaces at two output ends of the USB3.0HUB device, and therefore, the aim of realizing the compatibility between the Billboard function and the USB 2.0 signal transmission function may not be achieved by using the USB3.0HUB.

Figure 2:
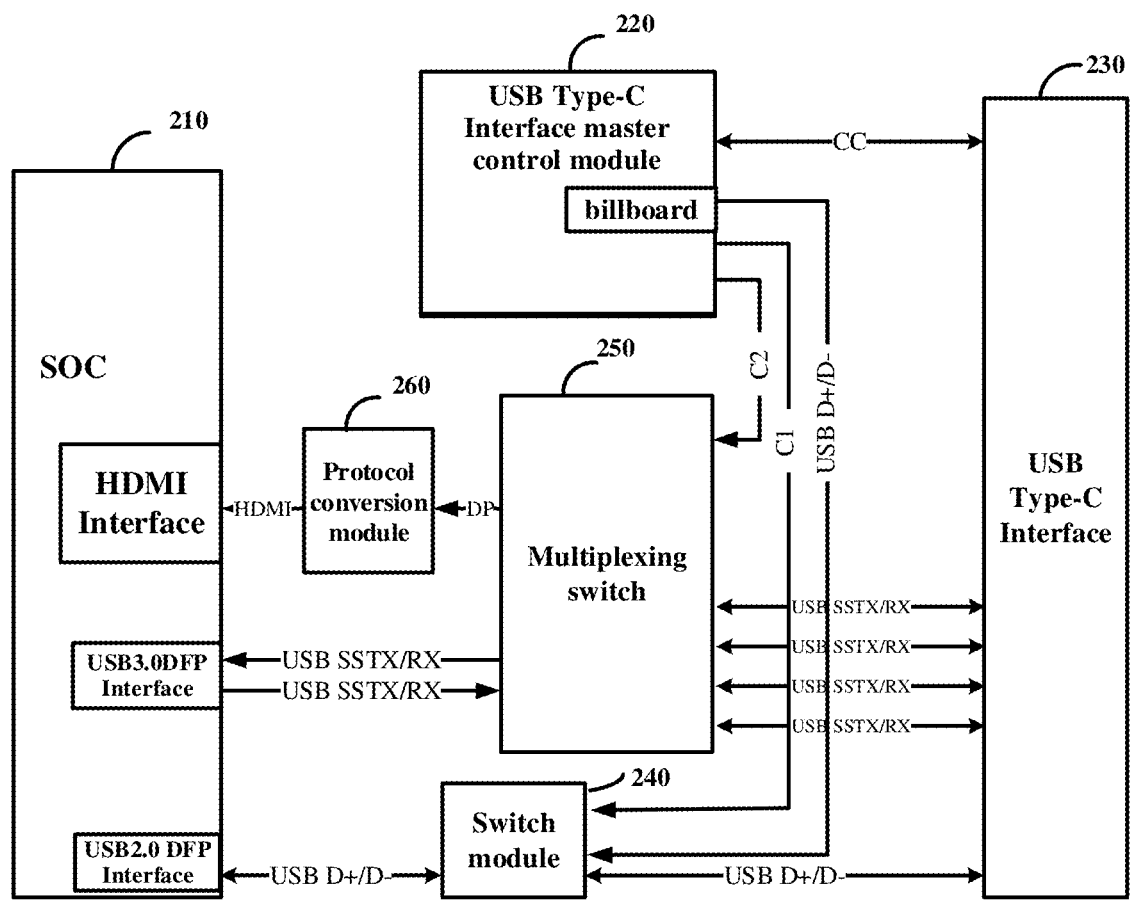
FIG. 2 is a schematic architectural diagram of a television device when the USB-Type-C interface is applied to the television device according to some embodiments of the present disclosure.

In order to solve the above-mentioned problem, this application provides a television device to realize the compatibility between the Billboard function and the USB 2.0 signal transmission function. The television device according to this application may be a television set, as shown in FIG. 2, mainly including:

an SOC chip 210 provided with a DFP interface, the DFP interface being connected to a switch module 240 via a USB D+/D− differential pair, and the USB D+/D− differential pair between the DFP interface and the switch module 240 being a first channel;

a USB Type-C interface master control module 220 provided with a UFP interface, the UFP interface being connected to the switch module 240 via a USB D+/D− differential pair, and the USB D+/D− differential pair between the UFP interface and the switch module 240 being a second channel; and a USB Type-C interface 230 connected to the switch module 240 via a USB D+/D− differential pair;

where the USB Type-C interface master control module 220 is also connected to the switch module 240 via a control signal line C1 to control the switch module 240 to turn on the first channel and turn off the second channel or turn on the second channel and turn off the first channel.

In order to realize the switching of the first channel and the second channel, in this application, the determination of a type of an external device of the USB Type-C interface 230 is realized by a CC module in the USB Type-C interface master control module 220, and the switching of the first channel and the second channel is realized according to the identified type.

In some embodiments, the USB Type-C interface master control module 220 is also connected to the USB Type-C interface 230 by a control signal line C2 to interact a CC signal with the USB Type-C interface 230 to control the switch module 240 to turn on the first channel and turn off the second channel or turn on the second channel and turn off the first channel according to the identified type of the external device.

Specifically, when the USB Type-C interface master control module 220 is configured to control the switch module 240 to turn on the first channel and turn off the second channel when identifying that the external device of the USB-Type-C interface 230 is a USB device and control the switch module 240 to turn on the second channel and turn off the first channel when identifying that the external device of the USB-Type-C interface 230 is an ALT MODE device.

In the above-mentioned embodiment, based on circuit connection relationships among the switch module 240, the USB Type-C interface master control module 220 and the SOC chip 210 in the television device, switching between gateable links of a USB2.0 signal and a billboard signal is realized, and the compatibility between a USB2.0 signal transmission function and a billboard signal transmission function may be realized. When the USB device is externally connected to the USB Type-C interface 230, a link between the USB device and the SOC chip 210 is selected by the USB Type-C interface master control module 220, so that the USB D+/D− differential terminals of the USB Type-C interface 230 is connected to a pin for inputting a USB D+/D− signal in the SOC chip 210, and the transmission function of the USB2.0 signal is realized. When the ALT MODE device is externally connected to the USB Type-C interface 230, a link between the billboard signal output port and the ALT MODE device is selected by the USB Type-C interface master control module 220, so that the USB D+/D− differential terminals of the USB Type-C interface 230 is connected to a pin for inputting a USB D+/D− signal in a PD module in the USB Type-C interface master control module 220, and furthermore, the Billboard function is realized.

Both a USB3.0 signal and a DP or HDMI signal are transmitted by using high-speed differential pairs, in order to reduce signal transmission lines, the USB3.0 signal and the DP or HDMI signal may be configured to share the high-speed differential pairs, a part of high-speed differential pairs is selected to transmit the USB3.0 signal when the USB device is externally connected to the USB Type-C interface 230, and a part of high-speed differential pairs is selected to transmit the DP or HDMI signal when the ALT MODE device is externally connected to the USB Type-C interface 230.

The present embodiments provide a television device with a USB Type-C interface, the television device includes the USB Type-C interface, a USB Type-C interface master control module, a switch module and an SoC chip, the USB Type-C interface is for receiving data transmitted by an external device, the switch module may be connected to the USB Type-C interface master control module, the USB Type-C interface master control module may select a USB D+/D− signal pin to be connected to an interface for transmitting a USB D+/D− signal in the SoC chip or select the USB D+/D− signal pin to be connected to an interface for transmitting billboard information in a controller when determining a type of the external device, so that a process that the external device transmits the USB D+/D− signal to the SoC chip may be realized, and a process that the external device is for acquiring the billboard information may also be realized. In the present embodiment, based on the USB Type-C interface, the simultaneous compatibility between the transmission of the USB D+/D− signal and the transmission of the billboard information of a billboard module may be realized, and the demand for a wire plugging direction may also be met by providing a path of switch additionally and identifying a working mode of the external device.

A transmission channel of the billboard information is turned on, and the data signal transmission between the SOC chip and the external device is performed, so that a plurality of interfaces can be realized and the demand for the wire plugging direction can be met in the SOC chip by using the USB Type-C interface.

Figure 4:
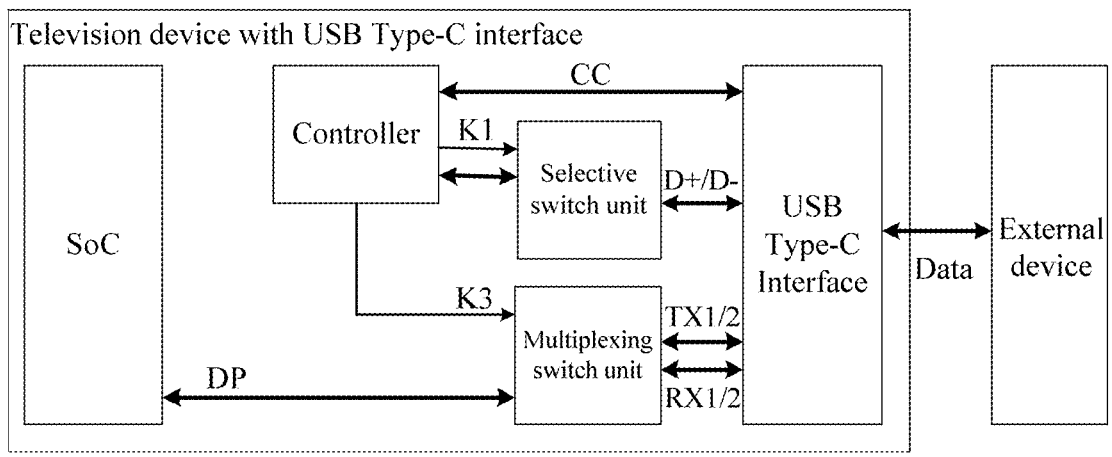
FIG. 4 is a schematic diagram of data transmission of the television device with the USB-Type-C interface in an Alt Mode according to some embodiments of the present disclosure.

Firstly, the external device has various types, namely working modes, and therefore, the controller may determine a gating state of the switch module according to the working mode of the external device. On the basis of the embodiment in the above-mentioned FIG. 2, this application further provides two schematic diagrams for data transmission as shown in FIG. 3 and FIG. 4, where the controller is an implementation of the above-mentioned USB Type-C interface master control module, and a selective switch unit is an implementation of the above-mentioned switch module. A specific process that the controller selects the USB D+/D− signal pin to be connected to the interface for transmitting the USB D+/D− signal in the SoC chip or selects the USB D+/D− signal pin to be connected to the interface for transmitting the billboard information in the controller according to the working mode of the external device is described in detail in combination with FIG. 3 and FIG. 4.

FIG. 3 is a schematic diagram of data transmission of a television device with a USB-Type-C interface according to the present disclosure in a USB mode, and FIG. 4 is a schematic diagram of data transmission of the television device with the USB-Type-C interface according to the present disclosure in an Alt Mode.

As shown in FIG. 3 and FIG. 4, in some embodiments, the controller is configured to gate the USB D+/D− signal pin to be connected to the interface for transmitting the USB D+/D− signal in the SoC chip when determining that the working mode of the external device is a USB mode to transmit the USB D+/D− signal to the SoC chip.

The controller is configured to transmit a second control signal to the selective switch unit when determining that the working mode of the external device is an Alt Mode, so that the selective switch unit gates the USB D+/D− signal pin to be connected to the interface for transmitting the billboard information in the controller according to the second control signal, and furthermore, the external device performs operation indicated by the billboard information.

Specifically, as shown in FIG. 3, when the controller determines that the working mode of the external device is the USB mode, the television device may select the USB D+/D− signal pin to work to connect to the interface for transmitting the USB D+/D− signal in the SoC chip as default, in this way, the television device may accurately provide a transmission channel of the USB D+/D− signal to the external device, to facilitate the external device to transmit the USB D+/D− signal to the SoC chip.

Further, as shown in FIG. 4, the controller may transmit a second control signal K1 to the selective switch unit when determining that the working mode of the external device is the Alt Mode and control the selective switch unit to gate the USB D+/D− signal pin to be connected to the interface for transmitting the billboard information in the controller according to the second control signal K1, so that the external device may monitor whether an abnormal condition may appear in a process of information interaction between the SoC chip and the external device in real time. When the external device does not acquire the billboard information or the billboard information indicates that no abnormal conditions appear, it is indicated that the condition of information interaction between the external device and the television device is normal. When the external device acquires the billboard information, the operation indicated by the billboard information, such as operation of reconnecting to the television device or operation of regulating the working mode of the external device, may be performed. Therefore, the external device may monitor the condition of the information interaction between the external device and the television device in real time, so that it is convenient to take corresponding measures when the abnormal condition appears, and the normal transmission of data may be guaranteed.

In this application, as shown in FIG. 2, the television device further includes a multiplexing switch 250, the multiplexing switch 250 is configured to perform signal multiplexing on high-speed differential pairs of the USB3.0 signal and the DP or HDMI signal and is compatible for a multiplexing function of the USB3.0 signal and the DP or HDMI signal, and the high-speed differential pair between the multiplexing switch 250 and the USB-Type-C interface 230 may be defined as USB SSTX P/N and USB SSRX P/N, not only may be used for transmitting the USB3.0 signal, but also may be used for transmitting the DP or HDMI signal.

In some embodiments, the multiplexing switch 250 is connected to the USB Type-C interface 230 via the USB SSTX/RX differential pair and is further connected to the DFP interface via the USB SSTX/RX differential pair, and the USB SSTX/RX differential pair between the multiplexing switch 250 and the DFP interface of the SOC chip 210 is a third channel.

In some embodiments, the SOC chip 210 includes an HDMI interface, when the SOC chip 210 does not support the conversion between the DP signal and the HDMI signal, but only supports the receiving or transmission of the HDMI signal, the DP signal is required to be transmitted to the SOC chip 210 after being converted into the HDMI signal, or the HDMI signal is required to be transmitted to the multiplexing switch 250 after being converted into the DP signal.

In order to realize such a conversion function, in this application, the television device further includes a protocol conversion module 260 for perform conversion between the DP signal and the HDMI signal.

In some embodiments, the multiplexing switch 250 is further connected to a DP interface of the protocol conversion module 260 via a DP signal channel, and an HDMI signal channel between the multiplexing switch 250 and the HDMI interface of the SOC chip 210 is a fourth channel. The HDMI interface is connected to an HDMI interface of the protocol conversion module 260 via the HDMI signal channel; and the protocol conversion module 260 is configured to convert the DP signal into the HDMI signal when the ALT MODE device transmits the DP signal, so that the HDMI signal is transmitted to the HDMI interface of the SOC chip.

In some embodiments, when supporting the conversion between the DP signal and the HDMI signal, the SOC chip 210 further includes a high definition digital display interface for receiving or transmitting the DP signal; and the multiplexing switch 250 is further connected to the DP interface via a DP signal channel.

When the USB device is externally connected to the USB Type-C interface 230 and the USB3.0 signal is transmitted, a transmission path of the USB3.0 signal is required to be selected, that is, a part of high-speed differential pairs between the multiplexing switch 250 and the USB Type-C interface 230 and a part of high-speed differential pairs between the multiplexing switch 250 and the SOC chip 210 are required to be selected to work to transmit the USB3.0 signal. When the ALT MODE device is externally connected to the USB Type-C interface 230 and the DP signal is transmitted, a transmission path of the DP signal is required to be selected to work, that is, a part of high-speed differential pairs between the multiplexing switch 250 and the USB Type-C interface 230 and a part of high-speed differential pairs between the multiplexing switch 250 and the SOC chip 210 are required to be selected to work to transmit the DP signal.

In order to realize the switching between gating of the above-mentioned USB3.0 signal and DP signal, in this application, a CC module is adopted to perform the determination of the type of the external device of the USB Type-C interface 230 and realize the switching between the gating of the USB3.0 signal and the DP signal according to the identified type.

In some embodiments, a control module of the USB Type-C interface 230 is further connected to the multiplexing switch 250 via a control signal line C2 to control the multiplexing switch 250 to turn on the third channel and turn off the fourth channel when identifying that the external device of the USB-Type-C interface 230 is the USB device, or control the multiplexing switch 250 to turn on the fourth channel and turn off the third channel when identifying that the external device of the USB-Type-C interface 230 is the ALT MODE device.

Specifically, as shown in FIG. 3, a multiplexing switch unit in the figure is the above-mentioned multiplexing switch 250. The controller may transmit a third control signal K2 to the multiplexing switch unit when determining that the working mode of the external device is the USB mode. The multiplexing switch unit may gate TX1/RX1 and TX2/RX2 pins to be connected to an interface for transmitting a USB SSTX/SS RX signal in the SoC chip according to the third control signal K2, in this way, the television device may accurately provide a channel of transmitting the USB SSTX/SS RX signal to the external device, so that the external device can transmit the USB SSTX/SS RX signal to the SoC chip.

Further, as shown in FIG. 4, the controller may transmit a fourth control signal K3 to the multiplexing switch unit when determining that the working mode of the external device is the Alt Mode. The multiplexing switch unit may gate TX1/RX1 and TX2/RX2 pins to be connected to an interface for transmitting an audio/video signal in the SoC chip according to the fourth control signal K3, in this way, the television device may accurately provide a channel of transmitting the audio/video signal to the external device, so that it is convenient for the external device to transmit the audio/video signal to the SoC chip. The fourth control signal K3 and the third control signal K2 may be signals with different contents in the same channel or signals with different contents in different channels, there are no limits herein in the present embodiment.

Secondarily, before the television device transmits the audio/video signal to the SoC chip, since the format of the audio/video signal in the external device may be of various types, while the audio/video signal required by the SoC chip may also have various formats, the process that the television device realizes the format consistency of the audio/video signals required by the external device and the SoC chip is described below in detail in combination with FIG. 5.

Figure 5:
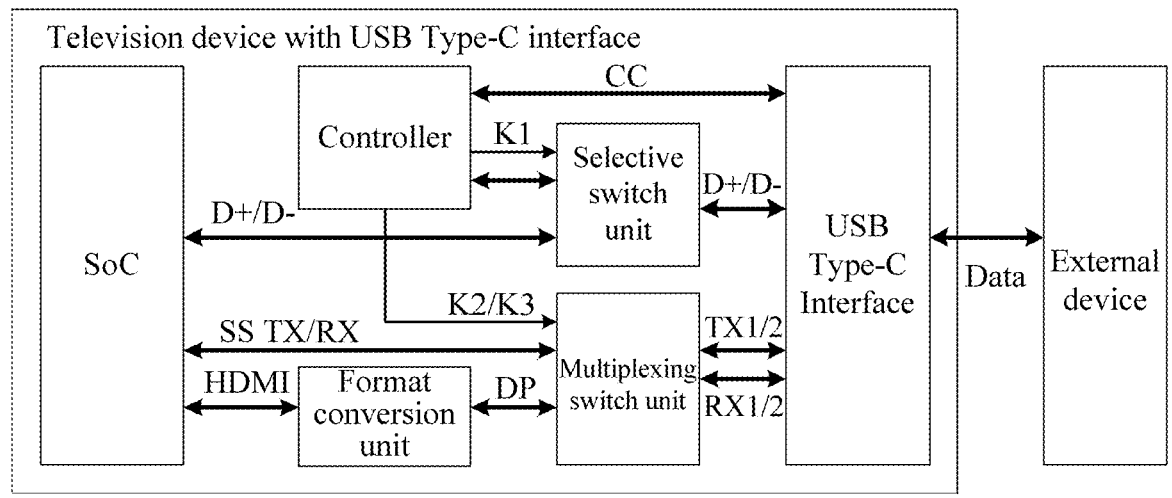
FIG. 5 is a schematic structural diagram of the television device with the USB Type-C interface according to the present disclosure.

FIG. 5 is a schematic structural diagram of a television device with a USB Type-C interface according to the present disclosure. As shown in FIG. 5, the television device further includes a format conversion unit, namely the above-mentioned protocol conversion module 260.

Here the input end of the format conversion unit is connected to the selective switch unit and is configured to perform format conversion on the audio/video signal transmitted by the selective switch unit to obtain a format-converted audio/video signal.

The output end of the format conversion unit is configured to be connected to the interface for transmitting the audio/video signal in the SoC chip to transmit the format-converted audio/video signal to the SoC chip.

Specifically, the input end of the format conversion unit is connected to the selective switch unit to receive the audio/video signal transmitted by the selective switch unit. In addition, the format conversion unit can perform format conversion on the audio/video signal to obtain the format-converted audio/video signal. The format-converted audio/video signal may be directly identified by the SoC chip, and therefore, the format-converted audio/video signal may be transmitted to the SoC chip by the format conversion unit to be identified by the SoC chip.

Further, the television device provided with the format conversion unit may convert the format of the audio/video signal transmitted by the external device into a data format which may be directly identified by the SoC chip, so that the format consistency of the audio/video signal transmitted by the external device is realized, the operation that the audio/video signal is subjected to format conversion by the SoC chip is reduced, and the guarantee for the subsequent operation on the SoC chip is improved.

Finally, the external device may also request the SoC chip to deliver power to the external device in addition to transmission of a data signal. In some embodiments, the controller is further configured to make the television device to deliver the power to the external device via a power delivery instruction on the CC pin when determining that the working mode of the external device is a USB PD.

Specifically, the controller may control the television device to deliver the power to the external device via connection with the television device and the external device respectively when determining that the working mode of the external device is a power delivery mode. Specifically, the controller may realize the process of power delivery from the television device to the external device via the power delivery instruction via the CC pin of the Type-C interface.

In some embodiments, by taking a computer with a Type-C interface as the external device and a television as the television device and making a format of an audio/video signal received by the television be an HDMI format, the specific process of data transmission performed by adopting the television device with the Type-C interface in the present embodiment is as follows.

When each module in the television device is normally connected and the television and the computer are respectively and reliably connected to the Type-C interface of the television device, the controller in the television device may determine the working mode of the computer via the CC signal in the CC pin.

When the working mode of the computer is the USB mode, the controller selects the USB D+/D− signal pin to work to connect to the interface for transmitting the USB D+/D− signal in the SoC chip, so that data in the computer may be transmitted to the television via the selective switch unit. The controller may also select the TX1/RX1 and TX2/RX2 pins to work to connect with the interface for transmitting the USB SSTX/SS RX signal in the SoC chip, so that the data in the computer may be transmitted to the television via the multiplexing switch unit. No matter which way in the above-mentioned ways is selected, at the moment, the television is used as a DFP.

When the working mode of the computer is the Alt Mode, the controller may select the USB D+/D− signal pin to work to connect to the interface for transmitting the billboard information in the controller, and thus, the computer may firstly acquire the billboard information from a television side. At the moment, a billboard module storing the billboard information is used as a UFP. In addition, when the billboard information indicates that information interaction of the television and the computer is abnormal, the computer may perform the operation of reconnecting the Type-C interface, or the computer may regulate the working mode itself, so that the aim of transmitting the data to the television is achieved. When the computer does not acquire the billboard information, the format conversion unit may perform format conversion on the audio/video signal firstly, and then, the controller selects the TX1/RX1 and TX2/RX2 pins to work to connect to the interface for transmitting the audio/video signal in the SoC chip and may transmit the format-converted audio/video signal to the television.

In some embodiments, in the above-mentioned embodiment, the DFP interface on the SOC chip 210 includes a USB2.0 interface and a USB3.0 interface. When the external device of the USB Type-C interface 230 is a USB2.0 device, a USB2.0 signal is interacted between the DFP interface and the USB2.0 device externally connected to the USB Type-C interface 230 via the first channel; or when the external device of the USB Type-C interface 230 is a USB3.0 device, a USB3.0 signal is interacted between the DFP interface and the USB3.0 device externally connected to the USB Type-C interface 230 via the third channel.

In some embodiments, in the above-mentioned embodiment, the UFP interface in the Type-C interface master control module 220 is a billboard signal output interface for outputting a billboard signal.

When the external device of the USB Type-C interface 230 is the ALT MODE device, if the interaction between the ALT MODE device and the SOC chip is abnormal, the billboard signal output interface may transmit the billboard signal to the ALT MODE device externally connected to the USB-Type-C interface 230 via the second channel; or if the interaction between the ALT MODE device and the SOC chip is normal, the HDMI signal is interacted between the HDMI interface and the ALT MODE device externally connected to the USB-Type-C interface 230 via the fourth channel.

In some embodiments, in the above-mentioned embodiment, the USB Type-C interface master control module 220 and the multiplexing switch 250 are integrated on different chips, or the multiplexing switch 250 and the USB Type-C interface master control module 220 are integrated on the same chip.

Based on module functions of the television device in the above-mentioned embodiment of this application, further provided is a control method of the television device to realize the switching between selectable links of a USB2.0 signal and a billboard signal and the switching between selectable links of a USB3.0 signal and a DP signal. Specifically, the control method mainly includes that:

a USB Type-C interface master control module 220 transmits a first control signal or a second control signal to a switch module 240, where the first control signal is configured to control the switch module 240 to turn on a first channel and turn off a second channel, and the second control signal is configured to control the switch module 240 to turn on the second channel and turn off the first channel.

In some embodiments, before the USB Type-C interface master control module 220 transmits the first control signal, the control method further includes that: a CC signal is interacted between the USB Type-C interface master control module 220 and a USB Type-C interface 230; and a type of an external device of the USB Type-C interface 230 is identified according to the CC signal.

In some embodiments, the step that the USB Type-C interface master control module 220 transmits the first control signal or the second control signal to the switch module 240 includes that: the first control signal is transmitted to the switch module 240 when the external device of the USB Type-C interface 230 is identified to be a USB device; and the second control signal is transmitted to the switch module 240 when the external device of the USB Type-C interface 230 is identified to be an ALT MODE device.

In some embodiments, the USB Type-C interface master control module 220 further transmits a third control signal to a multiplexing switch 250 when it is determined that the external device of the USB Type-C interface 230 is the USB device, where the third control signal is configured to control the multiplexing switch 250 to turn on a third channel and turn off a fourth channel; and the USB Type-C interface master control module 220 further transmits a fourth control signal to the multiplexing switch 250 when it is determined that the external device of the USB Type-C interface 230 is the ALT MODE device, where the fourth control signal is configured to control the multiplexing switch 250 to turn on the fourth channel and turn off the third channel.

In the above-mentioned embodiment, based on the control method executed by the USB Type-C interface master control module 220 in the television device, the switching between the gateable links of the USB2.0 signal and the billboard signal is realized, and the compatibility between a USB2.0 signal transmission function and a billboard signal transmission function may be realized. When the USB device is externally connected to the USB Type-C interface 230, a first control signal is transmitted to the switch module 240, a link between the USB device and the SOC chip 210 is selected to work to connect a USB D+/D− differential terminals of the USB Type-C interface 230 to a pin for inputting a USB D+/D− signal in the SoC chip 210, so that the transmission function of the USB2.0 signal is realized. When the ALT MODE device is externally connected to the USB Type-C interface 230, a second control signal is transmitted to the switch module 240, a link between the billboard signal output port and the ALT MODE device is turned on to connect the USB D+/D− differential terminals of the USB Type-C interface 230 to a pin for inputting a USB D+/D− signal in a PD module, and so that the Billboard function is realized.

Firstly, the specific process is described in detail on the basis of the embodiment of the above-mentioned method in combination with FIG. 3 and FIG. 4.

In some embodiments, the USB D+/D− signal in the external device is transmitted to the SoC chip when the working mode (type) of the external device is determined to be the USB mode.

The billboard information is transmitted to the external device when the working mode of the external device is determined to be an Alt Mode to make the external device perform the operation indicated by the billboard information.

Specifically, as shown in FIG. 3, when the controller determines that the working mode of the external device is the USB mode, the television device may select the USB D+/D− signal pin to work to connect to the interface for transmitting the USB D+/D− signal in the SoC chip, in this way, the television device may provide a channel for transmitting the USB D+/D− signal to the external device, so that the USB D+/D− signal in the external device is transmitted to the SoC chip.

Further, as shown in FIG. 4, the controller may select the USB D+/D− signal pin to work to connect to the interface for transmitting the billboard information in the controller when determining that the working mode of the external device is the Alt Mode, in this way, the billboard information is transmitted to the external device to make the external device perform the operation indicated by the billboard information, so that the external device may monitor whether an abnormal condition may appear in a process of information interaction between the SoC chip and the external device in real time.

Secondarily, the transmitted data may be of various types due to different working modes of the external device, in order to transmit the various types of data in the external device, the television device further includes a multiplexing switch unit, where the multiplexing switch unit is respectively connected to the USB Type-C interface, the controller and the SoC chip.

In some embodiments, a USB SSTX/SS RX signal in the external device is transmitted to the SoC chip according to the working mode of the external device; or an audio/video signal in the external device is transmitted to the SoC chip according to the working mode of the external device.

Specifically, the television device may select TX1/RX1 and TX2/RX2 pins to work to connect to an interface for transmitting the USB SSTX/SS RX signal in the SoC chip according to the working mode of the external device so as to transmit the USB SSTX/SS RX signal in the external device to the SoC chip. The television device may also select the TX1/RX1 and TX2/RX2 pins to work to connect to an interface for transmitting the audio/video signal in the SOC chip according to the working mode of the external device to transmit the audio/video signal in the external device to the SoC chip.

Further, the external device has various working modes, so that a control device may determine the multiplexing switch unit to select different types of data channels to work according to the working mode of the external device, and thus, a specific process that the USB SSTX/SS RX signal in the external device is transmitted to the SoC chip according to the working mode of the external device or the audio/video signal in the external device is transmitted to the SoC chip according to the working mode of the external device is described in detail in combination with FIG. 3 and FIG. 4.

In some embodiments, the USB SSTX/SS RX signal in the external device is transmitted to the SoC chip when the working mode of the external device is determined to be a USB mode.

In some embodiments, the audio/video signal in the external device is transmitted to the SoC chip when the working mode of the external device is determined to be an Alt Mode.

The billboard information is transmitted to the external device when the working mode of the external device is determined to be the Alt Mode to make the external device perform the operation indicated by the billboard information.

Specifically, as shown in FIG. 3, the television device may select the TX1/RX1 and TX2/RX2 pins to work to connect to the interface for transmitting the USB SSTX/SS RX signal in the SoC chip when determining that the working mode of the external device is the USB mode, in this way, the television device may provide the channel to the external device for transmitting the USB SSTX/SS RX signal, so that it is convenient to transmit the USB SSTX/SS RX signal in the external device to the SoC chip in the television device.

Further, as shown in FIG. 4, when the television device determines that the working mode of the external device is the Alt MODE, the controller may select the TX1/RX1 and TX2/RX2 pins to work to connect to the interface for transmitting the audio/video signal in the SoC chip, in this way, the television device may provide the channel to the external device for transmitting the audio/video signal, so that it is convenient to transmit the audio/video signal in the external device to the SoC chip in the television device.

Secondarily, the audio/video signal in the external device has various formats, in order to make the television device realize the format consistency of the audio/video signal, in some embodiments, the audio/video signal transmitted by the selective switch unit is subjected to format conversion to obtain the format-converted audio/video signal.

Specifically, in the present embodiment, the television device may perform format conversion on the audio/video signal to obtain the format-converted audio/video signal. The format-converted audio/video signal may be directly identified by the SoC chip, in this way, the format-converted audio/video signal may be transmitted to the SoC chip by the television device to be identified by the SoC chip, the operation that the audio/video signal is subjected to format conversion by the SoC chip is reduced, and the guarantee for the subsequent operation on the SoC chip is improved.

Finally, the power delivery to the external device may also be realized via the television device. In some embodiments, a power delivery instruction is set when the working mode of the external device is determined to be a USB PD, so that the television device delivers power to the external device.

Specifically, the television device may be connected to the external device to identify the working mode of the external device. When the external device requests to deliver the power to the external device, the CC signal on the CC pin may be set as the power delivery instruction, so that the television device may determine that the working mode of the external device is the USB PD, and furthermore, the process that the television device delivers the power to the external device may be completed.

The present embodiment provides a computer readable storage medium in which a computer program is stored, the technical scheme of the embodiment of each of the above-mentioned methods of the data communication method according to the present disclosure is implemented when the computer program is executed by a processor, the implementation principles and technical effects of the technical schemes are similar, the descriptions thereof are omitted herein.

Figure 6:
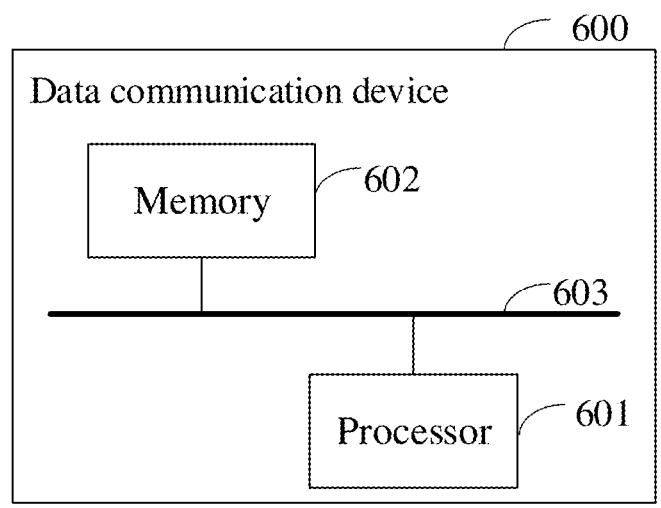
FIG. 6 is a schematic structural diagram of a data communication device according to some embodiments of the present disclosure.

FIG. 6 is a schematic structural diagram of a data communication device according to the present disclosure, as shown in FIG. 6, the data communication device 600 may include:

a processor 601; and a memory 602 configured to store an executable instruction of the processor 601;

where the processor 601 is configured to execute a data communication method by executing the executable instruction, the method is applied to a television device with a USB Type-C terminal; the television device includes the USB Type-C interface, a controller, a selective switch unit and an SoC chip, where the USB Type-C interface is configured to be connected to an external device, the controller is respectively connected to the USB Type-C interface and the selective switch unit, and the selective switch unit is further connected to the SoC chip; and the method includes that:

a working mode of the external device is determined;

a USB D+/D− signal in the external device is transmitted to the SoC chip according to the working mode of the external device; or billboard information is transmitted to the external device according to the working mode of the external device to make the external device perform the operation indicated by the billboard information.

In some embodiments, the step that the USB D+/D− signal in the external device is transmitted to the SOC chip according to the working mode of the external device includes that:

the USB D+/D− signal in the external device is transmitted to the SoC chip when the working mode of the external device is determined to be a USB mode; and the step that the billboard information is transmitted to the external device according to the working mode of the external device to make the external device perform the operation indicated by the billboard information includes that:

the billboard information is transmitted to the external device when the working mode of the external device is determined to be an Alt Mode to make the external device perform the operation indicated by the billboard information.

In some embodiments, the television device further includes a multiplexing switch unit, where the multiplexing switch unit is respectively connected to the USB Type-C interface, the controller and the SoC chip; and the method further includes that:

a USB SSTX/SS RX signal in the external device is transmitted to the SoC chip according to the working mode of the external device; or an audio/video signal in the external device is transmitted to the SoC chip according to the working mode of the external device.

In some embodiments, the step that the USB SSTX/SS RX signal in the external device is transmitted to the SoC chip according to the working mode of the external device further includes that:

the USB SSTX/SS RX signal in the external device is transmitted to the SoC chip when the working mode of the external device is determined to be a USB mode; and the step that the audio/video signal in the external device is transmitted to the SoC chip according to the working mode of the external device further includes that:

the audio/video signal in the external device is transmitted to the SoC chip when the working mode of the external device is determined to be an Alt Mode.

In some embodiments, the television device further includes a format conversion unit, where the format conversion unit is respectively connected to the selective switch unit and the SoC chip; and before the audio/video signal in the external device is transmitted to the SoC chip, the method further includes that:

format conversion is performed on an audio/video signal transmitted by the selective switch unit to obtain a format-converted audio/video signal.

In some embodiments, the working mode of the external device includes any one of USB2.0, USB3.0, USB3.1 and USB PD.

In some embodiments, the method further includes that:

a power delivery instruction is set when the working mode of the external device is determined to be the USB PD so that the television device delivers power to the external device.

When the memory 602 is a device independent from the processor 601, the data communication device 600 may further include: a bus 603 configured to connect the processor 601 with the memory 602.

The data communication device 600 according to the present embodiment may be configured to execute the technical scheme in some embodiments of each of the above-mentioned methods, and the implementation principle and technical effect of the data communication device 600 are similar, the descriptions thereof are omitted herein.

Based on a module function of the television device in the above-mentioned embodiment of this application, further provided is circuit connection relationships among modules of a television device so as to realize the switching between selectable links of a USB2.0 signal and a billboard signal and the switching between selectable links of a USB3.0 signal and a DP signal. Specifically, the television device includes:

an SOC chip 210 provided with a USB D+/D− differential terminal for inputting or outputting a USB D+/D− signal and electrically connected to a USB D+/D− differential terminals according to a switch module 240 to form a selectable first channel;

a USB Type-C interface master control module 220 provided with a USB D+/D− differential terminal for inputting the USB D+/D− signal or outputting a billboard signal and electrically connected to the USB D+/D− differential terminals provided by the switch module 240 to form a selectable second channel; and a USB Type-C interface 230 provided with a USB D+/D− differential terminals for inputting or outputting the USB D+/D− signal and electrically connected to the USB D+/D− differential terminals provided by the switch module 240.

The USB Type-C interface master control module 220 is further provided with a control signal output pin for outputting a first control signal or a second control signal and electrically connected to a control signal input pin of the switch module 240; and the first control signal is configured to turn on the first channel and turn off the second channel, and the second control signal is configured to turn on the second channel and turn off the first channel.

In order to identify a type of an external device of the Type-C interface, in some embodiments, the USB Type-C interface master control module 220 is provided with a CC pin, the provided CC pin is electrically connected to a CC pin in the USB Type-C interface 230 and configured for inputting or outputting a CC signal so as to identify a type of an external device of a Type-C interface.

In order to realize the switching of the selectable links of the USB2.0 signal and the billboard signal, the USB Type-C interface master control module 220 is configured to input the first control signal to the control signal input pin of the switch module 240 when it is determined that an external device of the USB Type-C interface 230 is a USB device and to input the second control signal to the control signal input pin of the switch module 240 when it is determined that the external device of the USB Type-C interface 230 is an ALT MODE device.

In some embodiments, the television device further includes a multiplexing switch 250, and connection relationships between the multiplexing switch 250 and the SOC chip 210, between the multiplexing switch 250 and the USB Type-C interface 230 and between the multiplexing switch 250 and the USB Type-C interface master control module 220 are that:

the SOC chip 210 is further provided with a USB SSTX/RX differential terminals for inputting or outputting a USB3.0 signal and electrically connected to a USB SSTX/RX differential terminals of the multiplexing switch 250 to form a third channel;

the USB Type-C interface 230 is further provided with a USB SSTX/RX differential terminals for inputting or outputting the USB3.0 signal and electrically connected to the USB SSTX/RX differential terminals of the multiplexing switch 250;

the USB Type-C interface master control module 220 is further provided with a control signal output pin configured to output a third control signal and electrically connected to a control signal input pin of the multiplexing switch 250; and the third control signal is configured to turn on the third channel and turn off a fourth channel.

In some embodiments, the connection relationship between the multiplexing switch 250 and the SOC chip 210 further includes that:

the SOC chip 210 is further provided with an HDMI differential terminal for inputting or outputting an HDMI signal; the HDMI differential terminal is electrically connected to an HDMI differential terminal of the multiplexing switch 250 to form a selectable fourth channel;

the USB Type-C interface master control module 220 is further provided with a control signal output pin configured to output a fourth control signal and electrically connected to the other control signal input pin of the multiplexing switch 250; and the fourth control signal is configured to turn on the fourth channel and turn off the third channel.

In some embodiments, the television device further includes a protocol conversion module 260; and connection relationships between the protocol conversion module 260 and the SOC chip 210, between the protocol conversion module 260 and the USB Type-C interface 230 and between the protocol conversion module 260 and the USB Type-C interface master control module 220 are that:

the SOC chip 210 is further provided with an HDMI differential terminal for inputting or outputting an HDMI signal; the HDMI differential terminal is electrically connected to an HDMI differential terminal of the protocol conversion module 260;

the protocol conversion module 260 is further provided with DP differential terminals of a high definition digital display interface, the DP differential terminals is configured for inputting or outputting a DP signal; the DP differential terminals is electrically connected to DP differential terminals of the multiplexing switch 250 to form a selectable fourth channel the USB Type-C interface master control module 220 is further provided with a control signal output pin configured to output a fourth control signal and electrically connected to the other control signal input pin of the multiplexing switch 250; and the fourth control signal is configured to turn on the fourth channel and turn off the third channel.

When supporting the conversion between the DP signal and the HDMI signal, the SOC chip 210 further includes a high definition digital display interface, namely the DP interface for receiving or transmitting the DP signal; and the multiplexing switch 250 is further connected to the DP interface of the SOC chip 210 via a DP signal channel.

In order to realize the switching of the selectable links of the USB3.0 signal and the DP signal, the USB Type-C interface master control module 220 is configured to input the third control signal to the control signal input pin of the multiplexing switch 250 when it is determined that an external device of the USB Type-C interface 230 is a USB device and to input the fourth control signal to the control signal input pin of the multiplexing switch 250 when it is determined that the external device of the USB Type-C interface 230 is an ALT MODE device.

In the above-mentioned embodiment, by using the circuit connection relationships among the switch module 240, the USB Type-C interface master control module 220 and the SOC chip 210 and the control method, the compatibility between a USB2.0 signal transmission function and a billboard signal transmission function may be realized via the switching between the selectable links of the USB2.0 signal and the billboard signal. When the USB device is externally connected to the USB Type-C interface 230, a link between the USB device and the SOC chip 210 is turned on to connect the USB D+/D− differential terminals of the USB Type-C interface 230 to a pin for inputting a USB D+/D− signal in the SOC chip 210, so that the transmission function of the USB2.0 signal is realized. When the ALT MODE device is externally connected to the USB Type-C interface 230, a link between the billboard signal output port and the ALT MODE device is turned on to connect the USB D+/D− differential terminals of the USB Type-C interface 230 to a pin for inputting the USB D+/D− signal in a PD module, and furthermore, the Billboard function is realized.

Based on the above-mentioned embodiment, this application provides a specific implementation of a television device. It should be noted that the function of the USB Type-C interface master control module in the above-mentioned embodiment is realized by a Type-C interface master control chip, the function of the switch module is realized by a USB 2.0 selector switch 340, the function of the multiplexing switch is realized by an MUX chip (MUX for short below), the function of the protocol conversion module is realized by a protocol conversion chip, the detailed descriptions thereof are as follows.

Figure 7:
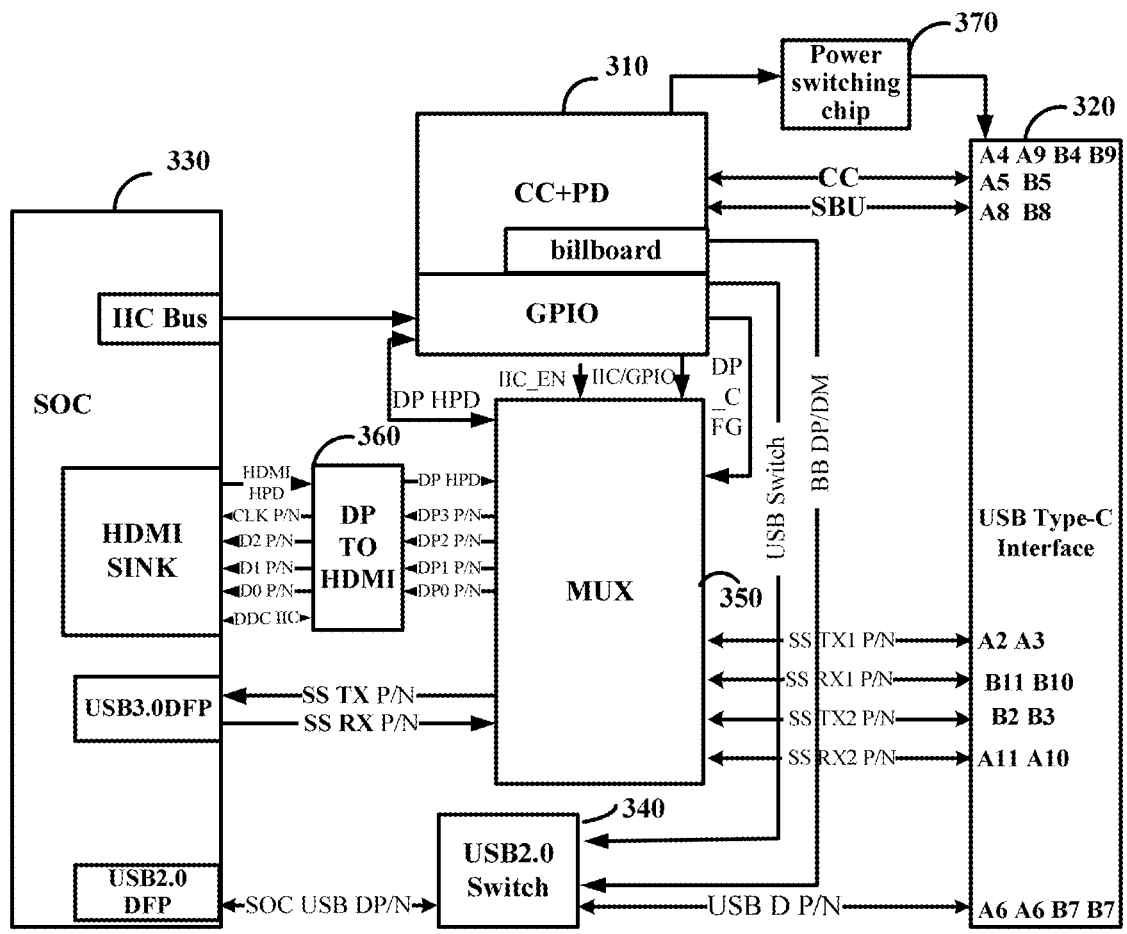
FIG. 7 is a schematic architectural diagram of a television device when the USB-Type-C interface is applied to the television device according to some embodiments of the present disclosure.

As shown in FIG. 7, the television device mainly includes a USB Type-C interface 320, a USB 2.0 selector switch 340, a C interface master control chip 310, a multiplexing switch chip MUX 350, a protocol conversion chip 360 (DP TO HDMI in FIG. 7) and an SOC chip 330.

The C interface master control chip 310 includes a CC module and a PD module. The CC module may be configured to perform CC communication with the USB Type-C interface 320, identify a type of an external device of the USB Type-C interface 320 and select the USB 2.0 selector switch 340 to work to connect to the SOC chip 330 or select the USB 2.0 selector switch 340 to work to connect to the PD module according to the type of the external device of the USB Type-C interface 320. When the USB 2.0 selector switch 340 is selected to connect to the PD module, a billboard signal is communicated between the PD module and an ALT MODE device, specifically, a USB D+/D− differential terminals of the USB Type-C interface 320 is connected to a pin for inputting a USB D+/D− signal in the PD module, and thus a Billboard function is realized. When the USB 2.0 selector switch 340 is selected to connect to the SOC chip 330, the USB D+/D− differential terminals of the USB Type-C interface 320 is connected to a pin for inputting the USB D+/D− signal in the SOC chip 330, so that a transmission function of a USB 2.0 signal is realized.

Specifically, when the external device of the USB Type-C interface 320 is a USB device, a link between the USB 2.0 selector switch 340 and a USB 2.0 interface on the SOC chip 330 is conducted, and therefore, the USB2.0 signal communication between the USB device externally connected to the USB Type-C interface 320 and the USB 2.0 interface on the SOC chip 330 is realized via a path between the USB 2.0 selector switch 340 and the USB Type-C interface 320. When the external device of the USB Type-C interface 320 is the ALT MODE device, a path between the USB 2.0 selector switch 340 and a Billboard signal output interface of the PD module is conducted, and therefore, the Billboard signal communication between the ALT MODE device externally connected to the USB Type-C interface 320 and the Billboard signal output interface is realized via the link between the USB 2.0 selector switch 340 and the USB Type-C interface 320.

A connection relationship among USB D+/D− differential terminals on the USB Type-C interface 320, the USB 2.0 selector switch 340 and the SOC chip 330 is described below in combination with FIG. 7.

As shown in FIG. 7, connecting terminals of the USB Type-C interface 320 mainly include a CC terminal, an SBU terminal, a power pin, a differential terminal and a grounding terminal. The CC terminal includes a terminal A5 and a terminal B5. The SBU terminal includes a terminal A8 and a terminal B8. The power pin includes a terminal A4, a terminal A9, a terminal B4 and a terminal B9. The differential terminal includes a terminal A2, a terminal B2, a terminal A3, a terminal B3, a terminal A6, a terminal B6, a terminal A7, a terminal B7, a terminal A10, a terminal B10, a terminal A11 and a terminal B11, where the terminal A2, the terminal B2, the terminal A3, the terminal B3, the terminal A10, the terminal B10, the terminal A11 and the terminal B11 are high-speed differential terminals, and the terminal A6, the terminal B6, the terminal A7 and the terminal B7 are low-speed differential terminals; and the grounding terminal includes a terminal A1, a terminal A12, a terminal B1 and a terminal B12. In a specific product structure, the connecting terminals of the USB Type-C interface 320 are arranged in two upper and lower layers, wherein A1-A12 respectively represent for 12 connecting terminals from left to right on the upper layer, and B1-B12 respectively represent for 12 connecting terminals from right to left on the lower layer.

In the above-mentioned embodiment, the USB D+/D− differential terminals of the USB Type-C interface 320 include two pairs: the terminal A6, the terminal B6, the terminal A7 and the terminal B7 which may be configured to transmit a USB2.0 signal or a Billboard signal in a protocol of the USB Type-C interface 320.

Accordingly, the USB 2.0 selector switch 340 includes two pairs of USB D+/D− differential terminals configured to be electrically connected to the two pairs of USB D+/D− differential terminals of the USB Type-C interface 320, specifically, via two USB D+/D− differential pairs, the two USB D+/D− differential pairs may be USB D P/N signal lines serving as USB data transmission lines in FIG. 7, and the USB D P/N signal lines are configured to transmit the USB2.0 signal.

The USB 2.0 selector switch 340 further includes the other two pairs of selectable USB D+/D− differential terminals, where one pair of selectable USB D+/D− differential terminals is electrically connected to a pair of USB D+/D− differential terminals of a PD module, specifically, via a USB D+/D− differential pair such as a BB DP/DM signal line serving as a USB data transmission line in FIG. 7, which may be configured to transmit the Billboard signal. The other pair of USB D+/D− differential terminals is electrically connected to a pair of USB D+/D− differential terminals on the SOC chip 330, specifically, via a USB D+/D− differential pair such as an SOC chip USB DP/N signal line serving as a USB2.0 data transmission line in FIG. 7, which may be configured to transmit the USB2.0 signal.

The SOC chip 330 includes a USB interface including a USB3.0 interface and a USB2.0 interface, or including a USB interface with the same USB signal processing function as the USB2.0 interface and the USB3.0 interface which may be regarded as a USB2.0 interface and USB3.0 interface compatible interface, and the USB interface is provided with USB D+/D− differential terminals and USB SSTX/RX differential terminals.

A connection relationship among USB SSTX/RX differential terminals on the USB Type-C interface 320, the multiplexing switch chip MUX 350 and the SOC chip 330 is described below in combination with FIG. 7.

In the above-mentioned embodiment, the USB SSTX/RX differential terminals on the USB Type-C interface 320 include four pairs (eight in total): the terminal A2, the terminal B2, the terminal A3, the terminal B3, the terminal A10, the terminal B10, the terminal A11 and the terminal B11 which may be configured to transmit a USB3.0 signal or a DP signal in a protocol of the USB Type-C interface 320.

A connection relationship between the multiplexing switch chip MUX 350 and the USB Type-C interface 320 is that:

the multiplexing switch chip MUX 350 includes four pairs of USB SSTX/RX differential terminals electrically connected to the four pairs of USB SSTX/RX differential terminals (the terminal A2, the terminal B2, the terminal A3, the terminal B3, the terminal A10, the terminal B10, the terminal A11 and the terminal B11) on the USB Type-C interface 320, specifically, via four USB SSTX/RX differential pairs such as SSTX1 P/N, SSRX1 P/N, SSTX2 P/N and SSRX2 P/N as shown in FIG. 7, where SSTX1 P/N is a selectable data signal line configured to make the USB Type-C interface 320 transmit the USB3.0 signal or the DP signal to the multiplexing switch chip MUX 350, and SSTX2P/N is the other selectable data signal line configured to make the USB Type-C interface 320 transmit the USB3.0 signal or the DP signal to the multiplexing switch chip MUX 350. SSRX1 P/N is a selectable data signal line configured to make the USB Type-C interface 320 receive the USB3.0 signal or the DP signal transmitted by the multiplexing switch chip MUX 350, and SSRX2P/N is the other selectable data signal line configured to make the USB Type-C interface 320 receive the USB3.0 signal or the DP signal transmitted by the multiplexing switch chip MUX 350.

The multiplexing switch chip MUX 350 further includes the other two pairs of USB SSTX/RX differential terminals electrically connected to the two pairs of USB SSTX/RX differential terminals on the SOC chip 330, specifically, via two USB SSTX/RX differential pairs such as SSTX P/N and SSRX P/N as shown in FIG. 7, where SSTX P/N is a selectable data signal line configured to make the multiplexing switch chip MUX 350 transmit the USB3.0 signal to the SOC chip 330, and SSRX P/N is the other gateable data signal line configured to make the multiplexing switch chip MUX 350 receive the USB3.0 signal transmitted by the SOC chip 330.

A connection relationship between DP differential terminals and HDMI differential terminals on the multiplexing switch chip MUX 350, the protocol conversion chip 360 and the SOC chip 330 is described below in combination with FIG. 7.

The multiplexing switch chip MUX 350 further includes a DP interface including four pairs of DP differential terminals electrically connected to the four pairs of DP differential terminals of the protocol conversion chip 360, specifically, via two DP signal channels such as DP0 P/N, DP1 P/N, DP2 P/N and DP3 P/N shown as FIG. 7 and configured to transmit a DP signal.

The protocol conversion chip 360 is configured to receive the DP signal transmitted by the multiplexing switch chip MUX 350, provide an HDMI signal to an HDMI interface after converting the DP signal into the HDMI signal or transmit the DP signal to the multiplexing switch chip MUX 350 after converting the HDMI signal provided by the HDMI interface into the DP signal.

The SOC chip 330 further includes the HDMI interface including four pairs of HDMI differential terminals electrically connected to the four pairs of HDMI differential terminals of the protocol conversion chip 360, specifically, via four HDMI signal channels such as D0 P/N, D1 P/N, D2 P/N and CLK P/N shown as FIG. 7 and configured to transmit three HDMI signals and one clock signal CLK.

The way that the C interface master control chip 310 identifies the type of the external device of the USB Type-C interface 320 is mainly realized as follows:

In some embodiments, a CC terminal of a CC module is electrically connected to a CC terminal of the USB Type-C interface 320, and the CC module may be configured to perform CC communication with the USB Type-C interface 320 so as to identify the type of the external device of the USB Type-C interface 320.

Specifically, the output end of the CC module includes a CC1 pin and a CC2 pin which are connected with the terminal A5 and the terminal B5 of the USB Type-C interface 320 via two CC signal lines (CC1 and CC2) to transmit a CC communication signal in the protocol of the USB Type-C interface 320.

The C interface master control chip 310 further includes a GPIO module, the SOC chip 330 further includes an IIC control module (IIC master) connected to the GPIO module so as to realize the bus control and system updating of the C interface master control chip 310. Contents relevant to system updating are omitted herein. The C interface master control chip 310 may perform bus control on the USB 2.0 selector switch 340 and the MUX via the GPIO module after identifying the type of the external device of the USB Type-C interface 320.

The process that the C interface master control chip 310 transmits a first control signal or a second control signal to the USB 2.0 selector switch 340 according to the type of the external device of the USB Type-C interface 320 is as follows:

the C interface master control chip transmits the first control signal or the second control signal to the USB 2.0 selector switch 340 via the GPIO module, the GPIO module provides a control signal output pin electrically connected to a control signal input pin of the USB 2.0 selector switch 340, specifically, via a control signal line such as a USB switch (SWITCH) signal line as shown in FIG. 7, the USB SWITCH signal line is configured to transmit the first control signal or the second control signal sent to the USB 2.0 selector switch 340 by the C interface control chip, the first control signal is configured to turn on a link between a USB D+/D− differential terminals of the SOC chip 330 and a USB D+/D− differential terminals of the USB 2.0 selector switch 340 and turn off a link between the USB D+/D− differential terminals in the PD module and the USB D+/D− differential terminals of the USB 2.0 selector switch 340. The second control signal is configured to turn off the link between the USB D+/D− differential terminals of the SOC chip 330 and the USB D+/D− differential terminals of the USB 2.0 selector switch 340 and turn on the link between the USB D+/D− differential terminals in the PD module and the USB D+/D− differential terminals of the USB 2.0 selector switch 340.

Specifically, if the link between the USB D+/D− differential terminals of the SOC chip 330 and the USB D+/D− differential terminals of the USB 2.0 selector switch 340 is a first channel as shown in an SOC chip USB DP/N signal line as shown in FIG. 7, the link between the USB D+/D− differential terminals in the PD module and the USB D+/D− differential terminals of the USB 2.0 selector switch 340 is a second channel such as a BB DP/DM signal line as shown in FIG. 7.

The C interface master control chip 310 may transmit the first control signal to the USB 2.0 selector switch 340 via the GPIO module when determining that the external device of the USB Type-C interface 320 is a USB device, and the first control signal is configured to control the USB 2.0 selector switch 340 to turn on the first channel and turn off the second channel. The C interface master control chip 310 may transmit the second control signal to the USB 2.0 selector switch 340 via the GPIO module when determining that the external device of the USB Type-C interface 320 is an ALT MODE device, at the moment, the USB SWITCH signal line is configured to transmit the second control signal transmitted to the USB 2.0 selector switch 340 by the C interface control chip, and the second control signal is configured to control the USB 2.0 selector switch 340 to turn on the second channel and turn off the first channel.

In some embodiments, the first control signal may be a high-level signal, and the second control signal may be a low-level signal.

The process that the C interface master control chip 310 transmits a third control signal or a fourth control signal to the multiplexing switch chip MUX 350 according to the type of the external device of the USB Type-C interface 320 is as follows.

In some embodiments, the GPIO module may also be connected to the multiplexing switch chip MUX 350 via an IIC bus, specifically, a link between the GPIO module and the MUX includes an IIC enabling signal line (IIC_EN) and an IIC/GPIO signal line configured to electrify the MUX.

In some embodiments, the C interface master control chip 310 transmits the third control signal or the fourth control signal to the MUX via the GPIO module. The GPIO module provides a control signal output pin electrically connected to a control signal input pin of the MUX, specifically, via a DP_CFG control signal line as shown in FIG. 7, the DP_CFG signal line is configured to transmit the third control signal transmitted from the C interface control chip to the MUX, and the third control signal is configured to turn on a link between a USB SSTX/RX differential terminals of the SOC chip 330 and a USB SSTX/RX differential terminals of the MUX and turn off a link between a TP differential terminal of the protocol conversion chip 360 and a TP differential terminal of the MUX.

The GPIO module is further provided with a control signal output pin electrically connected to the control signal input pin of the MUX, specifically, via a DP_CFG control signal line as shown in FIG. 7, the DP_CFG signal line is configured to transmit the fourth control signal transmitted from the C interface master control chip to the MUX, and the fourth control signal is configured to turn off the link between a USB SSTX/RX differential terminals of the SOC chip 330 and the USB SSTX/RX differential terminals of the MUX and turn on the link between the TP differential terminal of the protocol conversion chip 360 and the TP differential terminal of the MUX.

For example, the link between the USB SSTX/RX differential terminals of the SOC chip 330 and the USB SSTX/RX differential terminals of the MUX is a third channel, the link between the TP differential terminal of the protocol conversion chip 360 and the TP differential terminal of the MUX is a fourth channel.

The C interface master control chip 310 transmits the third control signal (C2) to the multiplexing switch chip MUX 350 when it is determined that the external device of the C interface is a USB device, and the third control signal is configured to control the multiplexing switch chip MUX 350 to turn on the third channel and turn off the fourth channel.

Specifically, the C interface master control chip 310 transmits the third control signal to the multiplexing switch chip MUX 350 via a DP_CFG signal line when it is determined that the external device of the C interface is the USB device according to the protocol of the USB Type-C interface 320, so that the multiplexing switch chip MUX 350 turns on a link (the differential pair SSTX P/N and the differential pair SSRX P/N) between a DFP interface and the multiplexing switch chip MUX 350 and turn off a link between the protocol conversion chip 360 and the multiplexing switch chip MUX 350, and a high-speed differential pair responding to the USB3.0 signal is selected, for example, in the four pairs of high-speed differential pairs between the multiplexing switch chip MUX 350 and the USB Type-C interface 320, SSTX1 P/N is selected to transmit an upstream USB3.0 signal to the MUX, and SSRX1 P/N is selected to transmit a downstream USB3.0 signal to the USB Type-C interface 320.

The C interface master control chip 310 transmits the fourth control signal to the multiplexing switch when it is determined that the external device of the C interface is the ALT MODE device, and the fourth control signal is configured to control the multiplexing switch to turn on the fourth channel and turn off the third channel.

Specifically, the C interface master control chip 310 transmits the fourth control signal to the multiplexing switch chip MUX 350 via a DP_CFG signal line (or SBU) when it is determined that the external device of the C interface is the ALT MODE device according to the protocol of the USB Type-C interface 320, so that the multiplexing switch chip MUX 350 turns on a link (the differential pair DP0 P/N, the differential pair DP1 P/N, the differential pair DP2 P/N and the differential pair DP3 P/N) between the protocol conversion chip 360 and the multiplexing switch chip MUX 350 and turn off a link (the differential pair SSTX P/N and the differential pair SSRX P/N) between the DFP interface and the multiplexing switch chip MUX 350, and high-speed differential pairs responding to the DP signal are selected, for example, in the four pairs of high-speed differential pairs between the multiplexing switch chip MUX 350 and the USB Type-C interface 320, SSTX1 P/N and SSTX2 P/N are selected to transmit the DP signal to the MUX, and SSRX1 P/N and SSRX2 P/N are selected to transmit the DP signal to the USB Type-C interface 320.

In some embodiments, before the DP signal or the HDMI signal is interacted between the external device of the USB Type-C interface 320 and an HDMI SINK, establishing HDMI HPD connection between the HDMI SINK and the external device of the USB Type-C interface 320 is further included.

In some embodiments, a link between the protocol conversion chip 360 and the HDMI SINK further includes a DDC (Display Data Channel) IIC signal line and an HDMI HPD signal line, and a link between the protocol conversion chip 360 and the MUX further includes a DP HPD signal line. A link between the MUX and the C interface master control chip 310 further includes a DP HPD signal line, where the HDMI HPD signal line is configured to transmit a hot plug signal of the HDMI, and the DP HPD signal line is configured to transmit a hot plug signal of the DP.

When hot plug HPD connection is established between a source television device (the external device of the USB Type-C interface 320) and a receiving television device (HDMI SINK), firstly, EDID data and HDCP secret key communication between the source television device (the external device of the USB Type-C interface 320) and the receiving television device (HDMI SINK) is performed via a DDC IIC signal line; due to the EDID communication, the source television device may know about the audio/video receiving capability of the receiving television device; and due to the HDCP secret key communication, the protection and authentication for the content of a data flow may be performed in real time, so that the aim of protecting the content of data is achieved.

Specifically, a propagation path for an HPD connection state from the source television device to the receiving television device is that the HPD connection state transmitted from the source television device sequentially reaches the protocol conversion module via an HDMI HPD signal line, reaches the MUX via a DP HPD signal line, then, reaches the C interface master control chip 310 via a DP HPD signal line between the MUX and the C interface master control chip 310 and reaches the USB Type-C interface 320 and the ALT MODE device externally connected to the USB Type-C interface 320, via a CC signal line between the C interface master control chip 310 and the USB Type-C interface 320.

In some embodiments, an output end of a CC+PD module is further connected to an SBU terminal of the USB Type-C interface 320 to perform SBU communication with the USB Type-C interface 320.

Specifically, the output end of the CC+PD module includes an SBU interface including an SBU1 pin and an SBU2 pin, and the two SBU pins are connected to the terminal A8 and the terminal B8 of the USB Type-C interface 320 via two SBU signal lines to transmit an SBU communication signal in the protocol of the USB Type-C interface 320.

In some embodiments, the device provided by some embodiments of the present disclosure further includes a power switching chip 370.

In some embodiments, the C interface master control chip 310 may be further configured to determine different power delivery demands of the external device of the USB Type-C interface 320 according to CC communication and control the power switching chip 370 to correspondingly deliver power to the external device of the USB Type-C interface 320 according to each power delivery demand. The output end of the power switching chip is connected to a power pin of the USB Type-C interface 320 to provide corresponding power delivery voltages to the external device of the USB Type-C interface 320 according to at least two power delivery demands of the external device of the USB Type-C interface 320.

Specifically, the output end of the power switching chip 370 includes four VBus output terminals, the four VBus output terminals are connected to the terminal A4, the terminal A9, the terminal B4 and the terminal B9 of the USB Type-C interface 320 via four power control signal lines to transmit corresponding power delivery voltages VBus according to the different power delivery demands of the external device of the USB Type-C interface 320.

Based on the above-mentioned circuit structure and the corresponding connection relationships, an embodiment of the present disclosure provides an information transmission method when different devices are connected to a USB Type-C interface 320.

Example I

Figure 8:
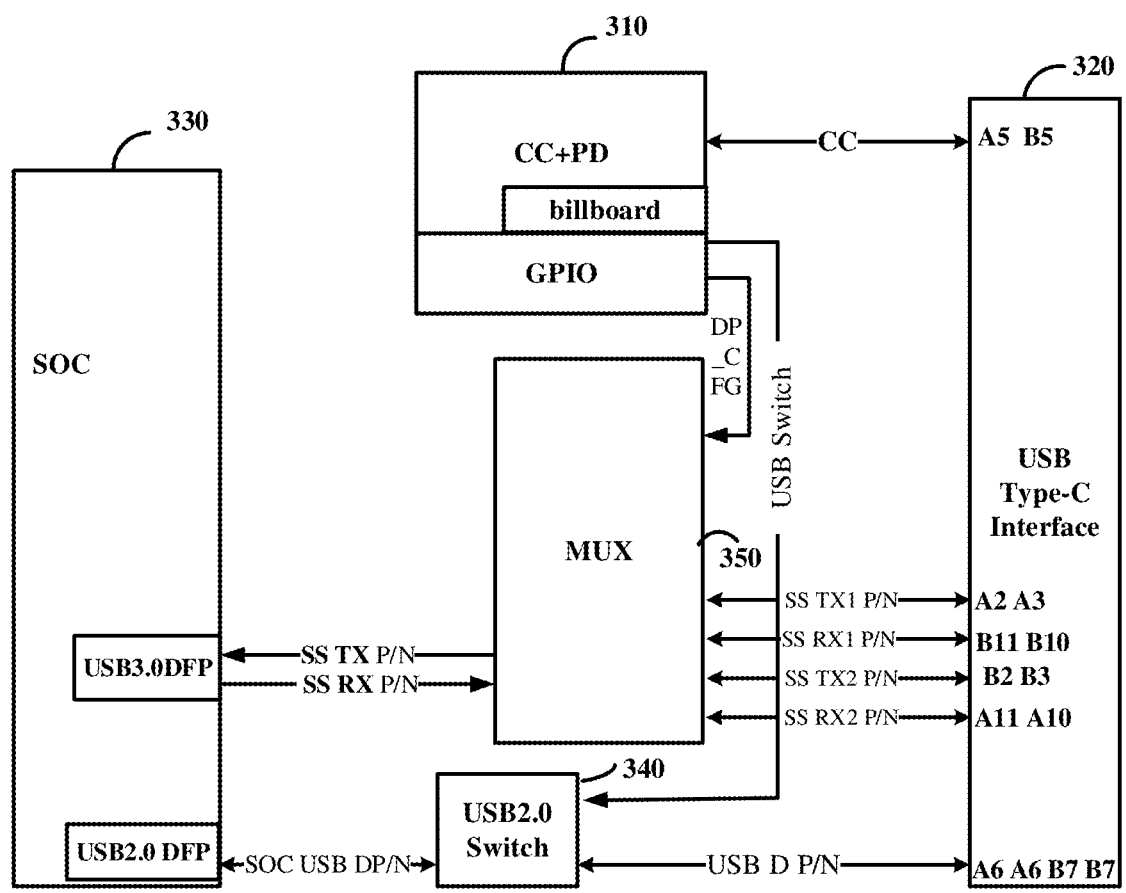
FIG. 8 is a schematic structural diagram of a circuit of the television device in a working state when a USB device is externally connected to the USB-Type-C interface according to some embodiments of the present disclosure.

When the USB Type-C interface 320 is connected to a USB2.0 device, the information transmission method provided by some embodiments of the present disclosure, in combination with the circuit structure as shown in FIG. 8, includes the following steps.

Step 101, when two pairs of USB D+/D− differential terminals (a terminal A6, a terminal B6, a terminal A7 and a terminal B7) of the USB Type-C interface 320 have a response, the USB Type-C interface 320 performs CC communication with a CC module of a C interface master control chip 310 via a CC signal line to report response information of the two pairs of USB D+/D− differential terminals of the USB Type-C interface 320.

Step 102, the CC module transmits a first control signal via a USB SWITCH signal line between a GPIO module and a USB 2.0 selector switch 340 when it is determined that an external device of the USB Type-C interface 320 is a USB device according to the response information of the CC communication, the first control signal indicates the USB 2.0 selector switch 340 to turn on a link between USB D+/D− differential terminals of an SOC chip 330 and USB D+/D− differential terminals of the USB 2.0 selector switch 340 and turn off a link between USB D+/D− differential terminals of a PD module and the other USB D+/D− differential terminals of the USB 2.0 selector switch 340.

In step 102, the CC module further transmits a third control signal via a DP_CFG signal line between the GPIO module and an MUX when it is determined that the external device of the USB Type-C interface 320 is the USB device, the third control signal indicates the MUX to turn on a link between USB SSTX/RX differential terminals of the SOC chip 330 and USB SSTX/RX differential terminals of the MUX and turn off a link between DP differential terminals of a protocol conversion chip 360 and DP differential terminals of the MUX.

Step 103, the USB 2.0 selector switch 340 turns on the link between the USB D+/D− differential terminals of the SOC chip 330 and the USB D+/D− differential terminals of the USB 2.0 selector switch 340 and turns off the link between the USB D+/D− differential terminals of the PD module and the other USB D+/D− differential terminals of the USB 2.0 selector switch 340.

Step 103 further includes that: the MUX turns on the link between the USB SSTX/RX differential terminals of the SOC chip 330 and the USB SSTX/RX differential terminals of the MUX and turns off the link between the DP differential terminals of the protocol conversion chip 360 and the DP differential terminals of the MUX according to the third control signal transmitted via the DP_CFG signal line, for example, SSTX1 P/N and SSRX1 P/N are turned on, but no USB3.0 signals are transmitted in a turned-on link between the USB Type-C interface 320 and a DFP interface of the SOC chip 330 in a process of data interaction between the USB2.0 device and the SOC chip 330.

Step 104, the USB2.0 device externally connected to the USB Type-C interface 320 transmits an upstream USB2.0 signal to the DFP interface of the SOC chip 330, and a transmission path of the upstream USB2.0 signal is that: the upstream USB2.0 signal is transmitted from the USB2.0 device to the USB D+/D− differential terminals (the terminal A6 and the terminal B6) of the USB Type-C interface 320 and is finally transmitted to the USB D+/D− differential terminals of the SOC chip 330 via a USB DP/N signal line (a low-speed USB D+/D− differential pair) between the USB Type-C interface 320 and the USB 2.0 selector switch 340 and an SOC chip USB DP/N signal line (a low-speed USB D+/D− differential pair) between the USB 2.0 selector switch 340 and the SOC chip 330.

Step 105, the USB D+/D− differential terminals of the SOC chip 330 transmits a downstream USB2.0 signal to the USB2.0 device externally connected to the USB Type-C interface 320, and a transmission path of the downstream USB2.0 signal is that: the downstream facing USB2.0 signal is transmitted from the USB D+/D− differential terminals of the SOC chip 330 to the SOC chip USB DP/N signal line (the low-speed USB D+/D− differential pair) between the USB 2.0 selector switch 340 and the SOC chip 330, is then transmitted from the USB DP/N signal line (the low-speed USB D+/D− differential pair) between the USB Type-C interface 320 and the USB 2.0 selector switch 340 to the USB D+/D− differential terminals (the terminal A7 and the terminal B7) of the USB Type-C interface 320 and is finally transmitted to the USB2.0 device.

Example II

When the USB Type-C interface 320 is connected to a USB3.0 device, the information transmission method provided by some embodiments of the present disclosure, in combination with the circuit structure as shown in FIG. 8, specifically includes the following steps.

Step 201, when two pairs of USB SSTX/RX differential terminals (such as a terminal A2, a terminal A3, a terminal B10 and a terminal B11) of the USB Type-C interface 320 have responses, the USB Type-C interface 320 performs CC communication with a CC module of a C interface master control chip 310 via a CC signal line to report response information of the two pairs of USB SSTX/RX differential terminals of the USB Type-C interface 320.

Step 202, the CC module transmits a third control signal via a DP_CFG signal line between a GPIO module and an MUX when it is determined that an external device of the USB Type-C interface 320 is a USB device according to the response information of the CC communication, the third control signal indicates the MUX to turn on a link between USB SSTX/RX differential terminals of an SOC chip 330 and USB SSTX/RX differential terminals of the MUX and turn off a link between DP differential terminals of a protocol conversion chip 360 and a DP differential terminals of the MUX.

In step 202, the CC module further transmits a first control signal via a USB SWITCH signal line between the GPIO module and a USB 2.0 selector switch 340 when it is determined that the external device of the USB Type-C interface 320 is the USB device, the first control signal indicates the USB 2.0 selector switch 340 to turn on a link between USB D+/D− differential terminals of an SOC chip 330 and a pair of USB D+/D− differential terminals of the USB 2.0 selector switch 340 and turn off a link between USB D+/D− differential terminals of a PD module and the other pair of USB D+/D− differential terminals of the USB 2.0 selector switch 340.

Step 203, the MUX turns on a link between USB SSTX/RX differential terminals of the SOC chip 330 and USB SSTX/RX differential terminals of the MUX and turns off a link between DP differential terminals of a protocol conversion chip 360 and DP differential terminals of the MUX according to the third control signal transmitted by the DP_CFG signal line, two pairs of USB SSTX/RX differential pairs between the USB Type-C interface 320 and the MUX are selected to be turned on, for example, SSTX1 P/N and SSRX1 P/N are turned on, where SSTX1 P/N is configured to transmit an upstream USB3.0 signal to the MUX, and SSRX1 P/N is configured to transmit a downstream USB3.0 signal to the USB Type-C interface 320.

Step 203 further includes that: the USB 2.0 selector switch 340 turns on the link between the USB D+/D− differential terminals of the SOC chip 330 and the USB D+/D− differential terminals of the USB 2.0 selector switch 340 and turns off the link between the USB D+/D− differential terminals of the PD module and the other pair of USB D+/D− differential terminals of the USB 2.0 selector switch 340 according to the first control signal transmitted via the USB SWITCH signal line, but no USB2.0 signal is transmitted in the turned-on links between the USB Type-C interface 320 and the USB 2.0 selector switch 340 and between the USB 2.0 selector switch 340 and the SOC chip 330 in a process of data interaction between the USB3.0 device and the SOC chip 330.

Step 204, the USB3.0 device externally connected to the USB Type-C interface 320 transmits an upstream USB3.0 signal to the USB SSTX/RX differential terminals of the SOC chip 330, and a transmission path of the upstream USB3.0 signal is that: the upstream USB3.0 signal is transmitted from the USB3.0 device to a pair of USB SSTX/RX differential terminals (such as the terminal A2 and the terminal A3) of the USB Type-C interface 320 and is finally transmitted to the USB SSTX/RX differential terminals of the SOC chip 330 via SSTX1 P/N between the USB Type-C interface 320 and the MUX and SSRX P/N between the MUX and the DFP interface of the SOC chip 330.

Step 205, the USB SSTX/RX differential terminals of the DFP interface of the SOC chip 330 transmits a downstream USB3.0 signal to the USB3.0 device externally connected to the USB Type-C interface 320, and a transmission path of the downstream USB3.0 signal is that: the downstream USB3.0 signal is transmitted from the USB SSTX/RX differential terminals of the DFP interface of the SOC chip 330 to SSTX1 P/N between the MUX and the SOC chip 330, is then transmitted from SSTX1 P/N between the USB Type-C interface 320 and the MUX to a pair of USB SSTX/RX differential terminals (such as the terminal B10 and the terminal B11) of the USB Type-C interface 320 and is finally transmitted to the USB3.0 device.

Example III

Figure 9:
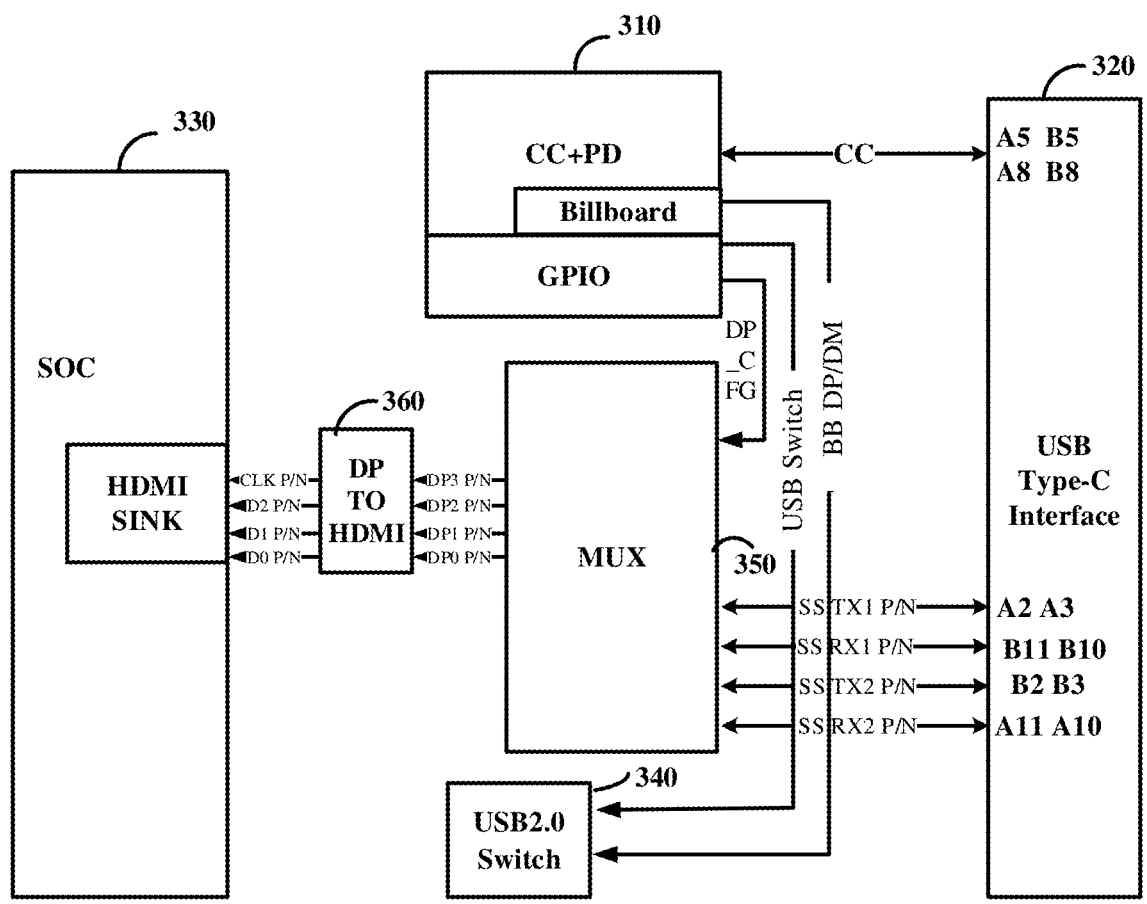
FIG. 9 is a schematic structural diagram of the circuit of the television device in the working state when an ALT MODE device is externally connected to the USB-Type-C interface according to some embodiments of the present disclosure.

When the USB Type-C interface 320 is connected to an ALT MODE device, the information transmission method provided by some embodiments of the present disclosure, in combination with a circuit structure as shown in FIG. 9, specifically includes the following steps.

Step 301, when USB SSTX/RX differential terminals (such as a terminal B2, a terminal B3, a terminal A10 and a terminal A11) of the USB Type-C interface 320 have responses, the USB Type-C interface 320 performs CC communication with a CC module of a C interface master control chip 310 via a CC signal line to report response information of the four high-speed differential terminals of the USB Type-C interface 320.

Step 302, the CC module transmits a fourth control signal via a DP_CFG signal line between a GPIO module and an MUX when it is determined that an external device of the USB Type-C interface 320 is the ALT MODE device according to the response information of the CC communication, the fourth control signal indicates the MUX to turn off a link between USB SSTX/RX differential terminals of an SOC chip 330 and USB SSTX/RX differential terminals of the MUX and turn on a link between DP differential terminals of a protocol conversion chip 360 and DP differential terminals of the MUX, SSTX1 P/N and SSTX2 P/N are selected to transmit an upstream DP signal to an HDMI SINK, and SSRX1 P/N and SSRX2 P/N are selected to transmit a downstream DP signal to the ALT MODE device externally connected to the USB Type-C interface 320.

In the step 302, the CC module further transmits a second control signal via a USB SWITCH signal line between the GPIO module and a USB 2.0 selector switch 340 when it is determined that the external device of the USB Type-C interface 320 is a USB device, the second control signal indicates the USB 2.0 selector switch 340 to turn off a link between USB D+/D− differential terminals of an SOC chip 330 and USB D+/D− differential terminals of the USB 2.0 selector switch 340 and turn on a link between USB D+/D− differential terminals of a PD module and the other pair of USB D+/D− differential terminals of the USB 2.0 selector switch 340.

Step 303, the MUX turns off a link between USB SSTX/RX differential terminals of the SOC chip 330 and USB SSTX/RX differential terminals of the MUX and turns on a link between DP differential terminals of a protocol conversion chip 360 and DP differential terminals of the MUX according to the fourth control signal transmitted by the DP_CFG signal line, four pairs of high-speed differential pairs between the USB Type-C interface 320 and the MUX are all selected to be turned on, where SSTX1 P/N and SSTX2 P/N are configured to transmit the upstream DP signal to the HDMI SINK, and SSRX1 P/N and SSRX2 P/N are selected to transmit the downstream DP signal to the ALT MODE device externally connected to the USB Type-C interface 320.

Step 303 further includes that: the USB 2.0 selector switch 340 turns off the link between the USB D+/D− differential terminals of the SOC chip 330 and the USB D+/D− differential terminals of the USB 2.0 selector switch 340 and turns on the link between the USB D+/D− differential terminals of the PD module and the other path of USB D+/D− differential terminals of the USB 2.0 selector switch 340 according to the second control signal transmitted via the USB SWITCH signal line, but no Billboard signal is transmitted in the turned-on links between the USB Type-C interface 320 and the USB 2.0 selector switch 340 and between the USB 2.0 selector switch 340 and the USB D+/D− differential terminals of the PD module when data transmission between the ALT MODE device and the SOC chip 330 is normal, and the Billboard signal is transmitted in the turned-on links between the USB Type-C interface 320 and the USB 2.0 selector switch 340 and between the USB 2.0 selector switch 340 and the USB D+/D− differential terminals of the PD module only when the data transmission between the ALT MODE device and the SOC chip 330 is abnormal.

Step 304, a DP device externally connected to the USB Type-C interface 320 transmits an upstream DP signal, and a transmission path of the upstream DP signal is that: the upstream DP signal is transmitted from the ALT MODE device to USB SSTX/RX differential terminals (such as the terminal B2 and the terminal B3) of the USB Type-C interface 320, then is transmitted to the protocol conversion chip 360 via SSTX2 P/N between the USB Type-C interface 320 and the MUX and a differential pair DP0 P/N between the MUX and the protocol conversion chip 360, and is converted into an HDMI signal by the protocol conversion chip 360, then the HDMI signal is finally transmitted to an HDMI differential terminal of the SOC chip 330 via the differential pair DP0 P/N, a differential pair DP1 P/N, a differential pair DP2 P/N and a differential pair CLK P/N.

Step 305, the HDMI differential terminal of the SOC chip 330 transmits a downstream HDMI signal to the ALT MODE device externally connected to the USB Type-C interface 320, and a transmission path of the downstream HDMI signal is that: the downstream HDMI signal is transmitted from the HDMI differential terminal of the SOC chip 330 to the protocol conversion chip 360 and is converted into a DP signal by the protocol conversion chip 360, and then, the DP signal is transmitted to the MUX via the differential pair DP0 P/N, then transmitted to USB SSTX/RX differential terminals (such as the terminal A10 and the terminal A11) of the USB Type-C interface 320 via SSRX2 P/N between the MUX and the USB Type-C interface 320 and is finally transmitted to the ALT MODE device.

Step 306, when the data transmission is abnormal, the SOC chip 330 stores abnormal information into the PD module via an IIC bus and interacts with the external DP device via the turned-on links between the PD module and the USB 2.0 selector switch 340 and between the USB 2.0 selector switch 340 and the USB Type-C interface 320 to determine the abnormal cause.

Based on the above-mentioned embodiment, this application provides specific implementation of another television device, and the television device may be a television with a USB Type-C interface. It should be noted that the USB Type-C interface master control module in the above-mentioned embodiment is realized by a microprocessor chip, the function of the switch module is realized by a switch device, the function of the multiplexing switch is realized by a multiplexing switch chip, the function of the protocol conversion module is realized by a protocol conversion chip, the detailed descriptions thereof are as follows.

Figure 10:
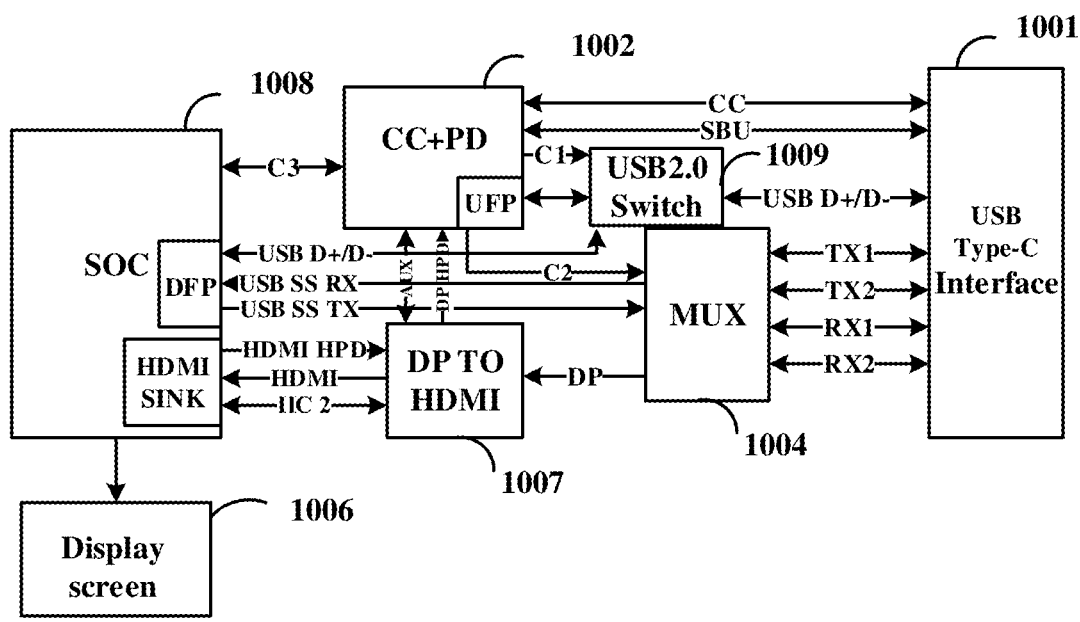
FIG. 10 is a schematic architectural diagram of a television with the USB TYPE-C interface according to some embodiments of the present disclosure.

Referring to FIG. 10 which is a schematic structural diagram of the television with the USB TYPE-C interface provided by the present disclosure. The present disclosure provides the television 10 including a USB Type-C interface 1001, a microprocessor chip 1002, a multiplexing switch chip 1004, a display screen 1006, a DP-HDMI module 1007, an SOC chip 1008 and a switch device 1009.

The SOC chip (System on a chip) 1008 is provided with a USB DFP interface and is configured to realize a USB 3.0/2.0 DFP function; and the SOC chip 1008 is configured for receiving an HDMI input signal and may be used as a USB DFP device (a USB host device) conforming to a USB2.0/3.0 protocol. For example, the SOC chip 1008 includes an IIC host module for implementing IIC control and firmware updating, a USB3.0 DFP module for implementing a USB3.0 DFP function, an HDMI SINK module for implementing an HDMI SINK function and a USB2.0 DFP module for implementing a USB2.0 DFP function.

An input pin of the multiplexing switch chip 1004 is connected to TX1/RX1 and TX2/RX2 pins of the USB Type-C interface 1001, and an output pin of the multiplexing switch chip 1004 is connected to a USB SSTX/SSRX signal of the SOC chip 1008 or the DP-HDMI module 1007, and the multiplexing switch chip 1004 is configured to perform switch selecting between a DFP interface and an HDMI interface of the SOC chip 1008.

The DP-HDMI module 1007 is configured to convert a DP signal into an HDMI signal to be displayed by the SOC chip 1008. It may be understood that the DP-HDMI module 1007 may be omitted if the SOC chip 1008 supports direct DP (DISPLAYPORT) signal input. The DP signal is an audio/video signal of a DP protocol. For example, the DP-HDMI module 1007 selects a PS176 conversion chip.

The switch device 1009 is configured to switch a USB2.0/3.0 path between a USB DFP interface of the SOC chip 1008 and a billboard UFP interface of the microprocessor chip and is connected to the USB Type-C interface 1001 when there are different demands. The USB Type-C interface 1001 is connected to the USB DFP interface of the SOC chip 1008 via a USB D+/D− path as default.

The microprocessor chip 1002 is a controller supporting USB Type-C CC (Channel Configuration) communication and a PD (POWER DELIVERY) protocol, on the one hand, the microprocessor chip 1002 controls the switching of the multiplexing switch chip 1004 to adapt to the forward and backward plug of an external device; and on the other hand, the microprocessor chip 1002 communicates a CC signal and an SBU signal with outside and is provided with the billboard UFP interface which is configured to output a billboard signal in an ALT MODE and is used as a DP UFP device (namely a DP slave device).

Specifically, the USB Type-C interface 1001 includes a terminal transmitting a CC signal, a terminal transmitting an SBU signal, a terminal transmitting a USB D+/D− signal, a terminal transmitting a TX1 signal, a terminal transmitting a TX2 signal, a terminal transmitting an RX1 signal, a terminal transmitting an RX2 signal and a terminal for power supply.

The microprocessor chip 1002 includes a pin for communicating the CC signal of the USB Type-C interface 1001, a pin for communicating the SBU signal of the USB Type-C interface 1001, a pin for communicating the USB D+/D− signal (via the switch device 1009) of the USB Type-C interface 1001, a pin for outputting a control signal C1, a pin for outputting a control signal C2, a pin for transmitting a communication signal C3, a pin for inputting a DP HPD signal and a pin for transmitting an AUX signal.

The multiplexing switch chip 1004 includes a pin for communicating a control signal C2, a pin connected to a pin for inputting a USB SSTX/RX signal, of the SOC chip 1008, a pin connected to a pin for inputting a DP signal, of the DP-HDMI module 1007 and pins connected to TX1, TX2, RX1 and RX2 terminals of the USB Type-C interface 1001.

The DP-HDMI module 1007 includes a pin for inputting a DP signal, a pin for outputting an HDMI signal, a pin for inputting an HDMI HPD signal, a pin for transmitting an IIC 2 signal, a pin for outputting a DP HPD signal and a pin for transmitting an AUX signal.

The SOC chip 1008 includes a pin for inputting a USB D+/D− signal, a pin for inputting a USB SSTX/RX signal, a pin for outputting an HDMI HPD signal, a pin for inputting an HDMI signal, a pin for transmitting an IIC 2 signal and a pin for transmitting a communication signal C3.

The switch device 1009 includes a pin for communicating a control signal C1, a pin for inputting a USB D+/D− signal, a pin for outputting a pair of USB D+/D− signal to the microprocessor chip 1002 and a pin for outputting the other pair of USB D+/D− signal to the SOC chip 1008.

For example, the microprocessor chip 1002 selects an RTS5440 processor supporting CC communication and the PD protocol. The inside of the RTS5440 processor is provided with a 10 Gbps 3:2 multiplexing switch chip corresponding to the function of the above-mentioned multiplexing switch chip 1004. It may be understood that, in the present embodiment, the switch device 1009, the multiplexing switch chip 1004 and the microprocessor chip 1002 are realized via two chips, where the multiplexing switch chip 1004 and the microprocessor chip 1002 share the same chip, namely the RTS5440 processor, the switch device 1009 selects the other chip, namely a TS3USB3031 converter; in other embodiments, depending on the performance of the selected chip, the switch device 1009, the multiplexing switch chip 1004 and the microprocessor chip 1002 may also be realized via three chips, for example, the microprocessor chip 1002 selects a CYPD3125 processor, the multiplexing switch chip 1004 selects a PS8742 multiplexing switch chip, and the switch device 1009 selects the TS3USB3031 converter.

TX1 and TX2 signals as well as RX1 and RX2 signals are high-speed differential pairs of the USB Type-C protocol and are the high-speed differential pairs for transmitting the DP signal or a USB3.0 protocol. The USB D+/D− signals are differential pairs of a USB2.0 protocol. USB SSRX signals and USB SSTX signals are high-speed differential pairs of USB3.0.

The SBU signal is an auxiliary communication interface in the USB Type-C protocol and may be configured to perform communication of the AUX signal of a DP in the present disclosure. The AUX signal is a control signal in a DP protocol.

The CC signal is a communication signal in the USB Type-C protocol and may be configured to determine the forward and backward plug and realizing the communication of signals such as PD (POWER DELIVERY) and HPD of PD. The HPD signal is a hot plug signal in the DP protocol. An HDMI HPD signal is a hot plug signal of an HDMI.

A signal C1 is a control signal for controlling the switching of the switch device 1009. A signal C2 is a control signal for controlling the switching of the multiplexing switch chip 1004. A signal C3 is a signal for implementing the communication between the microprocessor chip 1002 and the SOC chip 1008 or updating and controlling the microprocessor chip 1002.

Figure 11:
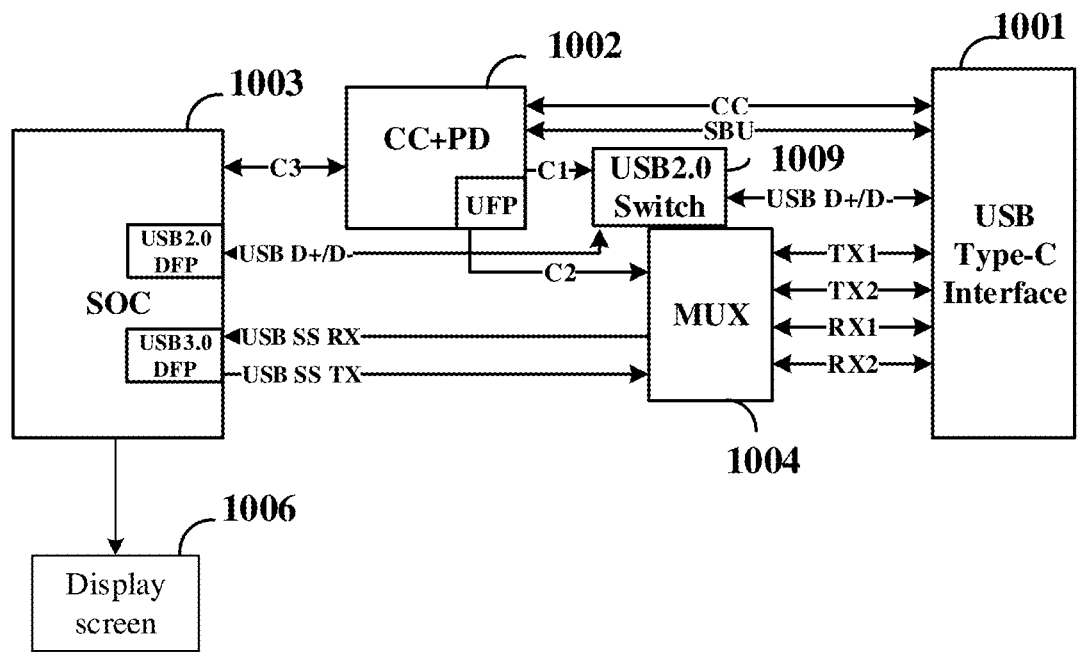
FIG. 11 is a schematic architectural diagram when the television is adapted to the USB device according to some embodiments of the present disclosure.

Referring to FIG. 11 which is a schematic structural diagram when the television provided by the present disclosure is adapted to a USB device, when the television 10 is externally connected to a USB UFP device (a USB slave device) such as a USB disk via the USB Type-C interface 1001, if it is determined via the communication of the CC signal that the connected is the USB UFP device, for a USB 2.0/3.0 application, the signal C1 is not controlled, the switch device 1009 is kept in a default state, namely the switch device 1009 is connected to the USB DFP interface of the SOC chip 1008, and USB2.0/3.0 connection is directly turned on from the USB Type-C interface 1001 to the USB DFP interface of the SOC chip 1008, so that the normal work of the USB2.0/3.0 connection may be guaranteed. For a USB Type-C application, the microprocessor chip 1002 controls the multiplexing switch chip 1004 to switch, so that the set signal communication between the USB DFP interface of the SOC chip 1008 and the USB Type-C interface 1001 is guaranteed, and furthermore, the normal connection of the USB Type-C interface is guaranteed.

Figure 12:
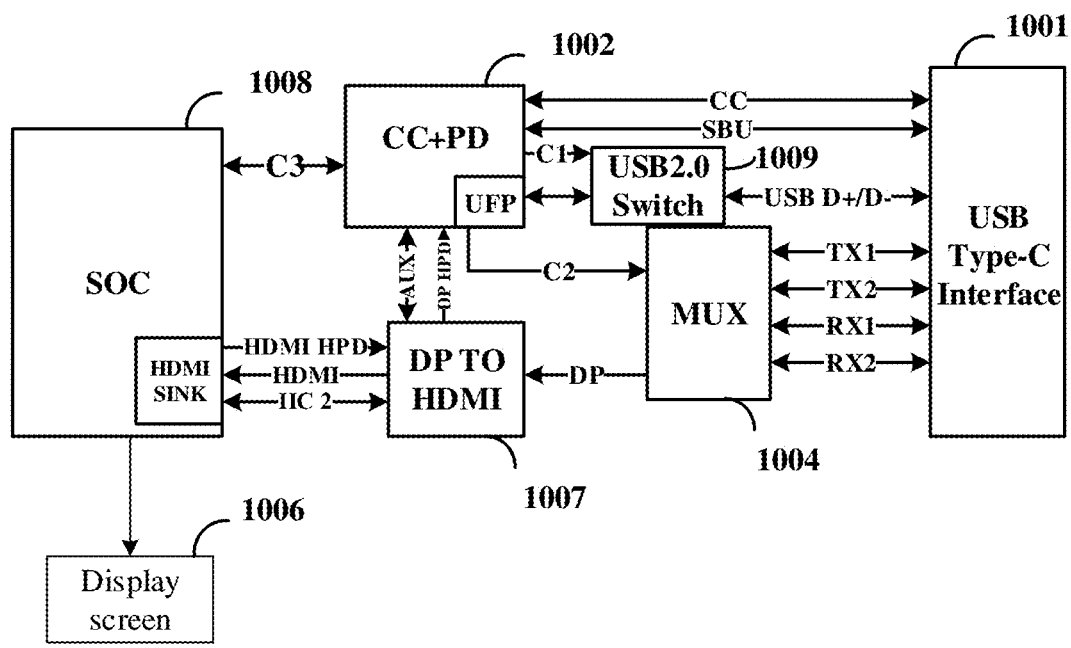
FIG. 12 is a schematic architectural diagram when the television is adapted to a DP device according to some embodiments of the present disclosure.

Referring to FIG. 12 which is a schematic structural diagram when the television provided by the present disclosure is adapted to a DP device, when the television 10 is externally connected to the DP device via the USB Type-C interface 1001, if it is determined by CC communication that the currently connected is an SOURCE device of DP, the signal C1 controls the switch device 1009 to be switched to the billboard UFP interface of the microprocessor chip 1002 to ensure that the billboard UFP interface of the microprocessor chip 1002 is connected to the USB D+/D− interface of the USB Type-C interface 1001, and furthermore, the billboard function is kept to be normal. The signal C2 controls the multiplexing switch chip 1004 to switch, so that the DP output path and order are kept to be normal. The DP-HDMI module 1007 performs communication of information such as EDID and establishes HDMI HPD connection with the HDMI SINK interface of the SOC chip 1008. The DP-HDMI module 1007 performs control information communication with the microprocessor chip 1002 via the AUX signal and performs HPD connection state communication with the microprocessor chip 1002 via the DP HPD signal. The microprocessor chip 1002 transmits control information of DP via the SBU signal and transmits DP HPD information via the CC signal.

It is noted that abnormal information is stored into a billboard module of the microprocessor chip 1002 and is communicated via USB D+/D− and DP SOURCE devices if abnormality appears in an overall ALT MODE process. In addition, if the television 10 supports a function of delivering power to the outside, the television 10 may be set as a PD SOURCE device by role exchange (PR_SWAP) performed via the communication of the CC signal, so that a DP SINK device is powered.

An embodiment of the television 10 according to the present disclosure may be further described below in detail in combination with FIG. 10, FIG. 11 and FIG. 12.

In consideration of conflicts between a USB2.0/3.0 role and an ALT MODE role due to the limit to characteristics of a television product, the structure of the television 10 provided by the present disclosure is correspondingly designed to guarantee the compatibility between the two roles. The embodiments of the television product are mainly divided into two types: firstly, a USB storage type peripheral or an HUB storage type extension is connected, at the moment, referring to FIG. 11, the USB function is only used, the USB Type-C interface 1001 of the television 10 is required to be set to play the role of the USB DFP device and to deliver power to the outside; and secondly, devices such as a notebook computer or a box supporting the ALT MODE is connected, at the moment, referring to FIG. 12, the ALT MODE function is only used, the USB Type-C interface 1001 of the television 10 is required to be set to play the role of the DP UFP (namely the DP SINK device) and to deliver the power to the outside.

It may be understood that the television 10 according to the present disclosure does not support the simultaneous transmission of a USB and the ALT MODE, in other words, the television 10 provided by the present disclosure may only play one of the USB2.0/3.0 role and the ALT MODE role at a specific moment.

In the present embodiment, the USB Type-C interface 1001 of the television 10 supports the following functions: CC communication; PD protocol of PD2.0 or above; power delivery with a maximum output of 5V/3A; full-functional ALT MODE and billboard; USB hosts of USB2.0, USB3.0 or above; and VCONN_Swap for providing VCONN to the outside. The microprocessor chip 1002 selects a chip supporting IIC updating.

The USB DFP device which may be connected to the television 10 includes a desktop host, a notebook computer, a mobile phone, a PAD, an adaptor and the like. The USB DRP (a USB double-role device) which supports the ALT MODE and may be connected to the television 10 includes a notebook computer, a mobile phone, a PAD and the like. Other USB DRP devices which may be connected to the television 10 include an HUB, a Dongle, a DOCK, a power bank and the like. The USB UFP device which may be connected to the television 10 includes a USB disk, a hard disk, a mobile phone, a PAD, an HUB, a Dongle, a DOCK, a display and the like.

A control implementation process of the USB Type-C interface 1001 of the television 10 includes that: the USB Type-C interface 1001 is initially set to be in a USB DRP mode and is matched by role change when being connected to devices playing different roles, and the specific process is as follows.

The USB Type-C interface 1001 is adapted to the USB UFP device when being connected to the USB DFP device; and if the connected device supports the DP DFP mode, the device is switched to be in a DP DFP mode to transmit the DP signal. PR_SWAP is initiated under the condition that the peripheral supports POWER SINK, and the television 10 is used as a POWER SOURCE to delivery power to the outside.

The USB Type-C interface 1001 is adapted to the USB DFP device when being connected to the USB UFP device. The television 10 is used as a POWER SOURCE to deliver power to the outside.

The USB Type-C interface 1001 negotiates with the external device when being connected to the USB DRP device supporting the ALT MODE, and the USB Type-C interface 1001 may be set to be in the DP UFP mode and deliver the power to the outside.

Compared with the relevant art, the present disclosure has the advantages that the microprocessor chip 1002 may alternatively control the terminal, transmitting the USB D+/D− signal, of the USB Type-C interface 1001 to be electrically connected to the pin for inputting the USB D+/D− signal in the SOC chip 1008 or the microprocessor chip 1002 according to the identified type of the device connected to the USB Type-C interface 1001 by designing the cooperative relationship among the USB Type-C interface 1001, the SOC chip 1008 and the microprocessor chip 1002, so that the USB Type-C interface 1001 may be favorably supported to realize the compatibility between the USB2.0/3.0 role and the ALT MODE role.

It is noted that the television is taken as an example to be described as above. The above-mentioned artfully-designed cooperative relationship among the USB Type-C interface 1001, the SOC chip 1008 and the microprocessor chip 1002 may be widely applied to a signal input circuit for inputting data of a USB and ALT MODE compatible device and realizing interaction of billboard information, an electronic television device for receiving data from an external device via a USB Type-C interface and a display device for favorably supporting the USB Type-C interface to realize the simultaneous compatibility between the USB2.0/3.0 role and the ALT MODE role.

Based on the above-mentioned embodiments, this application provides a control method for a USB Type-C interface of a television to be connected to an external device, and the method is suitable for the television provided by any one of the above-mentioned embodiments. In one feasible implementation way, an SWICH switch in the television is configured to implement the function of the above-mentioned switch module 240, a CC+PD chip is configured to realize CC and PD functions of the above-mentioned USB Type-C interface master control module 220, and a Billboard module is configured to realize the Billboard function in the above-mentioned USB Type-C interface master control module 220. The CC+PD chip is a chip integrated with the CC and PD functions, CC (Configuration Channel) is a configuration channel and has the effects of detecting USB connection, forward and backward plug, establishment and management of connection between data among USB devices and VBUS and the like; and PD (USB Power Delivery) is a communication protocol, is a novel power and communication connection way, allows power highest up to 100 W (20V/5A) to be transmitted among the USB devices, meanwhile may also change the properties of a port, may switch the port between a DFP and a UFP and may also realize communication with a cable so as to obtain the properties of the cable.

Therefore, information of an external device plugged into the USB Type-C interface may be acquired when the CC+PD chip is connected to the USB Type-C interface, so that situations such as the type of the external device as well as forward and backward plug are determined. An information transmission mode supported by the external device is determined according to a VDM Header when the CC+PD chip reads VDM information from the external device of the USB Type-C interface according to the PD protocol; the external device is determined to be a computer when the ALT MODE is supported; and the external device is determined to be a USB disk when the VDM information may not be read.

The control method for the USB Type-C interface of the television to be connected to the external device, provided by the present disclosure, includes the following steps:

monitoring that an external device is plugged into the USB Type-C interface of the television;

if the external device is the USB disk, connecting a low-speed differential pair pin of the USB Type-C interface to a master chip of the television; and if the external device is a computer, connecting the low-speed differential pair pin of the USB Type-C interface to a module, containing Billboard information, on the television.

In other words, the core of the present disclosure is to reuse the low-speed differential pair pin of the USB Type-C interface, and when different types of external devices are connected, the pin turns on different chips or modules inside the television, transmits different types of data and plays different roles. Further, the low-speed differential pair pin of the USB Type-C interface of the television adopting the method provided by the present disclosure may be reused, so that it may be supported that the USB disk is plugged from the outside of the interface, at the moment, the data in the USB disk are transmitted from the pin to the master chip of the television via the SWICH switch, and thus, the television may read the data in the USB disk; in addition, it may also be supported that the computer is plugged from the outside of the USB Type-C interface, at the moment, the external computer may be connected to the module, containing the Billboard information, via the pin and the SWICH switch, in this way, the external computer may read the Billboard information of the television according to the specification of a standard communication protocol to prepare for the subsequent communication with the television.

A more specific scheme may be that, when the CC+PD chip does not detect that the external device is plugged into the USB Type-C interface, the SWICH switch is controlled to connect the low-speed differential pair pin of the USB Type-C interface to an SOC chip master chip of the television, when the CC+PD chip detects that the computer is plugged into the USB Type-C interface, the low-speed differential pair pin of the USB Type-C interface is controlled to be conducted to the module containing the Billboard information, and after the Billboard information is transmitted to the computer, the CC+PD chip controls the action of the SWICH switch to connect the low-speed differential pair pin of the USB-C interface to a path connected to the SOC chip. In other words, connecting the low-speed differential pair pin of the USB Type-C interface to the path connected to the SOC chip is a default state, the SWICH switch is controlled to switch only when the CC+PD chip detects that the computer is plugged into the USB Type-C interface, and the SWICH switch is switched to the default state after the Billboard information is transmitted.

Further, the present disclosure provides an embodiment in which the aim that the pin of the above-mentioned USB Type-C interface selects different paths to work to connect different modules or chips in the television is achieved by virtue of one SWICH switch or a module or chip with the function of the SWICH switch. The function of the SWICH switch is similar to that of a single-pole double-throw switch. Specifically, the low-speed differential pair pin of the USB Type-C interface is connected to a first terminal of one SWICH switch, second and third terminals of the SWICH switch are respectively connected to the master chip and the module containing the Billboard information, and the SWICH switch may be controlled to cause the first terminal and the second terminal to conduct or cause the first terminal and the third terminal to conduct.

The present disclosure further provides a television adopting the above-mentioned method.

Figure 13:
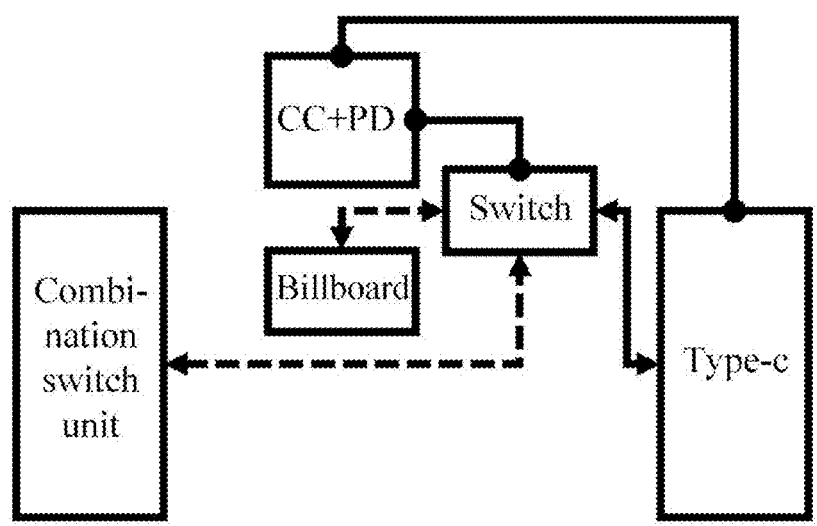
FIG. 13 is a schematic diagram of a related circuit of the USB-C interface of the television according to some embodiments of the present disclosure.

Based on a television hardware structure which is popular at present, the present disclosure provides a specific hardware connection scheme structure as shown in FIG. 13. The television in the present embodiment includes a master chip to implement the function of the above-mentioned SOC 210; the master chip is connected to one SWICH switch; the SWICH switch is respectively connected to a CC+PD chip and a Billboard module; the television further includes a USB-C interface connected to an external device; and the USB-C interface is respectively connected to the CC+PD chip and the SWICH switch.

Current USB pin signals are basically transmitted by adopting differential signals, and therefore, one connecting line in the accompanying drawing corresponds to two lines in an actual product, for example, the CC+PD chip may be connected to the USB Type-C interface via two D+ and D-lines and two corresponding pins of a USB. Other connecting lines are similar to this.

In some examples, the CC+PD chip is connected to the USB Type-C interface when an external device is plugged into the USB Type-C interface, so that the CC+PD chip may acquire the state of the pin of the USB-C interface and judge the external device to be a USB disk storage device or a device, such as a computer, provided with a main system.

The CC+PD chip may control the gating state of the SWICH switch according to the determined type of the external device, namely when the external device is a USB disk, the SWICH switch is connected to the master chip of the television to connect the low-speed differential pair pin of the USB Type-C interface to the master chip of the television, so that the master chip of the television is supported to directly read the data in the USB disk via the path; and when the external device is the computer, the SWICH switch is connected to the Billboard module of the television, so that the external computer is supported to directly read the Billboard information via the path, and furthermore, the communication between the external computer and the television is realized.

Figure 14:
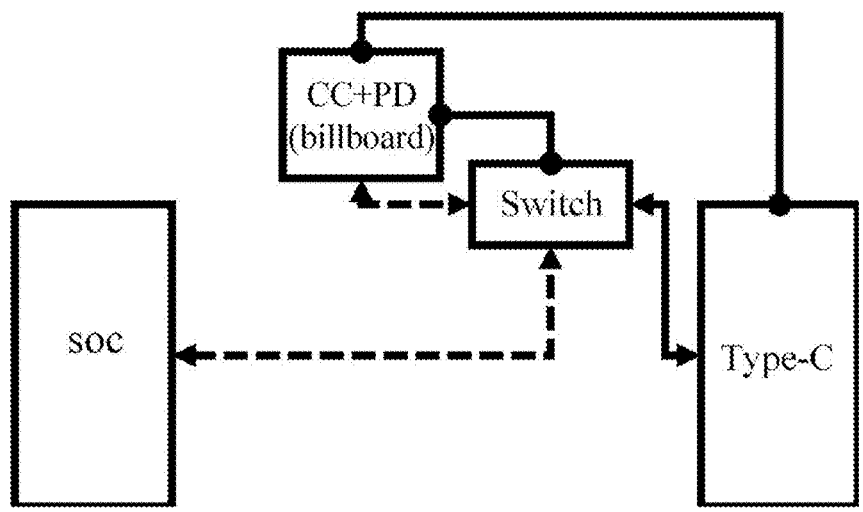
FIG. 14 is a schematic diagram of a related circuit of the USB-C interface of the television according to some embodiments of the present disclosure.

FIG. 14 is a schematic diagram of a hardware connection scheme structure provided by another embodiment of the present disclosure, compared with the embodiment as shown in FIG. 13, the Billboard module is integrated into the CC+PD chip, in this way, the SWICH switch is connected to the CC+PD chip via a control signal line (a connecting line of which the arrow is shaped like a dot in the figure) and a data signal line (a connecting line of which the arrow is shaped like a triangle in the figure); the data signal line is configured to transmit the Billboard information in the Billboard module built in the CC+PD chip to the USB Type-C interface via the SWICH switch; and the control signal line is configured to transmit and indicate the SWICH switch to be connected to the master chip or to be connected to the CC+PD chip via the data signal line.

During operation, different from the embodiment as shown in FIG. 13, the CC+PD chip make, by the control signal line, the SWICH switch be connected to the CC+PD chip via the data signal line when the external device is a computer, so that the external computer is supported to directly read the Billboard information built in the CC+PD chip via the path, and furthermore, the handshake communication between the external computer and the television is realized.

It should be noted that the USB disk mentioned in the present disclosure may be a similar memory with a USB Type-C interface, such as a mobile hard disk, a camera card reader and other electronic devices supporting a USB mode. The computer mentioned in the present disclosure represents for a device for actively initiating communication and also includes a PAD and the like, and generally, these devices may be directly plugged into a USB disk memory so as to read data. In addition, the SWICH switch mentioned in the present disclosure is also called a gating device or a data selector sometimes and may be defined and controlled by adopting some small chips, and the shape of the SWICH switch is not limited to be fixed as long as the SWICH switch supports being controlled to achieve an alternative function of a data path.

In some embodiments, the control method for the USB-C interface of the television to be connected to the external device further includes the following steps:

when the CC+PD chip of the television does not detect an external device plugged into the USB Type-C interface of the television, the SWICH switch is controlled to connect the low-speed differential pair pin of the USB Type-C interface to an SOC chip master chip of the television, when the CC+PD chip of the television detects that the computer is plugged into the USB Type-C interface of the television, the low-speed differential pair pin of the USB Type-C interface of the television is controlled to be connected to the module of the television containing the Billboard information, and after the Billboard information is transmitted to the computer, the CC+PD chip controls the action of the SWICH switch to connect the low-speed differential pair pin of the USB Type-C interface of the television to a path connected to the SOC chip master chip of the television.

In other words, the core of the present disclosure is to reuse the low-speed differential pair pin of the USB Type-C interface, and when different types of external devices are connected, the pin turns on different chips or modules inside the television, transmits different types of data and plays different roles. Further, the low-speed differential pair pin of the USB Type-C interface of the television adopting the method provided by the present disclosure may be reused, and therefore, when the CC+PD chip detects that no external device is plugged into the USB Type-C interface or the plugged external device is the USB disk memory, the SWICH switch is controlled to connect with the low-speed differential pair pin of the USB Type-C interface to the SOC chip master chip of the television; and when the CC+PD chip detects that the computer is plugged into the USB Type-C interface of the television, the low-speed differential pair pin of the USB Type-C interface of the television is controlled to be connected to the module, containing the Billboard information, of the television, and after the Billboard information is transmitted to the computer, the CC+PD chip controls the action of the SWICH switch to connect with the low-speed differential pair pin of the USB Type-C interface of the television to the path connected to the SOC chip master chip of the television.

In this way, the external computer may read the Billboard information of the television according to the specification of the standard communication protocol, and then, the computer may also transmit the data to the SOC master chip of the television via the low-speed differential pair pin of the USB Type-C interface of the television.

Further, the present disclosure provides an embodiment in which the aim that the pin of the above-mentioned USB Type-C interface selects different paths to work to connect with different modules or chips in the television is achieved by virtue of one SWICH switch or a module or chip with the function of the SWICH switch. The function of the SWICH switch is similar to that of a single-pole double-throw switch. Specifically, the low-speed differential pair pin of the USB Type-C interface is connected to a first terminal of one SWICH switch, second and third terminals of the SWICH switch are respectively connected to the master chip and the module containing the Billboard information, and the SWICH switch may be controlled to cause the first terminal and the second terminal to conduct or cause the first terminal and the third terminal to conduct.

Figure 15:
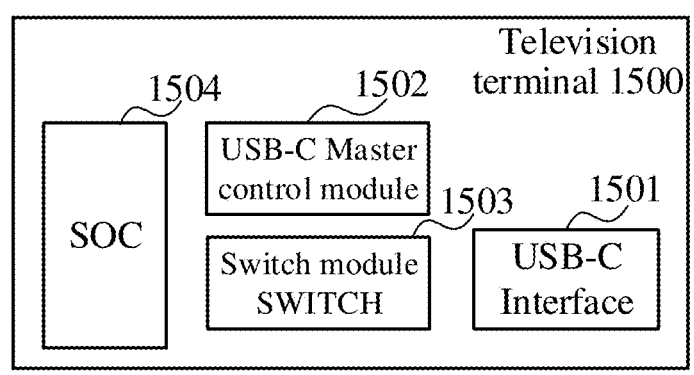
FIG. 15 is a structural block diagram of the television device according to some embodiments of the present disclosure.

Based on the above-mentioned embodiment, this application provides a specific implementation of another television device, referring to FIG. 15, the television device 1500 includes a USB Type-C interface 1501, a USB Type-C interface master control module 1502 and a switch module SWITCH 1503 connected between the USB Type-C interface master control module 1502 and the USB Type-C interface 1501. Firstly, a CC signal (a signal passing through a CC signal line is called the CC signal) is interacted between the USB Type-C interface master control module 1502 and the USB Type-C interface 1501 to identify a type of an external device of the USB Type-C interface 1501; and then, the USB Type-C interface master control module 1502 controls the state of the switch module SWITCH 1503 according to the type so as to control the data interaction between the external device of the USB Type-C interface 1501 and an SOC chip 1504 in the television device.

In the present embodiment, the USB Type-C interface refers to an interface for transmitting data by adopting a USB Type-C protocol. The USB Type-C interface and a USB Type-C interface provided in a device can be plugged into each other to form USB communication connection.

In the present embodiment, the USB Type-C interface master control module refers to a CC (Configuration Channel) in the USB Type-C protocol and/or a PD (Power Delivery) channel. The USB Type-C interface master control module may be set as the configuration channel according to an actual demand or set as the PD channel according to an actual demand or is set as the CC and the PD channel at the same time, there are no limits in the present embodiment.

In the present embodiment, the switch module SWITCH 1503 may be controlled by the USB Type-C interface master control module 1502 to switch a working state. During specific implementation, the switch module SWITCH 1503 may be realized by adopting a controllable switch device or software.

In the present embodiment, the SOC chip 1504 in the television device refers to a chip for processing an audio/video signal in the television device 1500, and different from Monitor, and the chip is for receiving and transmitting data.

It is obvious that the simultaneous compatibility of the USB Type-C interface of the television device for a UFP device (particularly a USB2.0 device) and a Billboard interface in the USB Type-C interface master control module is realized via the switch module SWITCH 1503 in some embodiments of this application, and the switch module SWITCH 1503 is simple in structure, easy to realize and can reduce the production cost.

In one embodiment of this application, when the type, which is identified by the USB Type-C interface master control module 1502, of the external device of the USB Type-C interface 1501 is a DP (Displayport) device type; and the step that the USB Type-C interface master control module 1502 controls the state of the switch module SWITCH 1503 according to the type includes that:

a state switching signal is transmitted to the switch module SWITCH 1503, so that the switch module SWITCH 1503 is switched to a state of connecting the DP device to the Billboard interface in the USB Type-C interface master control module 1502.

In the present embodiment, preset information of interaction between the USB Type-C interface master control module 1502 and the SOC chip 1504 in the present embodiment may be directly stored in a memory of the Billboard interface, data is interacted between the Billboard interface and the external device of the USB Type-C interface 1501, at the moment, the Billboard interface is used as a UFP device, namely a USB3.0 HUB does not need to provide an upstream port (UFP), so that the effect of the simultaneous compatibility between the Billboard interface and the USB Type-C interface 1501 is realized.

In one embodiment of this application, when the type, which is identified by the USB Type-C interface master control module 1502, of the external device of the USB Type-C interface 1501 is a UFP device type; and the step that the USB Type-C interface master control module 1502 controls the state of the switch module SWITCH 1503 according to the type includes that:

a state switching signal is forbidden to be transmitted to the switch module SWITCH 1503 so that the switch module SWITCH 1503 keeps a state of connecting a UFP device to the SOC chip 1504 in the television device.

In the present embodiment, when the external device is the UFP device, the switch module SWITCH 1503 keeps the UFP device connected to the SOC chip 1504 in the television device, namely data interaction is directly performed between the UFP device and the SOC chip 1504, a USB3.0 HUB does not need to provide an upstream port (UFP), so that the effect of the simultaneous compatibility between the Billboard interface and the USB Type-C interface 1501 is realized.

In one embodiment of this application, the television device further includes a multiplexing switch MUX. The multiplexing switch MUX is connected between the USB Type-C interface 1501 and the SOC chip 1504 in the television device. The multiplexing switch MUX connects the external device of the USB Type-C interface to the SOC chip in the television device under the control of the USB Type-C interface master control module 1502, so that the external device of the USB Type-C interface performs data interaction with the SOC chip in the television device. In the present embodiment, the multiplexing switch MUX may be controlled by the USB Type-C interface master control module 1502 to be adapted to the external device being the UFP device or the DP device to accurately transmit data of various types of devices.

When the television device does not include an interface adapted to the DP device, in one embodiment of this application, the television device further includes a protocol conversion module DP-HDMI. The protocol conversion module DP-HDMI is connected between the multiplexing switch MUX and the SOC chip in the television device to convert a DP signal of the multiplexing switch MUX into an HDMI signal to be transmitted to the SOC chip 1504 and transmit the preset information of the SOC chip 1504 to the memory of the Billboard interface in the USB Type-C interface master control module 1502. In the present embodiment, control information and connecting states may be interacted between the protocol conversion module DP-HDMI and the USB Type-C interface master control module 1502, and the connection between the USB Type-C interface 1501 and the SOC chip 1504 may be kept in an effective state, so that the accuracy rate of data transmission is increased.

It should be noted that merely the conversion between the type of a DP protocol and the type of an HDMI protocol is illustrated in this application, and the skilled in the art may select a proper protocol conversion module according to a specific application scenario, there are no limits in this application.

In one embodiment of this application, the USB Type-C interface master control module 1502 may also determine a power delivery state of the external device of the USB Type-C interface 1501 by interacting the CC signal with the USB Type-C interface 1501. When the external device of the USB Type-C interface 1501 requires power delivery, the USB Type-C interface master control module 1502 sets the television device as a PD source to deliver power to the DP device. In the present embodiment, the USB Type-C interface master control module 1502 sets the television device to deliver power to the DP device, so that the service life of the DP device may be prolonged.

The television device provided by this application is further described below in combination with specific embodiments.

Figure 16:
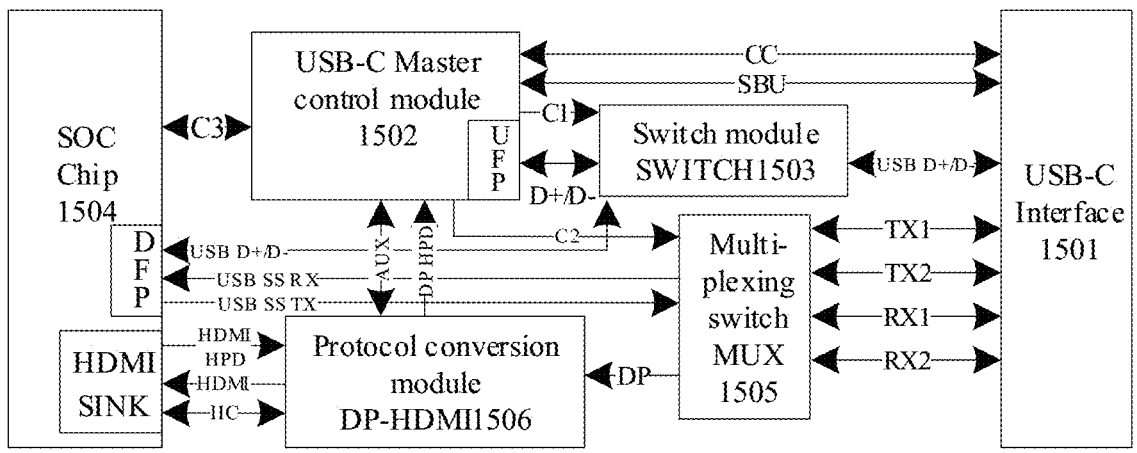
FIG. 16 is a schematic structural diagram of the television device according to some embodiments of the present disclosure.

Referring to FIG. 16, the television device in the present embodiment includes a USB Type-C interface 1501, a USB Type-C interface master control module 1502, a switch module 1503, an SOC chip 1504, a multiplexing switch MUX 1505 and a protocol conversion module DP-HDMI 1506. The specific connection relationship is as follows.

The USB Type-C interface master control module 1502 is connected to the USB Type-C interface 1501 via a CC signal line and an SBU channel, where the USB Type-C interface master control module 1502 is connected to an external device of the USB Type-C interface 1501 via a CC signal line so as to identify the following information such as the type of the USB Type-C interface 1501, forward and backward plug, power delivery (PD) information and hot plug information (HPD) of a display port (DP) device. The CC signal line and a CC signal transmitted by the channel may pass a USB Type-C protocol, and the descriptions thereof are omitted herein.

The USB Type-C interface master control module 1502 is connected to the switch module 1503 via a signal line C1 and USB D+/D− terminals (which is expressed as D+/D− due to relatively small spacing in the accompanying drawing). The USB Type-C interface master control module 1502 transmits a state switching signal to the switch module 1503 via the signal line C1. When the state switching signal is transmitted, the switch module 1503 is connected to the USB Type-C interface master control module 1502, and data may be interacted between the switch module 1503 and the USB Type-C interface master control module 1502. Under a default condition, the USB D+/D− connection between the switch module 1503 and the USB Type-C interface master control module 1502 is disconnected, and the switch module 1503 is connected to the SOC chip 1504 via the USB D+/D− terminals.

The USB Type-C interface master control module 1502 is connected to the multiplexing switch MUX 1505 via a signal line C2. The multiplexing switch MUX 1505 is connected to the USB Type-C interface 1501 via signal lines TX1, TX2, RX1 and RX2. The multiplexing switch MUX 1505 is connected to the SOC chip 1503 via signal lines USB SSRX and USB SSTX and is connected to the protocol conversion module DP-HDMI 1506 via a DP signal line. The USB Type-C interface master control module 1502 controls the multiplexing switch MUX 1505 to perform data interaction with the USB Type-C interface 1501 by adopting the signal line TX1/RX1 or the signal line TX2/RX2 or control the multiplexing switch MUX 1505 to transmit DP data to the protocol conversion module DP-HDMI 1506 via the DP signal line according to the type of the external device as well as the forward and backward plug.

The protocol conversion module DP-HDMI 1506 is connected to a receiving terminal HDMI Sink of the SOC chip 1504 via signal lines IIC (Inter IC BUS), HDMI and HDMI HPD and is connected to the USB Type-C interface master control module 1502 via signal lines AUX and DP HPD. The protocol conversion module DP-HDMI 1506 acquires information such as EDID (Extended Display Identification Data) of the receiving terminal HDMI Sink via the IIC and establishes HDMI HPD connection via the signal line HDMI HPD. After the connection is established, the converted HDMI data are transmitted to the receiving terminal HDMI Sink by the protocol conversion module DP-HDMI 1506 via a signal line HDMI to be displayed by the SOC chip 1504.

The USB Type-C interface master control module 1502 is connected to the SOC chip 1504 via a signal line C3 to perform data interaction therebetween and may also be used as the other communication interface connected to the SOC chip 1504 to realize software updating and control in the USB Type-C interface master control module 1502. It should be noted that the signal line C3 may be selected to be retained or deleted according to a specific application scenario, and there are no limits in the present embodiment.

Example 1

When an external device of a USB Type-C interface 1501 is a UFP device, the working process of the television device according to some embodiments of this application is as follows.

Figure 17:
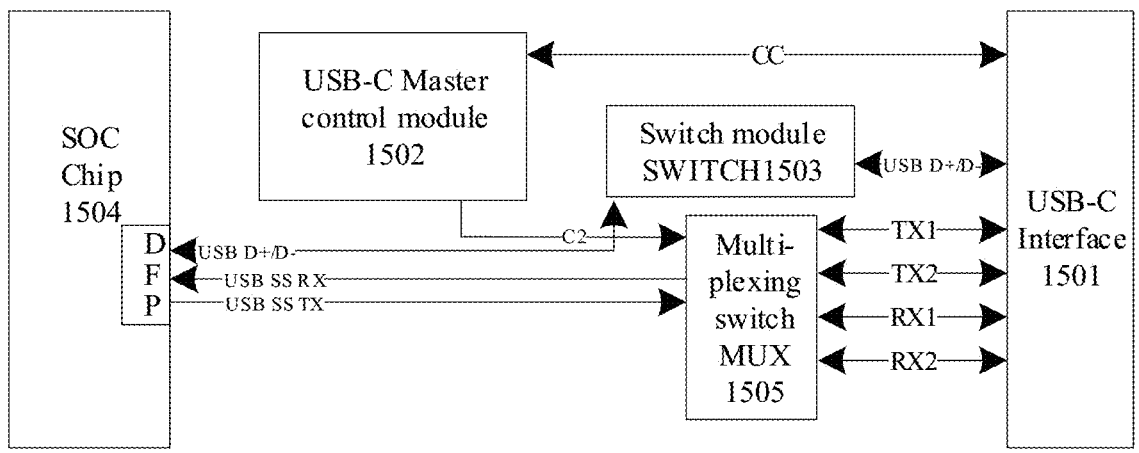
FIG. 17 is a schematic structural diagram of a USB of the television device when an external device is a UFP device according to some embodiments of the present disclosure.

FIG. 17 is a schematic structural diagram of a USB of a television device when an external device is a UFP device. In order to facilitate understanding, parts of signal lines and modules not involved in this working process are omitted in some embodiments of the television device as shown in FIG. 17. It may be understood that parts of signals lines and modules may be needed in this process according to a specific scenario.

Referring to FIG. 17, when a device is plugged into the USB type-C interface 1501, a USB Type-C interface master control module 1502 acquires a CC signal via a CC signal line to acquire the type of the device to determine that the device is the UFP device. The USB Type-C interface master control module 1502 is forbidden to transmit a state switching signal (a signal line C1 and USB D+/D− between the USB Type-C interface master control module and a switch module SWITCH 1503 are omitted) to a switch module SWITCH 1503, at the moment, the switch module SWITCH 1503 is protected in a default state to keep the USB type-C interface 1501 and an SOC chip 1504 in a connected state, so that the normal work of USB2.0 is guaranteed.

When the UFP device is a USB2.0 device, data in the UFP device reaches a downstream port (DFP) of the SOC chip 1504 via the USB type-C interface 1501, a signal line USB D+/D−, the switch module SWITCH 1503 and a signal line USB D+/D− in sequence. Otherwise, data in the SOC chip 1504 reach the USB type-C interface 1501 via the signal line USB D+/D−, the switch module SWITCH 1503 and the signal line USB D+/D− in sequence and is finally stored in the USB2.0 device.

The USB Type-C interface master control module 1502 transmits control information to a multiplexing switch MUX 1505 via a signal line C2 and selects a TX1/RX1 signal line combination or a TX2/RX2 signal line combination according to a forward and backward plug state of the UFP device. Namely the USB Type-C interface master control module 1502 controls the multiplexing switch MUX to switch according to a USB Type-C protocol, so that the DFP in the SOC chip 1504 is guaranteed to communicate to the USB Type-C interface, and the normal connection of a USB3.0 interface is guaranteed.

When the UFP device is a USB3.0 device, data in the UFP device reach the DFP of the SOC chip 1504 via the USB type-C interface 1501, a signal line TX1 (or TX2), the multiplexing switch MUX 1505 and a signal line USB SSRX in sequence. Otherwise, data in the SOC chip 1504 reach the USB type-C interface 1501 via the DFP, a signal line USB SSTX, the multiplexing switch MUX 1505 and the signal line RX1 (or TX2) in sequence and is finally stored in the USB3.0 device.

Example 2

When an external device of a USB Type-C interface 1501 is a DP device, the working process of the television device according to some embodiments of this application is as follows.

FIG. 18 is a schematic structural diagram of a USB of a television device when an external device is a DP device. In order to facilitate understanding, parts of signal lines and modules not involved in this working process are omitted in some embodiments of the television device as shown in FIG. 18. It may be understood that parts of signals lines and modules may be involved in this process again according to a specific application scenario.

Referring to FIG. 18, when a device is plugged into the USB type-C interface 1501, a USB Type-C interface master control module 1502 acquires a CC signal via a CC signal line to acquire the type of the device so as to determine that the device is the DP device. The USB Type-C interface master control module 1502 transmits a state switching signal to a switch module SWITCH 1503 via a signal line C1. The switch module SWITCH 1503 is switched and is connected to an upstream port (UFP) of a Billboard interface in the USB Type-C interface master control module 1502.

The USB Type-C interface master control module 1502 transmits control information to a multiplexing switch MUX 1505 via a signal line C2 and selects a TX1/RX1 signal line combination or a TX2/RX2 signal line combination according to a forward and backward plug state of the UFP device. Namely the USB Type-C interface master control module 1502 controls a multiplexing switch MUX to switch according to a USB Type-C protocol, so that a DFP in an SOC 1504 is guaranteed to communicate to the USB Type-C interface, and the normal connection of a USB3.0 interface is guaranteed.

A protocol conversion module DP-HDMI 1506 interacts with a receiving terminal HDMI Sink of the SOC chip 1504 via IIC to acquire information such as EDID of the receiving terminal HDMI Sink and establish HDMI HPD connection via a signal line HDMI HPD.

The protocol conversion module DP-HDMI 1506 interacts control information with the USB Type-C interface master control module 1502 via a signal line AUX and interacts an HPD connection state via a signal line DP HPD. The USB Type-C interface master control module 1502 transmits the HPD connection state of the protocol conversion module DP-HDMI 1506 to the DP device via a CC signal line by virtue of the USB Type-C interface 1501 and transmits AUX control information of the protocol conversion module DP-HDMI 1506 via an SBU signal line.

It is obvious that data in the DP device may reach the receiving terminal HDMI SINK in the SOC chip 1504 via a signal line TX1 (TX2), the multiplexing switch MUX 1505, the DP signal line, the protocol conversion module DP-HDMI 1506 and a signal line HDMI in sequence after the above-mentioned process is completed.

It should be noted that, if abnormality appears in the present embodiment, abnormal information is stored into a memory of a Billboard interface of the USB Type-C interface master control module 1502 and is then transmitted to the DP device by the USB Type-C interface master control module 1502 via a signal line USB D+/D−.

For the above-mentioned television device, an embodiment of this application further provides a control method of a television device, as shown in FIG. 19, the method includes the following steps.

Step 1901, a CC signal is interacted between a USB Type-C interface master control module and a USB Type-C interface to identify a type of an external device of the USB Type-C interface; and Step 1902, the USB Type-C interface master control module controls the state of a switch module SWITCH according to the type to control the data interaction between the external device of the USB Type-C interface and an SOC chip in the television device.

In some embodiments, when it is determined that the external device of the USB Type-C interface is a DP device, the step that the USB Type-C interface master control module controls the state of the switch module SWITCH according to the type includes that:

a state switching signal is transmitted to the switch module SWITCH, so that the switch module SWITCH is switched to a state of connecting the DP device to a Billboard interface in the USB Type-C interface master control module.

In some embodiments, when it is determined that the external device of the USB Type-C interface is a UFP device, the step that the USB Type-C interface master control module controls the state of the switch module SWITCH according to the type includes that:

a state switching signal is forbidden to be transmitted to the switch module SWITCH so that the switch module SWITCH keeps a state of connecting the UFP device to the SOC chip in the television device.

In some embodiments, when the television device further includes a multiplexing switch MUX, the method includes that:

the USB Type-C interface master control module controls the multiplexing switch MUX to connect the external device of the USB Type-C interface to the SOC chip in the television device so that data is interacted between the external device of the USB Type-C interface and the SOC chip in the television device.

In some embodiments, when the television device includes a protocol conversion module DP-HDMI, the method further includes that: control information and connecting states are interacted between the USB Type-C interface master control module and the protocol conversion module DP-HDMI, and preset information in a process of data interaction between the protocol conversion module DP-HDMI and the SOC chip in the television device is stored in a memory of a Billboard interface of the USB Type-C interface master control module.

In some embodiments, the method further includes that:

the USB Type-C interface master control module determines a power delivery state of the external device of the USB Type-C interface by interacting a CC signal with the USB Type-C interface;

when the external device of the USB Type-C interface requires power delivery, the USB Type-C interface master control module sets the television device as a PD source to deliver power to the DP device.

With regard to the method in the above-mentioned embodiment, the specific way that each chip or module performs operation has been described in detail in some embodiments of the television device, and the descriptions thereof are omitted herein.

In the present embodiment, one or more signal lines may be provided, may be represented as control lines or data buses and may be understood according to the accompanying drawings and transmission objects.

In the several embodiments provided by this application, it should be understood that the disclosed devices and methods may be realized in other ways. For example, the embodiments of the devices described as above are merely schematic, for example, the division of the units is only division of logical functions, and additional division ways may exist during actual implementation, for example, a plurality of units or modules may be combined or integrated into the other system, or some features may be neglected or not executed. In addition, the displayed or discussed mutual coupling or direct coupling or communication connection may be indirect coupling or communication connection via some interfaces, devices or units and may be electrical, mechanical or in other ways.

The units described as separating components may be or not be physically separated, components for unit display may be or not be physical units, namely the components may be located on the same place or distributed on a plurality of network units. Parts or all of the units may be selected according to an actual demand so as to achieve the aim of the scheme of the present embodiment.

In addition, each functional unit in each embodiment of this application may be integrated in one processing unit, or each unit independently and physically exists, or two or more units are integrated in one unit. The above-mentioned integrated units not only may be realized in a way of adopting hardware, but also may be realized in a way of adopting hardware and software functional units.

Based on the above-mentioned embodiments, this application further provides the following five specific embodiments:

First Embodiment

Figure 20:
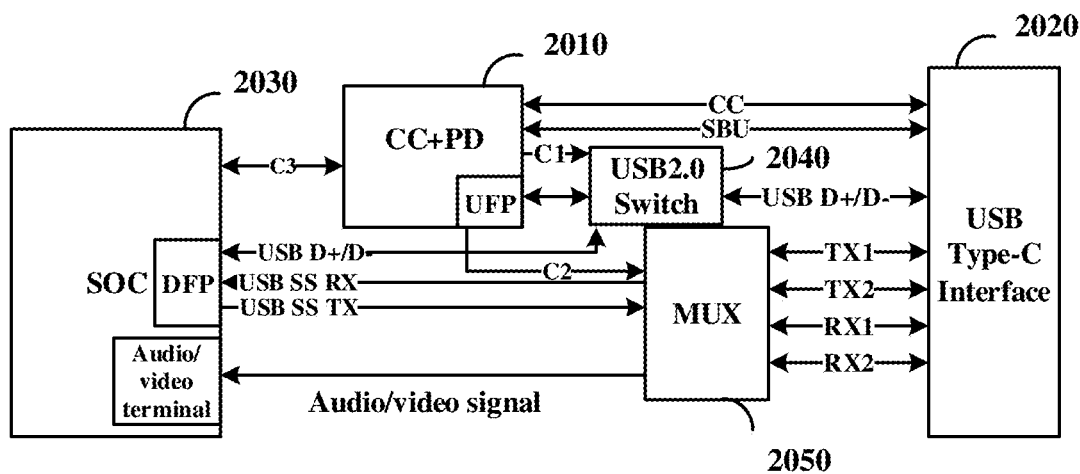
FIG. 20 is a schematic structural diagram of application of the USB-C interface of the television device according to some embodiments of the present disclosure.

This embodiment of the present disclosure provides a signal input circuit 2000 for inputting data of a USB and ALT MODE compatible device and realizing interaction of billboard information, as shown in FIG. 20, the signal input circuit 2000 includes a control chip (CC+PD module) 2010 configured to implement the function of the above-mentioned USB Type-C interface master control module 220, control electrical connection between a D+/D− input terminal in a USB-C interface 2020 and a connecting terminal of an SOC chip 2030 and electrical connection between the D+/D− input terminal in the USB-C interface 2020 and a connecting terminal for interacting billboard information in the control chip 2010 according to a identified type of a device connected to a USB Type-C (USB-C for short below) interface 2020 and only select any one path in the two electrical connection paths to be electrically conducted.

The USB-C interface refers to an interface for transmitting data by adopting a USB Type-C protocol. The USB Type-C interface and a USB-C interface provided in a device (including a USB device: a television device for transmitting a USB protocol signal, such as a USB disk and a hard disk; an ALT MODE device: a television device for transmitting an audio/video signal, such as a notebook computer, a mobile phone and a PAD) can be plugged into each other to form USB or ALT MODE communication connection.

The control chip 2010 refers to a CC (Configuration Channel) module and/or a PD (Power Delivery) module in the USB-C protocol. The control chip 2010 may be specifically set as the CC (namely the CC module), or the PD (namely the PD module) or a whole of the CC and the PD (namely a CC+PD module) according to an actual demand.

Further, the control chip 2010 supports CC (Configuration Channel) communication and a PD (POWER DELIVERY) protocol in a USB-C protocol specification, on the one hand, the control chip 2010 is configured to adapt to forward and backward plug for an external device, determine the type of the external device and acquire PD information of an ALT MODE device via the CC; on the other hand, the control chip 2010 is configured to communicate a CC signal and an SBU signal with outside. The control chip 2010 has a billboard function, and a connecting terminal in the control chip 2010 is electrically connected to a USB D+/D− signal pin point in the USB-C interface 2020, so that the control chip 2010 feeds billboard information back to the external ALT MODE device when the ALT MODE device is externally connected. In the scheme, the control chip 340 is the CC+PD module, it may be understood that the control chip in the scheme may also be used as a CC or PD module with an MCU processing function, the descriptions thereof are omitted herein.

The SOC chip 2010 refers to a system on a chip, namely a chip for processing an audio/video signal, and is configured for transmitting and receiving data. The SOC chip 2010 is provided with a USB DFP interface for implementing a USB3.0/2.0 signal transmission function; and meanwhile, and the SOC chip 2010 is further configured for receiving an audio/video data signal such as an HDMI signal and a DP signal. For example, the SOC chip 2010 may include an IIC (Integrated Circuit Bus) host module for implementing IIC control and firmware updating, a USB3.0 DFP interface for implementing a USB3.0 DFP function, a USB2.0 DFP interface for implementing a USB2.0 DFP function and an HDMI SINK module for implementing an HDMI SINK (namely a receiving terminal of a minimized transmission differential signal TMDS in an HDMI protocol) function.

Figure 23:
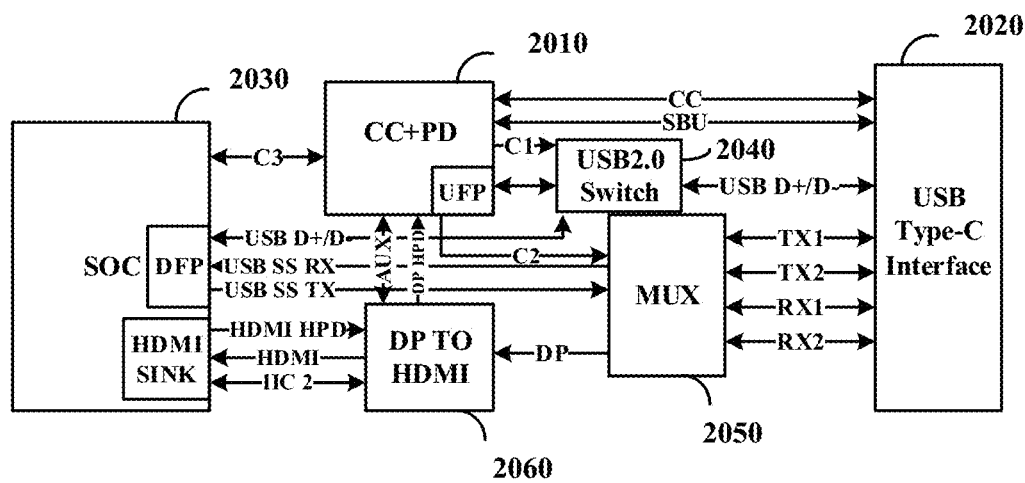
FIG. 23 is a schematic structural diagram of application of a USB Type-C interface of another television device according to some embodiments of the present disclosure.

Further, the USB3.0 DFP interface and the USB2.0 DFP interface may be specifically combined into one DFP interface for transmitting a USB3.0 signal and a USB2.0 signal (as shown in FIG. 20); and in similar manner, the USB3.0 DFP interface and the USB2.0 DFP interface may also be specifically divided into two interfaces for respectively realizing the USB3.0 DFP function and the USB2.0 DFP function (as shown in FIG. 23).

Further, the embodiment of this application provides a way that the control chip 2010 identifies the type of the external device. The specific process is as follows: the control chip 2010 performs communication with a CC pin of a USB-C via a CC so as to identify the type of the external device of the USB-C. Specifically, a mapping relationship between a switching mode and type information of the external device is prestored in the control chip 2010, when the USB-C interface 2020 is connected to the external device, device information (such as ID information of the device) of the external device is identified to be matched with a mode type prestored in the control chip 2010, and the connecting terminal of the SOC chip 2030 is controlled to be electrically connected according to a matched result, or the D+/D− input terminals in the USB-C interface 2020 is controlled to be electrically connected to the connecting terminal for interacting the billboard information in the control chip 2010.

Further, the embodiment of this application provides another way that the control chip 2010 identifies the type of the external device. The specific process is as follows: the control chip 2010 identifies that the external device is a USB device under a default condition, if a device type signal transmitted by a CC pin includes corresponding VDM information after CC communication is performed via a CC signal pin of the USB-C, the control chip identifies that the external device is an ALT MODE device.

Exemplarily, when the connected device is the ALT MODE device, the VDM information of the device is exampled as follows:

00 represents for RESERVED; 01 represents for UFP_D-capable; 10 represents for DFP_D-capable; and 11 represents for Both UFP_D and DFP_D-capable. Specifically, when the VDM information acquired by CC communication is 01, the connected ALT MODE device is determined to be a UFP device which may transmit data signals to other devices; when the acquired VDM information is 10, the connected ALT MODE device is determined to be a DFP device which receives data signals transmitted by other devices; and when the acquired VDM information is 11, the connected device is determined to be used as both the UFP device and the DFP device, namely the connected device not only may transmit data to other devices, but also may receive data signals transmitted by other devices.

Further, as shown in FIG. 20, in the signal input circuit 2000, the USB-C interface 2020 in some embodiments of this application is provided with a USB D+/D− signal pin for inputting a USB 2.0 signal, and accordingly, the SOC chip is provided with a pin for inputting a USB D+/D− signal so as to receive the USB 2.0 signal transmitted from the external device.

Further, in the present embodiment, for the control of the control chip 2010 to a D+/D− terminal of the USB-C interface 2020, the D+/D− terminal may be controlled to be electrically connected to the connecting terminal of the SOC chip or the control chip under different modes in a way of adopting software, and meanwhile, the D+/D− terminal may be controlled to be electrically connected to the connecting terminal of the SOC chip or the control chip under different modes under the gating of a selective switch device.

Specifically, when the control chip performs control via the selective switch device, the signal input circuit 2000 further includes a selective switch device 2040, as shown in FIG. 20, the selective switch device 2040 controls the USB D+/D− signal pin to be electrically connected to a path of control signal C1 output pin in the control chip 2010; an input pin of the selective switch device 2040 is electrically connected to the USB D+/D− signal pin in the USB-C interface 2020; in any two paths of selectable output pins, one path is electrically connected to the pin for inputting the USB D+/D− signal in the SOC chip 2030; and the other path is electrically connected to the pin for connecting the USB D+/D− signal in the control chip 2010.

Figure 21:
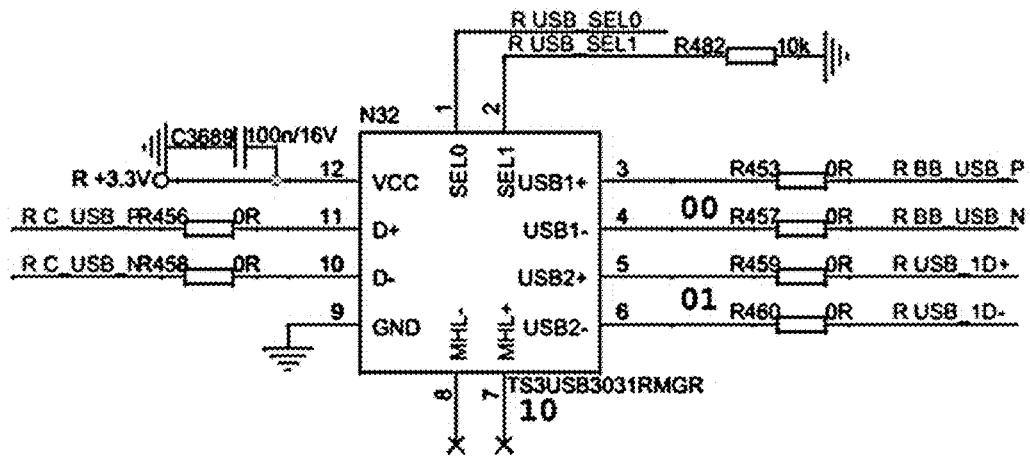
FIG. 21 is a schematic structural diagram of a selective switch device according to some embodiments of the present disclosure.

Further, the embodiment of this application gives a specific example of the selective switch device 2040, as shown in FIG. 21, exemplarily, a TS3USB3031RMGR chip is selected as the selective switch device 2040 in some embodiments of this application. A D+/D− pin of the chip is electrically connected to a USB D+/D− input signal pin in a USB-C interface, USB 2+/USB2− is connected to a DFP interface in the SOC chip so as to realize a USB 2.0 signal transmission function; USB 1+/USB1− is connected to a functional module for interacting billboard information in a control chip (or a CC module) so as to realize a USB 3.0 signal transmission function; and SEL1 and SEL2 are control pins and are connected to the control chip (or the CC module) in some embodiments of this application.

Specifically, when a USB device is connected, the control chip (or the CC module) controls a pin SEL0 to be at a low level and a pin SEL1 at a high level, so that the selective switch device switches a USB D+/D− terminal to be electrically connected to a DFP interface of the SOC chip; and when an ALT MODE device is connected, the control chip (or the CC module) controls the pin SEL0 to be at a low level and the pin SEL1 at a low level, so that the selective switch device switches the USB D+/D− terminal to be electrically connected to the functional module for interacting the billboard information in the control chip (or the CC module).

It should be noted that one specific form of the selective switch device is only given herein, the skilled in the art may also select other chips with the same or similar functions as the selective switch device in some embodiments of this application according to actual conditions.

Further, one switching process of the selective switch device 2040 is that the control chip 2010 detects the type of the device connected to the USB-C interface 2020, when the USB-C interface 2020 is detected to be connected to a USB device, a control signal C1 controls the selective switch device 2040 to conduct the connection between the USB D+/D− terminal in the USB-C interface 2020 and the connecting terminal of the SOC chip 2030; and when the USB-C interface 2020 is connected to an ALT MODE device, the control signal C1 controls the selective switch device 2040 to conduct the connection between the USB D+/D− terminal in the USB-C interface 2020 and the connecting terminal for interacting the billboard information in the control chip 2010.

Another specific switching process of the selective switch device 2040 is that the selective switch device 2040 is kept to be disconnected to the connecting terminal for interacting the billboard information in the control chip under a default condition, while the connection between selective switch device 2040 and a connecting terminal of the SOC chip 2030 is kept conducted; and when the USB-C interface 2020 is detected to be connected to the ALT MODE device, the control signal C1 controls the selective switch device 2040 to be disconnected from the connecting terminal of the SOC chip 2030 and the connection between the connecting terminal for interacting the billboard information in the control chip and the selective switch device 2040 be conducted.

Further, in the signal input circuit 2000, the SOC chip 2030 further includes a pin for inputting a USB SSTX/RX signal and a pin for inputting an audio/video format, where the pin for inputting the USB SSTX/RX signal is used as a functional pin in a USB 3.0DFP interface of the SOC chip 2030 and configured for a USB 3.0 device to transmit a USB 3.0 signal; while the pin for inputting the audio/video format is used as a functional pin of an audio/video module in the SOC chip 2030 and configured for an ALT MODE device to transmit an audio/video signal.

Further, the signal input circuit 2000 further includes a multiplexing switch chip 2050 (an MUX module in FIG. 20), the multiplexing switch chip 2050 includes two high-speed differential pair signal input pins which are respectively connected to signal pins USB TX1/2 and RX1/2 of the USB-C interface 2020 and may be configured to transmit a DP signal or a USB 3.0 signal input by the ALT MODE device.

Meanwhile, a control pin of the multiplexing switch chip 2050 is electrically connected to the other control signal C2 output pin in the control chip 2010, in any two selectable output pins, one is electrically connected to the pin for inputting the USB SSTX/RX signal in the SOC chip; and the other is electrically connected to the pin for inputting the audio/video format in the SOC chip.

Specifically, the control chip 2010 detects a type of a device connected to the USB-C interface 2020, when the external device is the USB device, the control chip 2010 controls the multiplexing switch chip 2050 via a control signal C2 to select one high-speed differential pair in the USB-C interface 2020 to work to transmit the USB 3.0 signal, for example, a high-speed differential pair TX1/RX1 or a high-speed differential pair TX2/RX2 is selected to transmit the USB 3.0 signal to the USB 3.0 DFP interface of the SOC chip 2030 via the multiplexing switch chip 2050; and when the external device is the ALT MODE device, at least one high-speed differential pair in the USB-C interface 2020 is selected to transmit an audio/video signal, for example, the high-speed differential pair TX1/RX1 or the high-speed differential pair TX2/RX2 is selected to transmit the audio/video signal to an audio/video terminal module of the SOC chip 2030.

Figure 22A:
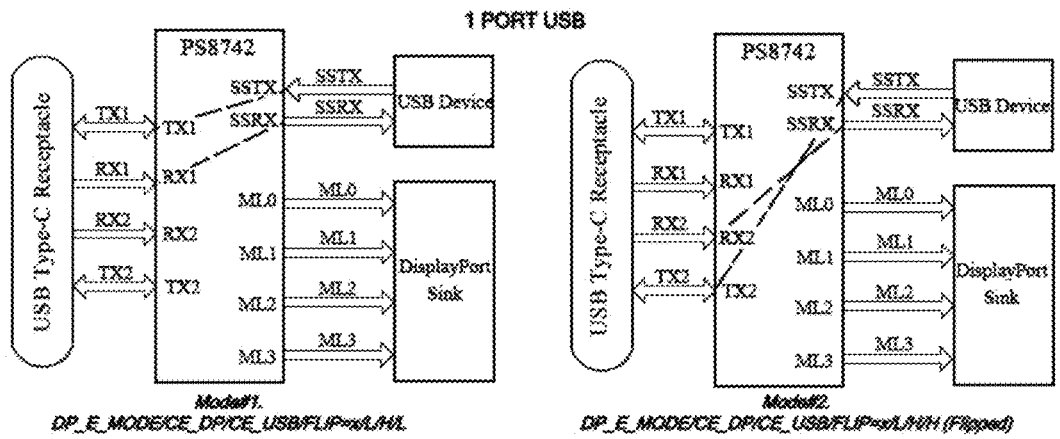
FIG. 22A-FIG. 22C are schematic diagrams illustrating the working of a multiplexing switch chip according to some embodiments of the present disclosure.
Figure 22B:
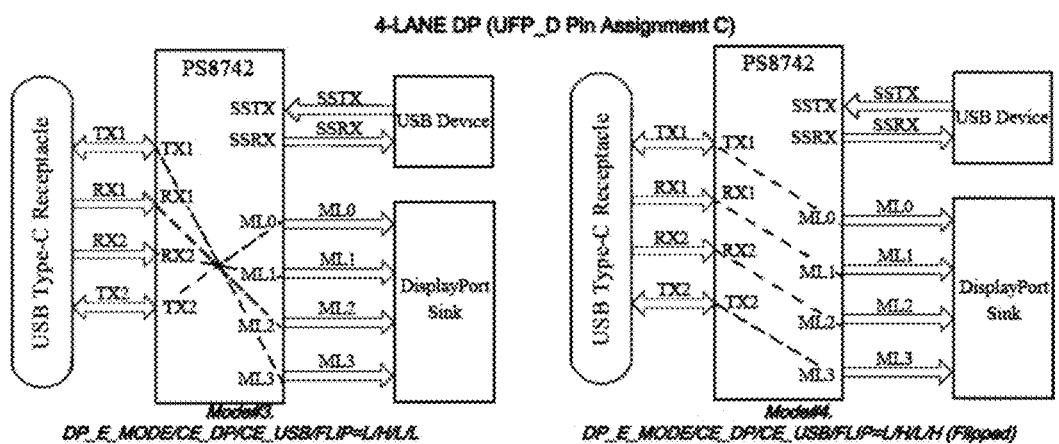
Figure 22C:
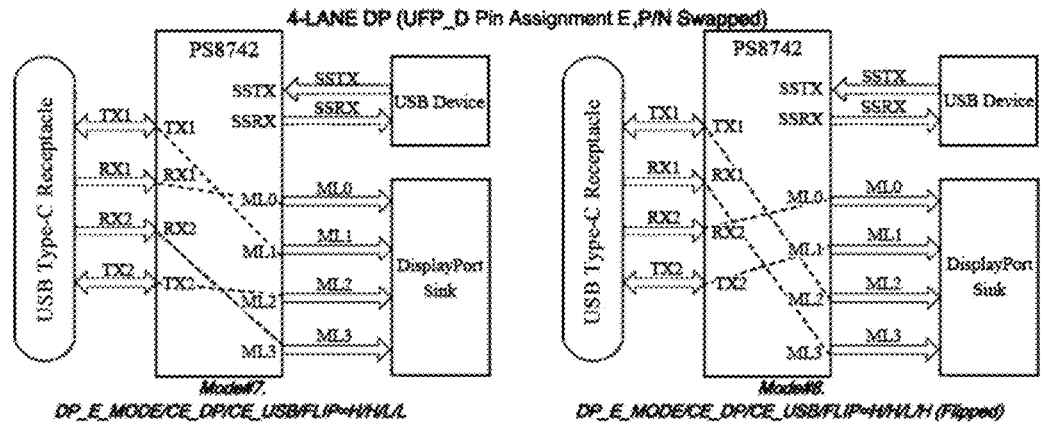

Exemplarily, as shown in FIG. 22A to FIG. 22C showing a way of selecting the high-speed differential pairs in the USB-C interface provided by a USB-C protocol. Exemplarily, a PS8742 chip is selected to be used as the multiplexing switch chip 2050 in some embodiments of this application. The two high-speed differential pair pins TX1/RX1 and TX2/RX2 of the chip are respectively connected to the USB-C interface, and an SSTX/SSRX pin of the chip is connected to the USB device to transmit the USB 3.0 signal when the USB device is connected; and ML0~ML3 pins of the chip are connected to a DP SINK module so as to transmit a DP signal when the ALT MODE device is connected.

Specifically, for a mode 1 and a mode 2 as shown in FIG. 22A, when the USB device is connected, in the mode 1, accordingly, a signal input from the USB-C interface is input by a TX1/RX1 pin of a multiplexing switch chip PS8742 and is transmitted from the SSTX/SSRX pin to the USB device; and in mode 2, the signal input from the USB-C interface is input by a TX2/RX2 pin of the multiplexing switch chip PS8742 and is transmitted from the SSTX/SSRX pin to the DP SINK module.

As shown in FIG. 22B to FIG. 22C, the four modes respectively correspond to an electrical conduction relationship between the TX1/RX1 and TX2/RX2 pins and ML0~ML3 pins of the multiplexing switch chip PS8742 when the ALT MODE device is connected, and the audio/video signal (such as the DP signal) is transmitted from the TX1/RX1 and TX2/RX2 pins to the chip PS8742 and is then transmitted from the ML0~ML3 pins to the audio/video module (DP SINK module).

It should be noted that a specific form of the multiplexing switch chip is only given herein, the skilled in the art may also select any other chip with the same or similar functions as the multiplexing switch chip in some embodiments of this application according to an actual condition, and in similar manner, DP SINK in the accompanying drawing may also be evoluted into other modules with the similar functions, such as an HDMI SINK module, according to an actual condition, the descriptions thereof are omitted herein.

Usually, when the external device is the ALT MODE device, the input signal is the DP signal, however, the current SOC is basically intelligent to be used as a receiving terminal of an HDMI signal, but is incapable of receiving the DP signal. Therefore, as shown in FIG. 23, the signal input circuit further includes a DP-HDMI module configured to convert the DP signal into an HDMI signal and transmit the HDMI signal into the SOC chip when the external device is the ALT MODE device only for transmitting the DP signal and the SOC chip may only be used as the receiving terminal of the HDMI signal.

Specifically, the signal input circuit 2000 includes a DP-HDMI module 2060, where an HPD terminal of the DP-HDMI module 2060 is electrically connected to the control chip 2010 to judge and determine a communication state between the external device connected to the USB-C interface 2020 and the DP-HDMI module 2060, and the input end of the DP-HDMI module 2060 is connected to the multiplexing switch chip 2050 so as to electrically connect the output pin of the DP-HDMI module 2060 and the pin for inputting the HDMI format in the SOC chip 2030 according to selection of the multiplexing switch chip 2050 when the external device is the ALT MODE device.

Further, the DP-HDMI module 2060 is further electrically connected to the SOC chip 2030 via a signal line IIC2 (Inter IC BUS) to acquire information such as EDID (Extended Display Identification Data) of the receiving terminal HDMI Sink via IIC2 and establish HDMI HPD connection via a signal line HDMI HPD. After the connection is established, converted HDMI data are transmitted to the receiving terminal HDMI SINK by the DP-HDMI module 2060 via a signal line HDMI so as to be displayed by the SOC chip 2030.

Further, the control chip 2010 also determines a power delivery state of the external device of the USB-C interface 2020 by interacting the CC signal with the USB-C interface 2020. When the ALT MODE device externally connected to the USB-C interface 2020 requires power delivery, the control chip 2010 sets the television device as a PD source to deliver power to the DP device. In the present embodiment, the control chip 2010 sets the television device to deliver the power to the DP device, so that the service life of the external ALT MODE device may be prolonged.

The control chip 2010 is further connected to the SOC chip 2030 via a signal line C3 to perform data interaction therebetween and may also be used as the other communication interface connected to the SOC chip 2030 so as to realize software updating and control in the control chip 2010. It should be noted that the signal line C3 may be selected to be retained or deleted according to a specific application scenario, and there are no limits in the present embodiment.

A working process of the signal input circuit provided in the sixth embodiment of this application is specifically as follows:

I: The External Device of the USB-C Interface 2020 being a USB Device

Figure 24:
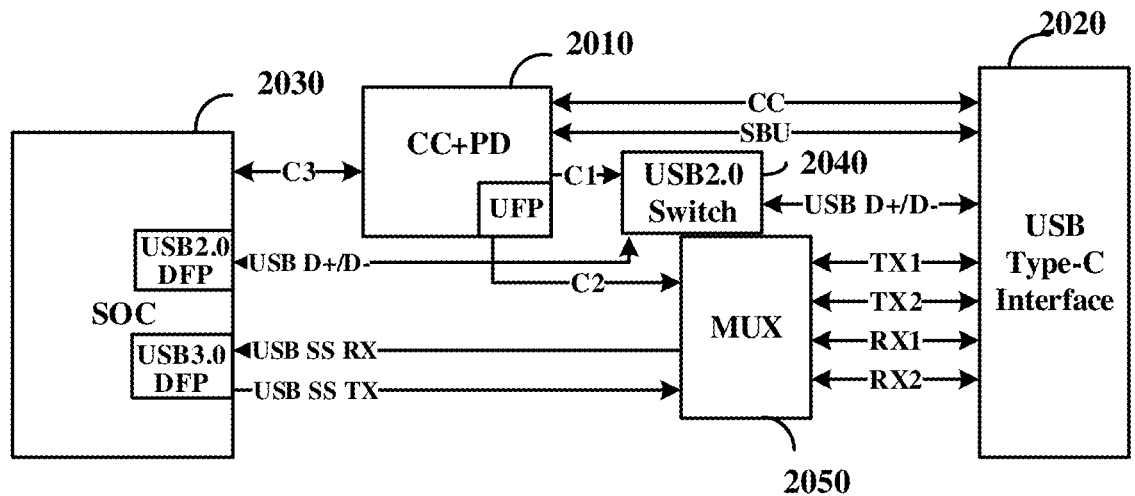
FIG. 24 is a schematic diagram of a working process when externally connecting the USB device according to some embodiments of the present disclosure.

FIG. 24 is a schematic diagram that a signal of a signal input circuit is conducted when the external device is a USB device. In order to facilitate understanding, parts of signal lines and modules not involved in this working process are omitted in some embodiments of the signal input circuit as shown in FIG. 24 (specifically, the signal line C1 and USB D+/D− communication between the control chip and the selective switch device are omitted under a USB device mode). It may be understood that parts signal lines and modules may be needed in this process according to a specific scenario.

Referring to FIG. 24, when a device is connected to a USB-C interface 2020, a control chip 2010 interacts a CC signal with a CC pin of the USB-C interface 2020 via a CC to acquire the type of the connected device so as to determine that the device is the USB device. The control chip 2010 controls a selective switch device 2040 to be electrically connected to a DFP interface of an SOC chip 2030 via a signal line C1, or the control chip 2010 is forbidden to transmit a state switching signal to the selective switch device 2040, at the moment, the selective switch device 2040 is protected in a default state to keep the USB-C interface 2020 and the SOC chip 2030 in a conducted state, so that the normal work of USB2.0 is guaranteed.

When the USB device is a USB2.0 device, data in the UFP device reaches a USB 2.0 DFP interface of the SOC chip 2030 via the USB-C interface 2020, a signal line USB D+/D−, the selective switch device 2040 and a signal line USB D+/D− in sequence. In a similar way, data in the SOC chip 2030 may also reach the USB-C interface 2020 via the signal line USB D+/D−, the selective switch device 2040 and the signal line USB D+/D− in sequence and is finally transmitted and stored in the USB2.0 device.

Meanwhile, the control chip 2010 transmits control information to a multiplexing switch chip 2050 via a signal line C2 and selects a high-speed differential pair TX1/RX1 or TX2/RX2 according to a forward and backward plug state of the USB device. That is, the control chip 2010 controls the multiplexing switch chip 2050 to switch according to a USB-C protocol, so that the DFP interface in the SOC chip 2030 is guaranteed to communicate to the USB-C interface 2020, and the normal connection of a USB3.0 interface is guaranteed.

When the USB device is a USB3.0 device, data in the USB device reach a USB3.0 DFP interface of the SOC chip 2030 via the USB-C interface 2020, a signal line TX1 (or TX2), the multiplexing switch chip 2050 and a signal line USB SS RX in sequence. Otherwise, data in the SOC chip 2030 reach the USB-C interface 2020 via the USB3.0 DFP interface, a signal line USB SSTX, the multiplexing switch chip 2050 and the signal line TX1 (or TX2) in sequence and is finally stored in the USB3.0 device.

Figure 25:
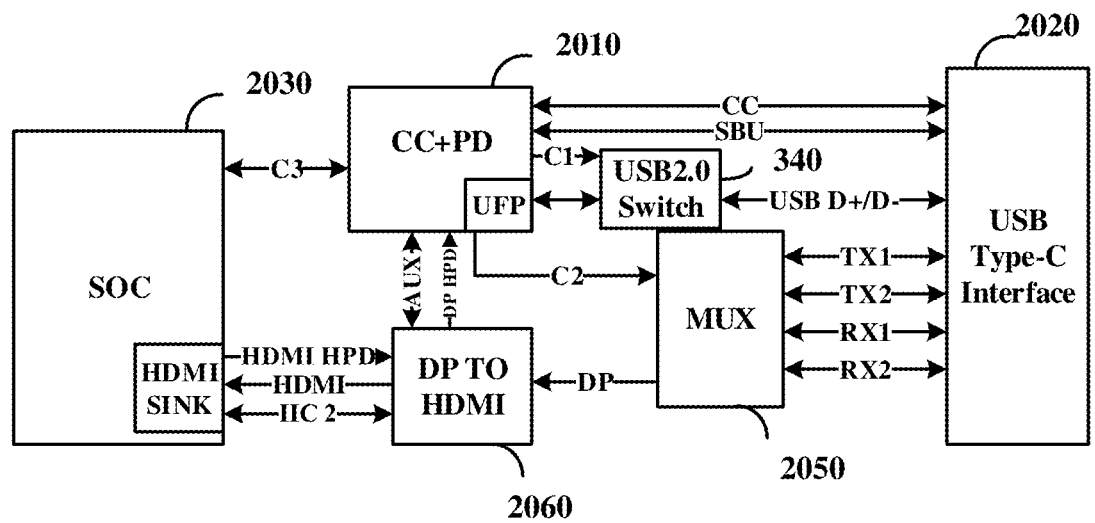
FIG. 25 is a schematic diagram of a working process when externally connecting the ALT MODE device according to some embodiments of the present disclosure.

II: The External Device of the USB-C Interface 2020 being an ALT MODE Device FIG. 25 is a schematic diagram that a signal of a television device is conducted when the external device is an ALT MODE device. In order to facilitate understanding, parts of signal lines and modules not involved in this working process are omitted in some embodiments of the television device as shown in FIG. 25. It may be understood that parts of signals lines and modules may be needed in this process according to a specific scenario.

Referring to FIG. 25, when a device is plugged into a USB-C interface 2020, a control chip 2010 interacts a CC signal via a CC to acquire the type of the device so as to determine that the device is the ALT MODE device. The control chip 2010 controls a selective switch device 2040 to be electrically connected to a billboard module in the control chip 2010 via a signal line C1 and specifically controls the selective switch device 2040 to be connected to a UFP of a billboard in the control chip 2010.

The control chip 2010 transmits control information to a multiplexing switch chip 2050 via a signal line C2 and selects a differential pair TX1/RX1 or TX2/RX2 according to a forward and backward plug state of a UFP device. That is, the control chip 2010 controls the multiplexing switch chip 2050 to switch according to a USB-C protocol, so that the DFP in the SOC chip 2030 is guaranteed to communicate to the USB-C interface, and the normal connection of a USB3.0 interface is guaranteed.

A DP-HDMI module 2060 interacts with a receiving terminal HDMI SINK of the SOC chip 2030 via IIC2 to acquire information such as EDID of the receiving terminal HDMI SINK and establishes HDMI HPD connection via a signal line HDMI HPD.

The DP-HDMI module 2060 interacts control information with the control chip 2010 via a signal line AUX and interacts an HPD connection state via a signal line DP HPD. The control chip 2010 transmits the HPD connection state of the DP-HDMI module 2060 to the ALT MODE device via a CC channel by virtue of the USB-C interface 2020 and transmits control information of the DP-HDMI module 2060 via an SBU signal line.

It is obvious that data in the ALT MODE device may reach the receiving terminal HDMI SINK in the SOC chip 2030 via a signal line TX1/RX1 (or TX2/RX2), the multiplexing switch chip 2050, the DP signal line, the DP-HDMI module 2060 and a signal line HDMI in sequence after the above-mentioned process is completed.

If abnormality occurs in the connection of the ALT MODE device in the present embodiment, abnormal information is transmitted to the ALT MODE device by a Billboard module in the control chip 2010 via a signal line USB D+/D−, and the corresponding abnormal information is displayed on the ALT MODE device to give a user a prompt.

It should be noted that, in order to facilitate description in the specific working process of the signal input circuit provided by the sixth embodiment, an HDMI SINK module only supporting an HDMI signal in the SOC chip 2030 is simplified, and meanwhile, an ALT MODE input signal is a DP signal; and for other similar scenes, a certain regulation may be made by reference to the specific working process, the requirement for setting the DP-HDMI module 2060 may also be considered according to an actual condition, the descriptions thereof are omitted herein.

According to an electronic device according to the present embodiment, the connection between the USB D+/D− terminal and the SOC chip or the control chip is selected to be conducted according to the type of the external device, so that the problem of incompatibility between the USB 2.0/3.0 signal and the billboard information in the USB-C interface applied to the television device is solved. Specifically, in the electronic device terminal, the control chip performs communication with a CC signal pin of the USB-C interface via the CC so as to identify the type of the external device; when the device connected to the USB-C interface is a USB device, the connection between the USB D+/D− terminal and the connecting terminal of the SOC chip is selected to be conducted; and when the device connected to the USB-C interface is an ALT MODE device, the connection between the USB D+/D− terminal and the connecting terminal for interacting the billboard information in the control chip is selected to be conducted, and furthermore, the compatibility between the USB 2.0/3.0 signal and the billboard information is realized.

The control chip includes a CC module and a PD module, and the CC module and the PD module may be separately arranged (namely CC module+the PD module) or combined into one chip (a CC+PD module).

Figure 26:
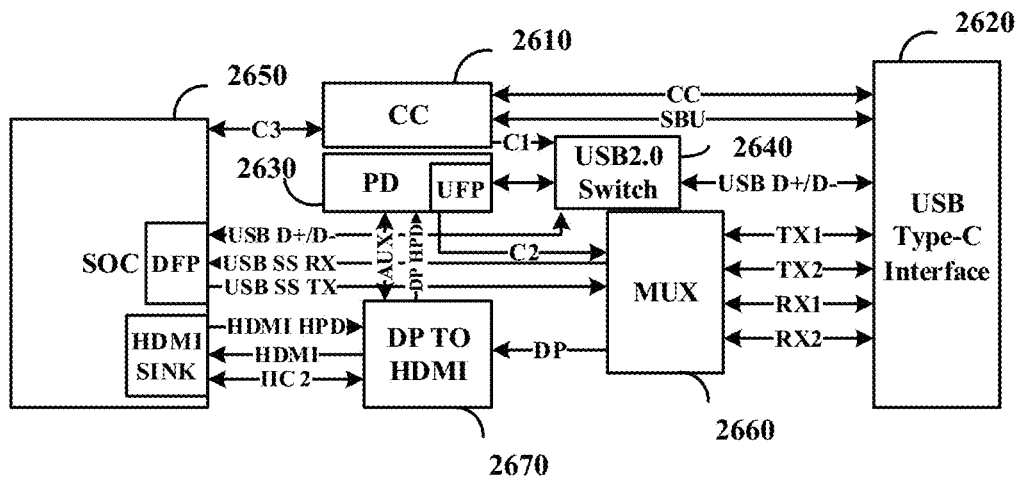
FIG. 26 is a schematic structural diagram of application of a USB-C interface of another television device according to some embodiments of the present disclosure.

Specifically, as shown in FIG. 26, in another embodiment of this application, a signal input circuit 22800 includes a CC module 22810 configured to detect a type of a device connected to a USB-C interface 22820; when the USB-C interface 22820 is detected to be connected to a USB device, a connection between a USB D+/D− terminal in the USB-C interface 22820 and a connecting terminal of an SOC chip is selected to be conducted; and when the USB-C interface 22820 is connected to an ALT MODE device, the connection between the USB D+/D− terminal in the USB-C interface 22820 and a connecting terminal for interacting billboard information in a PD module 22830 is selected to be conducted.

In the present scheme, the CC module 22810 may be regarded as a CC physical channel, is electrically connected to a CC pin in the USB-C interface 22820 and may perform CC communication with the USB-C interface 22820, adapt to the forward and backward plug of an external device, determine a type of the external device and acquire PD information of the ALT MODE device via the CC.

The PD module 22830 is configured to support a PD protocol and is provided with a billboard functional module which is electrically connected to a USB D+/D− signal pin in the USB-C interface 22820 to feed the billboard information back to the external ALT MODE device when the external device is the ALT MODE device.

Further, when control is realized via a selective switch device, the signal input circuit 22800 further includes a selective switch device 2640, as shown in FIG. 26, the selective switch device 2640 controls a USB D+/D− signal pin to be electrically connected to a path of control signal C1 output pin in the CC module 22810; an input pin of the selective switch device 2640 is electrically connected to a USB D+/D− signal pin in the USB-C interface 22820; in any two selectable output pins, one is electrically connected to a pin for inputting the USB D+/D− signal in an SOC chip 2650; and the other path is electrically connected to a pin for connecting the USB D+/D− signal in the PD module 22830.

Further, a specific switching process of the selective switch device 2640 is that the CC module 22810 detects the type of the device connected to the USB-C interface 22820, when the USB-C interface 22820 is detected to be connected to a USB device, a control signal C1 controls the selective switch device 2640 to select the connection between the USB D+/D− terminal in the USB-C interface 22820 and the connecting terminal of the SOC chip 2650 to be conducted; and when the USB-C interface 22820 is connected to an ALT MODE device, the control signal C1 controls the selective switch device 2640 to select the connection between the USB D+/D− terminal in the USB-C interface 22820 and the connecting terminal for interacting the billboard information in the PD module 22830 to be conducted.

In the signal input circuit 22800 in the present embodiment, the SOC chip 2650 further includes a pin for inputting a USB SSTX/RX signal and a pin for inputting an HDMI format, where the pin for inputting the USB SSTX/RX signal is used as a functional pin in a USB 3.0DFP interface of the SOC chip 2650 and configured for a USB 3.0 device to transmit a USB 3.0 signal; while the pin for inputting the HDMI format is used as a functional pin of an HDMI SINK module in the SOC chip 2650 and configured for the ALT MODE device to transmit an HDMI signal.

Further, signal input circuit 22800 further includes a multiplexing switch chip 2660 (an MUX module in FIG. 6), the multiplexing switch chip 2660 includes two high-speed differential pair signal input pins connected to signal pins USB TX1/2 and RX1/2 of the USB-C interface 22820 and may be configured to transmit a DP signal or a USB 3.0 signal input by the ALT MODE device.

Meanwhile, a control pin of the multiplexing switch chip 2660 is electrically connected to the other control signal C2 output pin in the CC module 22810, in any two selectable output pins, one is electrically connected to the pin for inputting the USB SSTX/RX signal in the SOC chip 2650; and the other is electrically connected to the pin for inputting the HDMI format in the SOC chip 2650.

Specifically, the CC module 22810 detects a type of a device connected to the USB-C interface 22820, when the external device is the USB device, the CC module 22810 controls the multiplexing switch chip 2660 via a control signal C2 to select one high-speed differential pair in the USB-C interface 22820 to transmit the USB 3.0 signal, for example, a high-speed differential pair TX1/RX1 or a high-speed differential pair TX2/RX2 is selected to transmit the USB 3.0 signal to a USB 3.0 DFP interface of the SOC chip 2650 via the multiplexing switch chip 2660; and when the external device is the ALT MODE device, at least one high-speed differential pair in the USB-C interface 22820 to transmit an audio/video signal, for example, the high-speed differential pair TX1/RX1 or the high-speed differential pair TX2/RX2 is selected to transmit the audio/video signal to the HDMI SINK module of the SOC chip 2650.

Usually, when the external device is the ALT MODE device, the input signal is the DP signal, but the HDMI SINK module in the SOC chip 2650 is incapable of receiving the DP signal. Therefore, the signal input circuit 22800 further includes a DP-HDMI module configured to convert the DP signal into an HDMI signal and transmit the HDMI signal into the SOC chip 2650 when the external device transmits the DP signal.

Specifically, the signal input circuit 22800 includes a DP-HDMI module 2670, where an HPD terminal of the DP-HDMI module 2670 is electrically connected to the CC module 22810 so as to judge and determine a communication state between the external device connected to the USB-C interface 22820 and the DP-HDMI module 2670, and the input end of the DP-HDMI module 2670 is connected to the multiplexing switch chip 2660 so as to select the output pin of the DP-HDMI module 2670 to be electrically connected to the pin for inputting the HDMI format in the SOC chip 2650 according to the multiplexing switch chip 2660 when the external device is the ALT MODE device.

Further, the CC module 22810 also determines a power delivery state of the external device of the USB-C interface 2020 by interacting the CC signal with the USB-C interface 2020. When the ALT MODE device externally connected to the USB-C interface 2020 requires power delivery, the CC module 22810 sets the electronic television device as a PD source so as to deliver power to the DP device. In the present embodiment, the CC module 22810 sets the television device to deliver the power to the DP device, so that the service life of the external DP device may be prolonged.

According to the electronic device terminal provided by the present embodiment, in an existing hardware framework architecture, the connection between the USB D+/D− terminal and the SOC chip or the PD module is selected to be conducted according to the type of the external device, so that the problem of incompatibility between the USB 2.0/3.0 signal and the billboard information in the USB-C interface applied to the television device is solved. Specifically, in the electronic device terminal, the CC module performs communication with a CC signal pin of the USB-C interface via the CC so as to identify the type of the external device; when the device connected to the USB-C interface is a USB device, the connection between the USB D+/D− terminal and the connecting terminal of the SOC chip is selected to be conducted; and when the device connected to the USB-C interface is an ALT MODE device, the connection between the USB D+/D− terminal and the connecting terminal for interacting the billboard information in the PD module is selected to be conducted, and furthermore, the compatibility between the USB 2.0/3.0 signal and the billboard information is realized.

Second Embodiment

Figure 27:
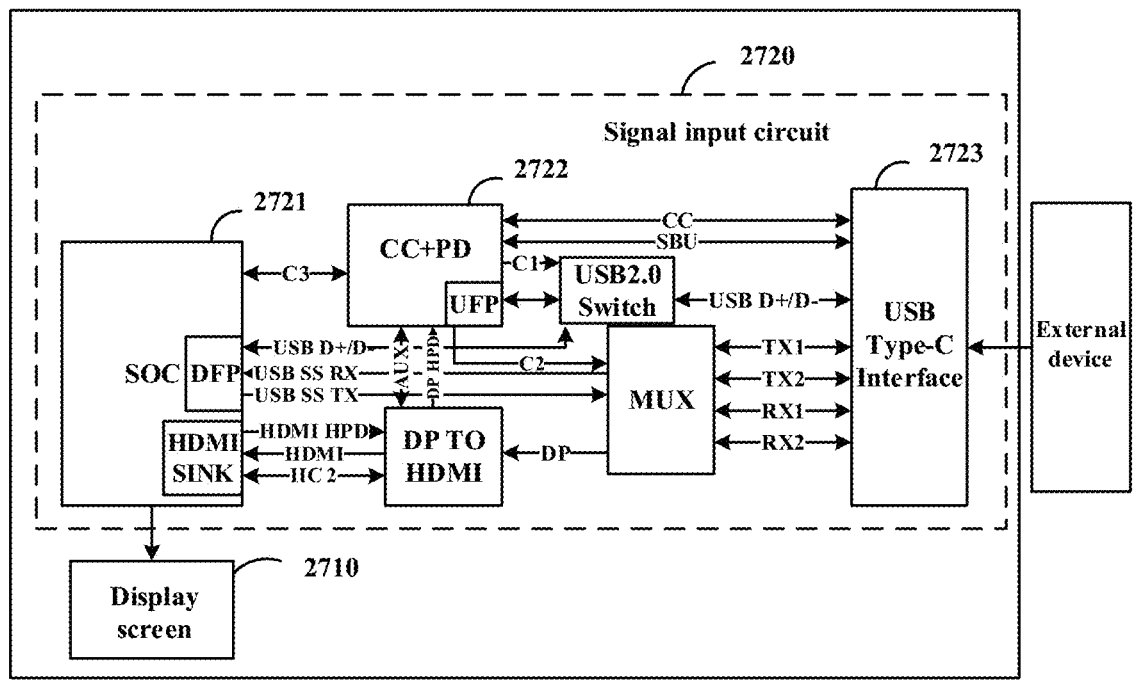
FIG. 27 is a schematic structural diagram of an electronic television device according to some embodiments of the present disclosure.

The second embodiment of this application further provides an electronic television device for receiving data from an external device via a USB TYPE-C interface, as shown in FIG. 27, the electronic television device 2700 includes a display screen 2710 and a signal input circuit 2720, where the display screen 2710 is configured to display an image; the signal input circuit 2720 further includes an SOC chip 2721, a control chip 2722 (CC+PD) and a USB-C interface 2723, where the USB-C interface 2723 is configured to be connected to the external device, and the control chip 2722 is configured to control the external device to complete data interaction with the SOC chip 2721 via the USB-C interface 2723, so that a signal of the external device is transmitted to the SOC chip 2721, and furthermore, the SOC chip 2721 drives the display screen 2710 to display the image.

Specifically, when the external device is a USB device, the control chip 2722 controls a USB 2.0/USB 3.0 signal to be transmitted to the SOC chip 2721 via the USB TYPE-C interface 2723, so that the display screen 2710 is driven to display relevant information; when the external device is an ALT MODE device, the control chip 2722 controls an audio/video signal to be transmitted to the SOC chip 2721 via the USB TYPE-C interface 2723 so as to drive the display screen 2710 to display relevant images; and when the external device is the ALT MODE device and billboard information is required to be transmitted, the control chip 2722 controls a USB D+/D− terminal to be electrically connected to the SOC chip 2721, so that the billboard information is transmitted to the SOC chip 2721, and the relevant billboard information is displayed on the display screen to remind a user of abnormity.

Further, the signal input circuit 2720 may adopt any signal input circuit in the above-mentioned sixth embodiment, and accordingly, the specific process of data transmission between the external device and the SOC chip 2721 may refer to the corresponding data transmission process in the above-mentioned first embodiment, the descriptions thereof are omitted herein.

Third Embodiment

Figure 28:
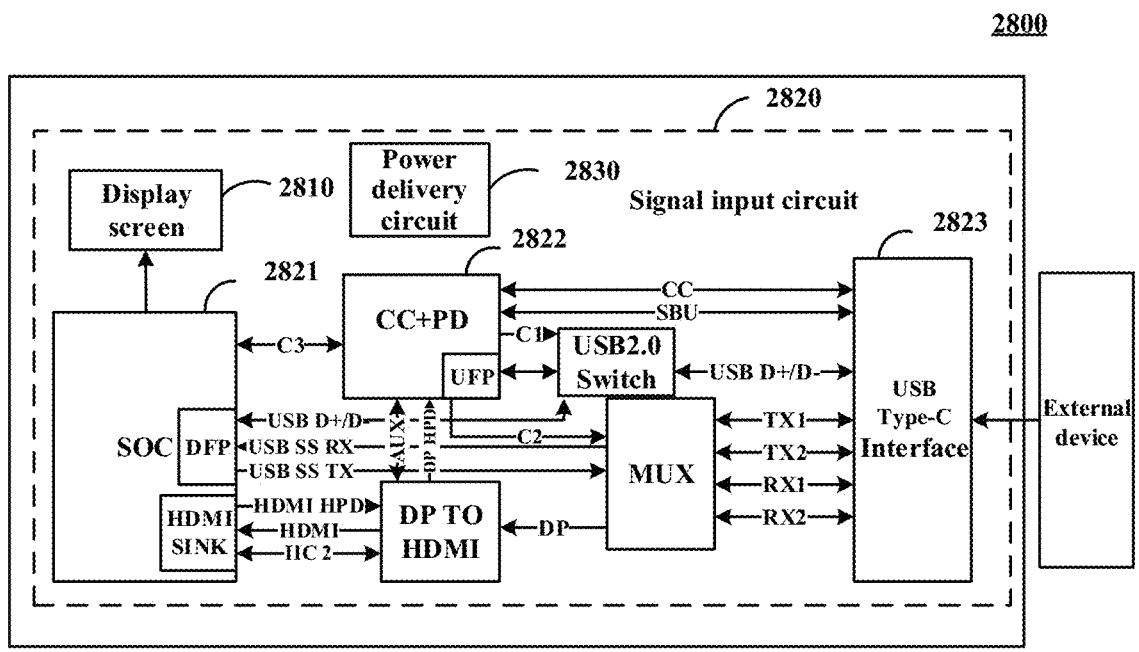
FIG. 28 is a schematic structural diagram of the television device according to some embodiments of the present disclosure.

The third embodiment of this application further provides a television device, as shown in FIG. 28, the television device 2800 includes a display screen 2810, a signal input circuit 2820 and a power delivery circuit 2830, where the display screen 2810 is configured to display an image, the power delivery circuit 2830 is configured to deliver power to a device, and the signal input circuit 2820 is configured to receive data from an external device; the signal input circuit 2820 further includes an SOC chip 2821, a control chip 2822 (CC+PD) and a USB-C interface 2823, where the USB-C interface 2823 is configured to be connected to the external device, the control chip 2822 is configured to control the external device to complete data interaction with the SOC chip 2821 via the USB-C interface 2823, so that a signal of the external device is transmitted to the SOC chip 2821, and furthermore, the SOC chip 2821 drives the display screen 2810 to display the image.

Specifically, when the external device is a USB device, the control chip 2822 controls a USB 2.0/USB 3.0 signal to be transmitted to the SOC chip 2821 via the USB-C interface 2823, and furthermore, the display screen 2810 is driven to display relevant information; when the external device is an ALT MODE device, the control chip 2822 controls an audio/video signal to be transmitted to the SOC chip 2821 via the USB-C interface 2823 so as to drive the display screen 2810 to display relevant images; and when the external device is the ALT MODE device and billboard information is required to be transmitted, the control chip 2822 controls a USB D+/D− terminal to be electrically connected to the SOC chip 2821, so that the billboard information is transmitted to the SOC chip 2821, and the relevant billboard information is displayed on the display screen to remind a user of abnormity.

Further, the signal input circuit 2820 may adopt any signal input circuit in the above-mentioned sixth embodiment, and accordingly, the specific process of data transmission between the external device and the SOC chip 2821 may refer to the corresponding data transmission process in the above-mentioned first embodiment, the descriptions thereof are omitted herein.

Fourth Embodiment

Figure 29:
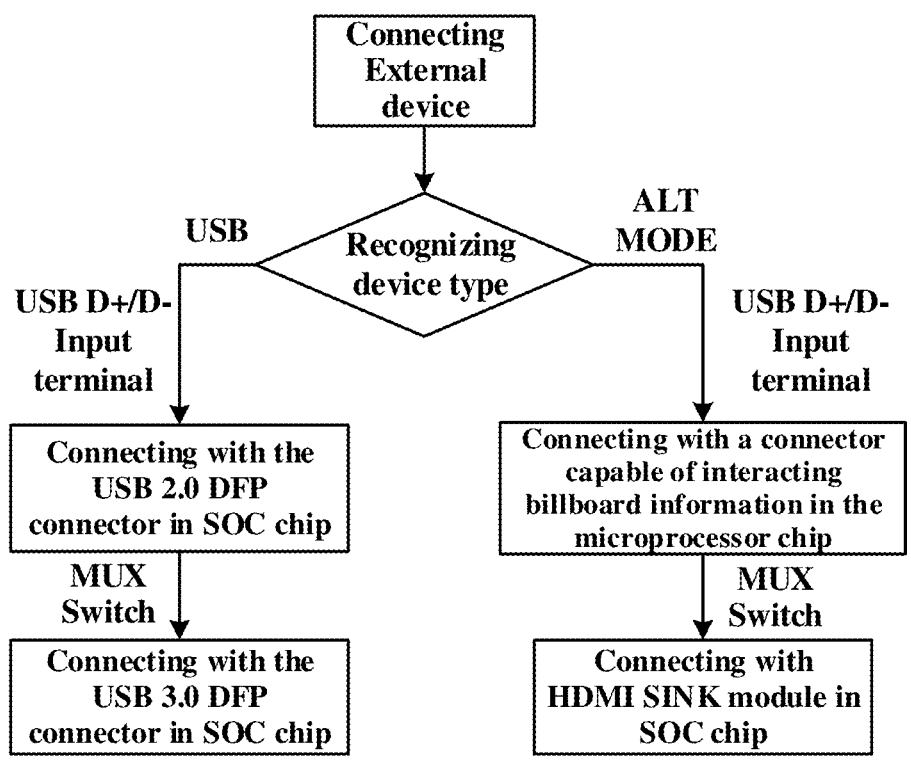
FIG. 29 is a schematic diagram of an application process of the USB-C interface according to some embodiments of the present disclosure.

The fourth embodiment of this application further provides a signal input method for inputting data of a USB and ALT MODE compatible external device and realizing interaction of billboard information, as shown in FIG. 29, the method includes the following steps.

Step S2810, a type of a signal connected to a USB TYPE-C interface is identified.

Specifically, the signal is interacted between a control chip and a CC pin of the USB-C interface via a CC to obtain ID information (such as VDM information and ID information) of an external device, a type of the connected external device is determined according to the information, and different device types correspond to different types of connected signals.

Exemplarily, a mapping relationship between a switching mode and type information (such as the VDM information and the ID information) of the connected device may also be prestored in the control chip, when external devices with different modes are connected, the type information of the device may be read and matched with the mapping relationship, so that the type of the connected device may be determined. Of course, it should be noted that there further are various ways for identifying the type of the signal connected to the USB-C interface, the descriptions thereof are omitted herein.

Step S2820, electrical connection between a D+/D− input terminal in the USB-C interface and a connecting terminal of an SOC chip and electrical connection between the D+/D− input terminal in the USB-C interface and a connecting terminal for interacting billboard information in the control chip are controlled, and one in the two electrical connection paths is only electrically conducted.

Further, when a type of a USB protocol signal connected to the USB TYPE-C interface has been identified, a connection between a USB D+/D− input terminal in the USB TYPE-C interface and the connecting terminal of the SOC chip is selected to be conducted; and when a type of an ALT MODE protocol signal connected to the USB TYPE-C interface is identified, a connection between the USB D+/D− input terminal in the USB TYPE-C interface and the connecting terminal for interacting the billboard information in the control chip is selected to be conducted.

It should be noted that the control chip controls the connection between the USB D+/D− input terminal and the connecting terminal of the SOC chip be conducted under a default condition in some embodiments of this application; and when the type of the ALT MODE protocol signal connected to the USB TYPE-C interface is identified, the connection between the USB D+/D− input terminal and the connecting terminal for interacting the billboard information in the control chip is selected to be conducted via a control signal.

Further, in some embodiments of this application, for the control of the control chip to the D+/D− terminal of the USB-C interface, the USB D+/D− terminal may be controlled in a way of adopting software so as to be electrically connected to the connecting terminal of the SOC chip or the control chip under different modes, and meanwhile, a selective switch device may also be additionally provided and is further controlled to select a connection between the USB D+/D− terminal and the connecting terminal of the SOC chip or the control chip to be conducted under different modes.

Further, when the type of the ALT MODE protocol signal connected to the USB TYPE-C interface is identified, the connection between the USB D+/D− terminal and the connecting terminal for interacting the billboard information in the control chip may not be selected to be conducted for the moment, but is selected to be conducted when a certain judgment condition is met.

Exemplarily, when the type of the ALT MODE protocol signal connected to the USB TYPE-C interface is identified, whether the ID information (such as the VDM information and the ID information) of the external device is matched with ID information prestored in the control chip is judged, if the ID information of the external device is not matched with the ID information prestored in the control chip, the connection between the USB D+/D− terminal and the connecting terminal for interacting the billboard information in the control chip is selected to be conducted.

Exemplarily, when the type of the ALT MODE protocol signal connected to the USB TYPE-C interface is identified, whether an electronic television device or a display device (such as a television device) is successfully switched to an ALT MODE within threshold time T may be judged, if the electronic television device or the display device is not successfully switched to the ALT MODE, the connection between the USB D+/D− terminal and the connecting terminal for interacting the billboard information in the control chip is selected to be conducted.

It should be noted that there are many other forms of judgment conditions for selecting the connecting terminal in the control chip, the descriptions thereof are omitted herein.

Step S2830, a multiplexing switch chip receives a control signal of the control chip and selects one of two of selectable output pins to work to electrically connect to a pin for inputting a USB SSTX/RX signal in the SOC chip and the other to be electrically connected to a pin for inputting an HDMI format in the SOC chip according to the control signal.

Specifically, the control chip detects a type of a device connected to the USB-C interface, when the external device is a USB device, the control chip controls a multiplexing switch chip (namely a switch MUX) via a control signal to select one high-speed differential pair in the USB-C interface to transmit a USB 3.0 signal, for example, a high-speed differential pair TX1/RX1 or a high-speed differential pair TX2/RX2 is selected to transmit the USB 3.0 signal to a USB 3.0 DFP interface of the SOC chip via the multiplexing switch chip; and when the external device is an ALT MODE device, at least one high-speed differential pair in the USB-C interface is selected to transmit an audio/video signal, for example, the high-speed differential pair TX1/RX1 and/or the high-speed differential pair TX2/RX2 is selected to transmit the audio/video signal to an audio/video module of the SOC chip.

According to the signal input method according to some embodiments of this application, the control chip detects the type of the connected signal, so that when the type of the USB protocol signal is connected, the connection between the USB D+/D− terminal and the connecting terminal of the SOC chip is selected to be conducted, when the type of the ALT MODE protocol signal is connected, the connection between the USB D+/D− terminal in the USB TYPE-C interface and the connecting terminal for interacting the billboard information in the control chip is selected to be conducted, and furthermore, the transmission of the USB 2.0/USB 3.0 signal and the interaction of the billboard information are realized.

Fifth Embodiment

The fifth embodiment of this application provides a signal input method for inputting data of a USB and ALT MODE compatible external device and realizing interaction of billboard information, including the following steps.

Step S710, detecting a type of a signal inputted to a USB TYPE-C interface.

Specifically, the signal is interacted between a CC module and a CC pin of the USB-C interface via a CC to obtain ID information (such as VDM information and ID information)

of the external device, and the type of the signal of the connected external device is determined according to the information.

Exemplarily, a mapping relationship between a switching mode and type information (such as the VDM information and the ID information) of the connected device may also be prestored in the CC module, when external devices with different modes are connected, the type information of the device may be read and matched with the mapping relationship, so that the type of the connected device may be determined. Of course, it should be noted that there further are various ways for identifying the type of the signal connected to the USB-C interface, the descriptions thereof are omitted herein.

Step S720, when a type of a USB protocol signal inputted to the USB TYPE-C interface is identified, a connection between a USB D+/D− terminal in the USB TYPE-C interface and a connecting terminal of an SOC chip is selected to be conducted, so that data may be transmitted between a USB external device and the SOC chip via the USB D+/D− terminal.

Specifically, the USB-C interface includes a USB D+/D− signal pin, the SOC chip includes a pin for inputting a USB D+/D− signal, and when the external device is a USB device (a television device for transmitting a signal based on a USB protocol, such as a USB disk and a hard disk), the CC module performs determination based on CC communication and controls the connection between USB D+/D− signal pin and the pin for inputting the USB D+/D− signal in the SOC chip be conducted, so that the data may be interacted between the external device and the SOC chip via the USB D+/D− terminal, for example, a USB 2.0 is transmitted.

Step S730, when a type of an ALT MODE protocol signal inputted to the USB TYPE-C interface is identified, a connection between the USB D+/D− terminal in the USB TYPE-C interface and a connecting terminal for interacting billboard information in a PD module is selected to be conducted, so that the billboard information may be interacted between an ALT MODE external device and the PD module via the USB D+/D− terminal.

Specifically, the PD module includes a pin for inputting a USB D+/D− signal, and when the external device is an ALT MODE device (a television device based on a non-USB protocol and mainly configured to transmit an audio/video signal, such as a computer, a notebook computer, a mobile phone and a PAD), the CC module performs judgment and determination based on CC communication and controls the connection between the USB D+/D− signal pin and the pin for inputting the USB D+/D− signal in the PD module be conducted, so that the billboard information may be interacted between the external device and the PD module via the USB D+/D− terminal.

According to the signal input method according to some embodiments of this application, the CC module detects the type of the connected signal, so that when the type of the USB protocol signal is connected, the connection between the USB D+/D− terminal and the connecting terminal of the SOC chip is selected to be conducted, when the type of the ALT MODE protocol signal is connected, the connection between the USB D+/D− terminal in the USB TYPE-C interface and the connecting terminal for interacting the billboard information in the PD module is selected to be conducted, and furthermore, the transmission of the USB 2.0/USB 3.0 signal and the interaction of the billboard information are realized.

With regard to the method in the above-mentioned embodiment, the specific way that each chip or module performs operation has been described in detail in some embodiments of the signal input circuit, and the descriptions thereof are omitted herein.

In the several embodiments provided by this application, it should be understood that the disclosed devices and methods may be realized in other ways. For example, the embodiments of the devices described as above are merely schematic, for example, the division of the units is only division of logical functions, and additional division ways may exist during actual implementation, for example, a plurality of units or modules may be combined or integrated into the other system, or some features may be neglected or not executed. In addition, the displayed or discussed mutual coupling or direct coupling or communication connection may be indirect coupling or communication connection via some interfaces, devices or units and may be electrical, mechanical or in other ways.

The units described as separating components may be or not be physically separated, components for unit display may be or not be physical units, that is, the components may be located on the same place or distributed on a plurality of network units. Parts or all of the units may be selected according to an actual demand so as to achieve the aim of the scheme of the present embodiments.

In addition, each functional unit in each embodiment of this application may be integrated in one processing unit, or each unit independently and physically exists, or two or more units are integrated in one unit. The above-mentioned integrated units not only may be realized in a way of adopting hardware, but also may be realized in a way of adopting hardware and software functional units.

Based on the above-mentioned embodiments, the present disclosure further provides the following two specific implementation ways.

Sixth Embodiment

Figure 30:
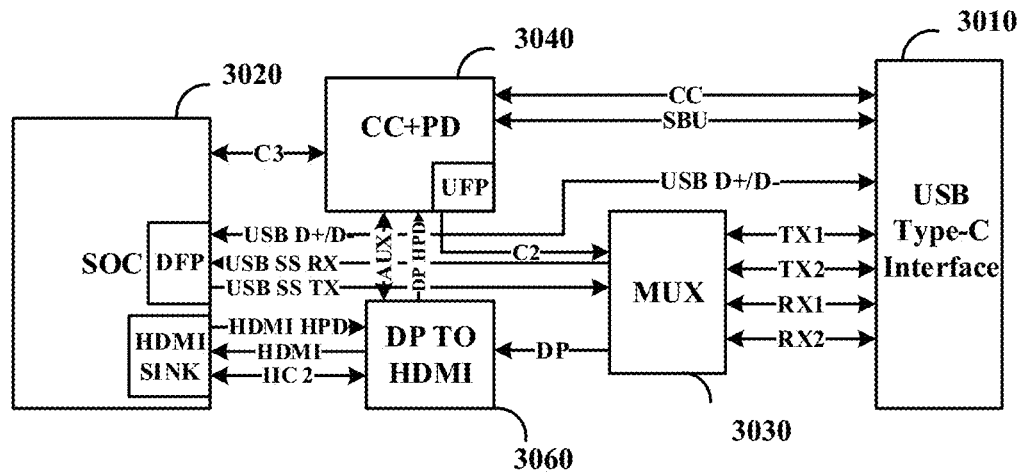
FIG. 30 is a schematic structural diagram of application of the USB Type-C interface of the television device according to the sixth embodiment of the present disclosure.

The sixth embodiment of this application provides a signal input circuit for receiving data from an external device via a USB Type-C interface, as shown in FIG. 30, the signal input circuit 3000 includes:

a USB Type-C interface 3010 provided with a USB D+/D− signal pin; and an SOC chip 3020 provided with a pin for inputting a USB D+/D− signal;

where the USB D+/D− signal pin in the USB Type-C interface 3010 is electrically connected to the pin for inputting the USB D+/D− signal in the SOC chip 3020 so that data is transmitted between a USB connected device and the SOC chip 3020 via a USB D+/D− channel.

The USB-C interface refers to an interface for transmitting data by adopting a USB Type-C protocol. The USB-C interface and a USB-C interface provided in a device (including a USB device: a television device for transmitting a USB protocol signal, such as a USB disk and a hard disk; an ALT MODE device: a television device for transmitting an audio/video signal, such as a notebook computer, a mobile phone and a PAD) can be plugged into each other so as to form USB or ALT MODE communication connection.

The SOC chip 3020 refers to a system on a chip, namely a chip for processing an audio/video signal, and is configured for transmitting and receiving data. The SOC chip 3020 is provided with a USB DFP interface for implementing a USB 3.0/2.0 signal transmission function; and meanwhile, the USB DFP interface is further configured for receiving an audio/video data signal such as an HDMI signal and a DP signal. For example, the SOC chip 3020 may include an IIC (Integrated Circuit Bus) host module for implementing IIC control and firmware updating, a USB3.0 DFP interface for implementing a USB3.0 DFP function, a USB2.0 DFP interface for implementing a USB2.0 DFP function and an HDMI SINK module for implementing an HDMI SINK (namely a receiving terminal of a minimized transmission differential signal TMDS in an HDMI protocol) function.

Further, the USB3.0 DFP interface and the USB2.0 DFP interface may be specifically combined into one DFP interface for simultaneously transmitting a USB 3.0 signal and a USB 2.0 signal; and in similar manner, the USB3.0 DFP interface and the USB2.0 DFP interface may also be specifically divided into two interfaces for respectively realizing the USB3.0 DFP function and the USB2.0 DFP function.

The USB-C interface 3010 in some embodiments of this application is provided with a USB D+/D− signal pin for inputting a USB 2.0 signal, and accordingly, the SOC chip 3020 is provided with a pin for inputting a USB D+/D− signal so as to receive the USB 2.0 signal transmitted from the external device. The corresponding pins of the USB-C interface 3010 and the SOC chip 3020 are electrically connected, so that the transmission function of the USB 2.0 signal of the external device is realized, and furthermore, application of the signal transmission function of the USB-C interface under a USB protocol is realized on a television device (a television set).

Further, the SOC chip 3020 further includes a pin for inputting a USB SSTX/RX signal and a pin for inputting an HDMI format.

A multiplexing switch chip 3030 is provided with two high-speed differential pair signal input pins connected to USB TX1/2 and RX1/2 of the USB TYPE-C interface.

Here a control pin of the multiplexing switch chip 3030 is electrically connected to the other control signal output pin in the control chip 3040, in any two selectable output pins, one is electrically connected to the pin for inputting the USB SSTX/RX signal in the SOC chip 3020; and the other is electrically connected to the pin for inputting the HDMI format in the SOC chip 3020.

The control chip refers to a CC (Configuration Channel) module and/or a PD (Power Delivery) module in the USB-C protocol. The control chip 3040 may be specifically set as the CC (namely the CC module), or the PD (namely the PD module) or a whole of the CC and the PD (namely a CC+PD module) according to an actual demand.

In the scheme, the control chip 3040 is the CC+PD module, it is to be understood that the control chip in the scheme may also be used as a CC or PD module with an MCU processing function, the descriptions thereof are omitted herein.

Further, the control chip 3040 supports CC (Channel Configuration) communication and a PD (POWER DELIVERY) protocol in a USB-C protocol specification, on the one hand, the control chip 3040 is configured to adapt to the forward and backward plug of an external device, determine the type of the external device and acquire PD information of an ALT MODE device via the CC; and on the other hand, the control chip 3040 is configured to communicate a CC signal and an SBU signal with the outside and has a billboard function, and a connecting terminal in the control chip 3040 is electrically connected to a USB D+/D− signal pin point in the USB-C interface 3010, so that the control chip 3040 feeds billboard information back to the external ALT MODE device when the ALT MODE device is externally connected.

Further, the SOC chip 3020 includes a pin for inputting a USB SSTX/RX signal and a pin for inputting an audio/video format, where the pin for inputting the USB SSTX/RX signal is used as a functional pin in a USB 3.0DFP interface of the SOC chip 3020 and configured for a USB 3.0 device to transmit a USB 3.0 signal; while the pin for inputting the audio/video format is used as a functional pin of an audio/video module in the SOC chip 3020 and configured for an ALT MODE device to transmit an audio/video signal.

Further, the multiplexing switch chip 3030 further includes two high-speed differential pair signal input pins which are respectively connected to signal pins USB TX1/2 and RX1/2 of the USB-C interface 3010 and may be configured to transmit a DP signal or a USB 3.0 signal input by the ALT MODE device.

Meanwhile, a control pin of the multiplexing switch chip 3030 is electrically connected to the other control signal C2 output pin in the control chip 3040, in any two selectable output pins, one is electrically connected to the pin for inputting the USB SSTX/RX signal in the SOC chip; and the other is electrically connected to the pin for inputting the audio/video format in the SOC chip.

Specifically, the control chip 3040 detects a type of a device connected to the USB-C interface 3010, when the external device is a USB device, the control chip 3040 controls via a control signal C2 the connection between the multiplexing switch chip 3030 and one high-speed differential pair in the USB-C interface 3010 be conducted to transmit the USB 3.0 signal, for example, a high-speed differential pair TX1/RX1 or a high-speed differential pair TX2/RX2 is selected to transmit the USB 3.0 signal to the USB 3.0 DFP interface of the SOC chip 3020 via the multiplexing switch chip 3030; and when the external device is an ALT MODE device, at least one high-speed differential pair in the USB-C interface 3010 is selected to transmit an audio/video signal, for example, the high-speed differential pair TX1/RX1 or the high-speed differential pair TX2/RX2 is selected to transmit the audio/video signal to an audio/video terminal module of the SOC chip 3030, where the gating way of the high-speed differential pairs in the USB-C interface provided in the USB-C protocol may be shown as FIG. 22A to FIG. 22C.

Specifically, the signal input circuit 3000 includes a DP-HDMI module 3060, where an HPD terminal of the DP-HDMI module 3060 is electrically connected to the control chip 3040 so as to determine a communication state between the external device connected to the USB-C interface 3010 and the DP-HDMI module 3060, and the input end of the DP-HDMI module 3060 is connected to the multiplexing switch chip 3030 so as to select the connection between the output pin of the DP-HDMI module 3060 and the pin for inputting the HDMI format in the SOC chip 3020 to be conducted according to the multiplexing switch chip 3030 when the external device is the ALT MODE device.

Further, the DP-HDMI module 3060 is further electrically connected to the SOC chip 3030 via a signal line IIC2 (Inter IC BUS) to acquire information such as EDID (Extended Display Identification Data) of the receiving terminal HDMI Sink via IIC2 and establish HDMI HPD connection via a signal line HDMI HPD. After the connection is established, converted HDMI data are transmitted to the receiving terminal HDMI SINK by the DP-HDMI module 3060 via a signal line HDMI so as to be displayed by the SOC chip 3020.

Further, the control chip 3040 also determines a power delivery state of the external device of the USB-C interface 3010 by exchanging the CC signal with the USB-C interface

3010. When the ALT MODE device externally connected to the USB-C interface 3010 requires power delivery, the control chip 3040 sets the television device as a PD source so as to deliver power to the DP device. In the present embodiment, the control chip 3040 sets the electronic television device to deliver power to the DP device, so that the service life of the external ALT MODE device may be prolonged.

The control chip 3040 is further connected to the SOC chip 3020 via a signal line C3 so as to perform data communication therebetween and may also be used as the other communication interface connected to the SOC chip 3020 so as to realize software updating and control in the control chip 3040. It should be noted that the signal line C3 may be selected to be retained or deleted according to a specific application scenario, and there are no limits in the present embodiment.

In the scheme according to some embodiments of this application, the type of the connected external device is detected; when the connected device transmits the USB 2.0 signal, USB 2.0 data are directly transmitted via the USB D+/D− channel; when the external device transmits the USB 3.0 signal, the USB 3.0 signal is transmitted via an SSTX/SSRX channel of a multiplexing switch; when the external device transmits the audio/video signal (such as the HDMI signal), data are interacted between the multiplexing switch and the HDMI SINK module of the SOC chip; and meanwhile, according to the scheme according to some embodiments of this application, the billboard information cannot be communicated with the external device when the external device is abnormal, and furthermore, data transmission between different external devices and the SOC chip is realized.

Seventh Embodiment

Figure 31:
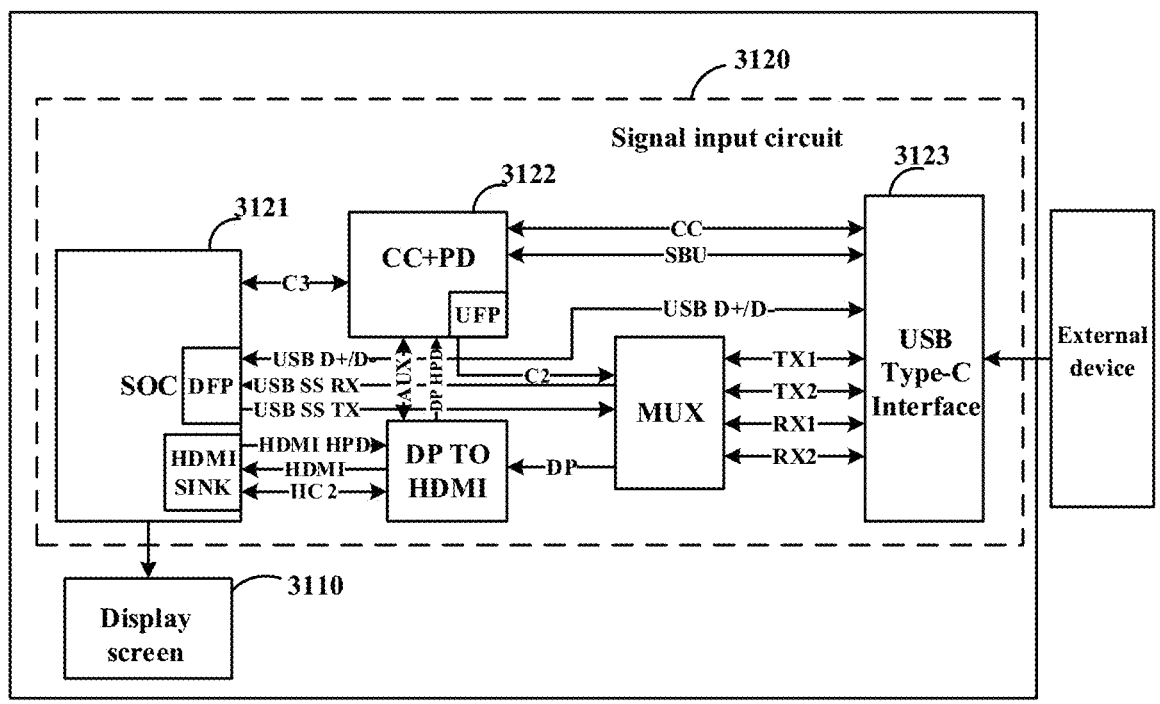
FIG. 31 is a schematic structural diagram of the electronic television device according to the seventh embodiment of the present disclosure.

The seventh embodiment of this application further provides an electronic television device for receiving data from an external device via a USB TYPE-C interface, as shown in FIG. 31, the electronic television device 3100 includes a display screen 3110 and a signal input circuit 3120, where the display screen 3110 is configured to display a image; the signal input circuit 3120 further includes an SOC chip 3121, a control chip 3122 (CC+PD) and a USB-C interface 3123, where the USB-C interface 3123 is configured to connect with the external device, and the control chip 3122 is configured to control the external device to complete data interaction with the SOC chip 3121 via the USB-C interface 3123, so that a signal of the external device is transmitted to the SOC chip 3121, and furthermore, the SOC chip 3121 drives the display screen 3110 to display images.

Specifically, when the external device is a USB protocol device, the control chip 3122 controls a USB 2.0/USB 3.0 signal to be transmitted to the SOC chip 3121 via the USB-C interface 3123, so that the display screen 3110 is driven to display relevant information; and when the external device is an ALT MODE device, the control chip 3122 controls an audio/video signal to be transmitted to the SOC chip 3121 via the USB-C interface 3123 so as to drive the display screen 3110 to display relevant images.

Further, the signal input circuit 3120 may adopt any signal input circuit in the above-mentioned eleventh embodiment, and accordingly, the specific process of data transmission between the external device and the SOC chip 3121 may refer to the corresponding data transmission process in the above-mentioned sixth embodiment, the descriptions thereof are omitted herein.

Eighth Embodiment

Figure 32:
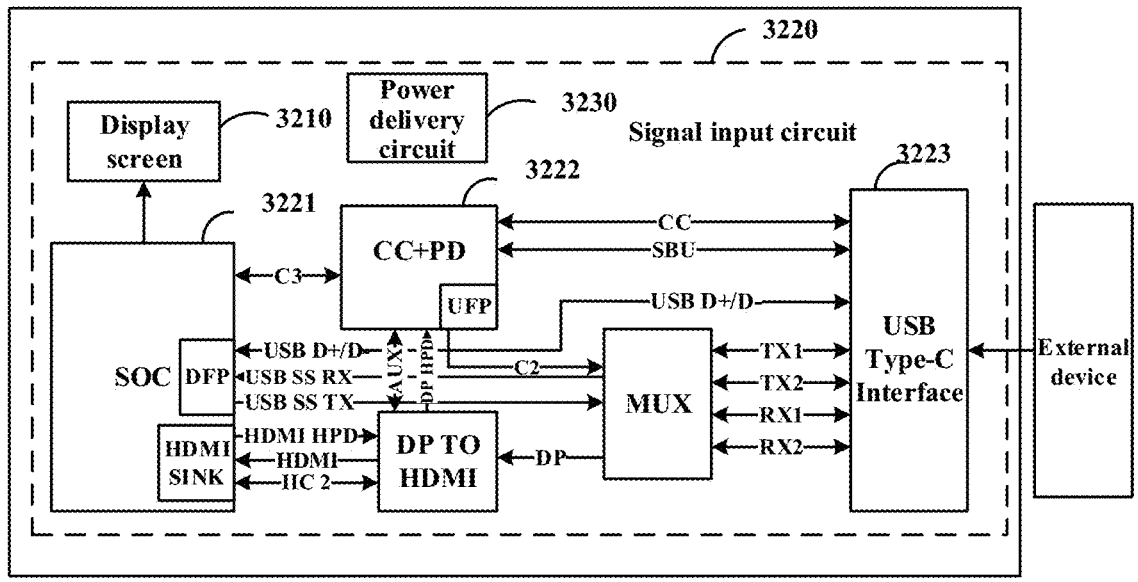
FIG. 32 is a schematic structural diagram of the television device according to the eighth embodiment of the present disclosure.

The eighth embodiment of this application further provides a television device, as shown in FIG. 32, the television device 3200 includes a display screen 3210, a signal input circuit 3220 and a power delivery circuit 3230, where the display screen 3210 is configured to display an image, the power delivery circuit 3230 is configured to deliver power to a device, and the signal input circuit 3220 is configured to receive data from an external device; the signal input circuit 3220 further includes an SOC chip 3221, a control chip 3222 (CC+PD) and a USB-C interface 3223, where the USB-C interface 3223 is configured to be connected to the external device, the control chip 3222 is configured to control the external device to complete data interaction with the SOC chip 3221 via the USB-C interface 3223, so that a signal of the external device is transmitted to the SOC chip 3221, and furthermore, the SOC chip 3221 drives the display screen 3210 to display the image.

Specifically, when the external device is a USB protocol device, the control chip 3222 controls a USB 2.0/USB 3.0 signal to be transmitted to the SOC chip 3221 via the USB-C interface 3223, and furthermore, the display screen 3210 is driven to display relevant information; and when the external device is an ALT MODE device, the control chip 3222 controls an audio/video signal to be transmitted to the SOC chip 3221 via the USB-C interface 3223 so as to drive the display screen 3210 to display relevant images.

Further, the signal input circuit 3220 may adopt any signal input circuit in the above-mentioned eleventh embodiment, and accordingly, the specific process of data transmission between the external device and the SOC chip 3221 may refer to the corresponding data transmission process in the above-mentioned sixth embodiment, the descriptions thereof are omitted herein.

Ninth Embodiment

Figure 33:
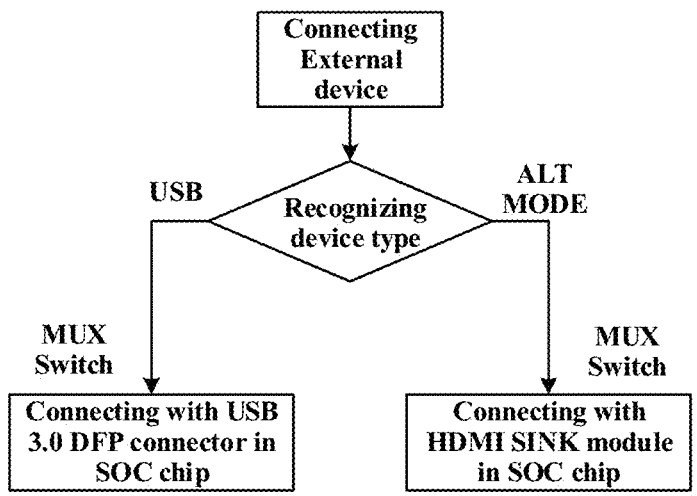
FIG. 33 is a schematic diagram of an application process of the USB-C according to the ninth embodiment of the present disclosure.

The ninth embodiment of this application further provides a signal input method for inputting data of a USB and ALT MODE compatible external device, as shown in FIG. 33, the method includes the following steps.

Step S3210, a type of a device connected to a USB TYPE-C interface is identified.

Specifically, the signal is communicated between a control chip and a CC pin of the USB-C interface via a CC to obtain ID information (such as VDM information and ID information) of an external device, and the type of the connected external device is determined according to the information.

Exemplarily, a correspondence relationship between a switching mode and type information (such as the VDM information and the ID information) of the connected device may also be prestored in the control chip, when external devices with different modes are connected, the type information of the device may be read and matched with the correspondence relationship, so that the type of the connected device may be determined. Of course, it should be noted that there further are various ways for identifying the type of the signal connected to the USB-C interface, the descriptions thereof are omitted herein.

Step S3220, a multiplexing switch chip receives a control signal of the control chip and selects the connection between one of any two selectable output pins and a pin for inputting a USB SSTX/RX signal in the SOC chip to be conducted and the connection between the other one of any two selectable output pins and a pin for inputting an HDMI format in the SOC chip to be conducted according to the control signal.

Specifically, the control chip detects a type of a device connected to the USB-C interface, when the external device is a USB device, the control chip controls a multiplexing switch chip (namely a switch MUX) via a control signal to select one high-speed differential pair in the USB-C interface to transmit a USB 3.0 signal, for example, a high-speed differential pair TX1/RX1 or a high-speed differential pair TX2/RX2 is selected to transmit the USB 3.0 signal to a USB 3.0 DFP interface of the SOC chip via the multiplexing switch chip; and when the external device is an ALT MODE device, at least one high-speed differential pair in the USB-C interface is selected to transmit an audio/video signal, for example, the high-speed differential pair TX1/RX1 or the high-speed differential pair TX2/RX2 is selected to transmit the audio/video signal to an audio/video module of the SOC chip.

In the signal input method according to the embodiment of this application, the type of the connected external device is detected; when the connected device transmits the USB 2.0 signal, USB 2.0 data is directly transmitted via the USB D+/D− channel; when the external device transmits the USB 3.0 signal, the USB 3.0 signal is transmitted via an SSTX/SSRX channel of the multiplexing switch; when the external device transmits the audio/video signal (such as the HDMI signal), data are interacted between the multiplexing switch and the HDMI SINK module of the SOC chip; and furthermore, data transmission between different external devices and the SOC chip is realized.

With regard to the method in the above-mentioned embodiment, the specific way that each chip or module performs operation has been described in detail in some embodiments of the signal input circuit, and the descriptions thereof are omitted herein.

In the several embodiments according to this application, it should be understood that the disclosed devices and methods may be realized in other ways. For example, the embodiments of the devices described as above are merely schematic, for example, the division of the units is only division of logical functions, and additional division ways may exist during actual implementation, for example, a plurality of units or modules may be combined or integrated into the other system, or some features may be neglected or not executed. In addition, the displayed or discussed mutual coupling or direct coupling or communication connection may be indirect coupling or communication connection via some interfaces, devices or units and may be electrical, mechanical or in other ways.

The units described as separating components may be or not be physically separated, components for unit display may be or not be physical units, namely the components may be located on the same place or distributed on a plurality of network units. Parts or all of the units may be selected according to an actual demand so as to achieve the aim of the scheme of the present embodiment.

In addition, each functional unit in each embodiment of this application may be integrated in one processing unit, or each unit independently and physically exists, or two or more units are integrated in one unit. The above-mentioned integrated units not only may be realized in a way of adopting hardware, but also may be realized in a way of adopting hardware and software functional units.

Although the preferred embodiments of the present disclosure have been described, those skilled in the art can make additional changes and modifications on these embodiments once they acquire the basic creative concept. Therefore, attached claims are intended to be explained to include the preferred embodiments and all the changes and modifications that fall within the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A terminal device, comprising:
an System On Chip (SOC) chip comprising a Downstream Facing Port (DFP) interface and an HDMI interface configured to receive or transmit an HDMI signal;
a USB Type-C interface master control module comprising an Upstream Facing Port (UFP) interface;
a USB Type-C interface configured to connect with an external device;
a switch module connected with the DFP interface via a Universal Serial Bus (USB) D+/D− differential pair, connected with the UFP interface via a USB D+/D− differential pair, and connected with the USB Type-C interface via a USB D+/D− differential pair, the USB D+/D− differential pair between the DFP interface and the switch module being a first channel, and the USB D+/D− differential pair between the UFP interface and the switch module being a second channel;
a multiplexing switch connected to the USB Type-C interface via a USB SSTX/RX differential pair and connected to the DFP interface via a USB SSTX/RX differential pair; and
a protocol conversion module between the multiplexing switch and the HDMI interface;
wherein the USB Type-C interface master control module is connected to the switch module via a control signal line and is configured to control the switch module to turn on the first channel and turn off the second channel, or turn on the second channel and turn off the first channel;
wherein the USB SSTX/RX differential pair between the multiplexing switch and the DFP interface is a third channel;
wherein the multiplexing switch is connected to the HDMI interface via an HDMI signal channel, and the HDMI signal channel between the multiplexing switch and the HDMI interface is a fourth channel;
wherein the USB Type-C interface master control module is connected to the multiplexing switch via a control signal line and is configured to control the multiplexing switch to turn on the third channel and turn off the fourth channel in response to the external device being a USB device, and control the multiplexing switch to turn on the fourth channel and turn off the third channel in response to the external device being an ALT MODE device; and wherein the protocol conversion module is configured to convert a DP signal into the HDMI signal in response to the DP signal being transmitted by the ALT MODE device, so as to transmit the HDMI signal to the HDMI interface of the SOC chip.

2. The terminal device according to claim 1, wherein the USB Type-C interface master control module is connected to the USB Type-C interface via a control signal line and is configured to communicate a configuration channel (CC) signal with the USB Type-C interface to identify a type of an external device of the USB Type-C interface and control the switch module to turn on the first channel and turn off the second channel according to the identified type, or turn on the second channel and turn off the first channel according to the recognized type.

3. The terminal device according to claim 2, wherein the USB Type-C interface master control module is configured to control the switch module to turn on the first channel and turn off the second channel in response to the external device being the USB device and to control the switch module to turn on the second channel and turn off the first channel in response to the external device being the ALT MODE device.

4. The terminal device according to claim 1, wherein:
the DFP interface comprises a USB2.0 interface and a USB3.0 interface; and
in response to the external device being the USB device, the DFP interface communicates a USB2.0 signal with the external device of the USB Type-C interface via the first channel, or the DFP interface communicates a USB3.0 signal with the external device of the USB Type-C interface via the third channel.

5. The terminal device according to claim 4, wherein:
in response to the external device being a USB DFP device, the USB Type-C interface is adapted to be in a USB UFP mode; and
in response to the external device supporting DP DFP mode, the USB Type-C interface is switched to be in a DP DFP mode to perform DP signal transmission.

6. The terminal device according to claim 4, wherein when the external device is a USB UFP device, the USB Type-C interface is adapted to be in a USB DFP mode.

7. The terminal device according to claim 1, wherein:
the UFP interface is a billboard signal output interface for outputting a billboard signal; and
in response to the external device being the ALT MODE device, the billboard signal output interface is configured to transmit the billboard signal to the ALT MODE device externally connected to the USB Type-C interface via the second channel.

8. The terminal device according to claim 7, wherein the switch module is configured to keep the first channel turned on as a default state.

9. The terminal device according to claim 8, wherein:
the billboard signal comprises transmission mode information supported by the terminal device; and
the USB Type-C interface master control module is configured to control the switch module to switch to the second channel in response to a computer being plugged into the USB Type-C interface and to control the switch module to switch to the first channel after the computer acquires the transmission mode information.

10. A terminal device, comprising:
an SOC chip comprising a plurality of USB D+/D− differential terminals for inputting or outputting a USB D+/D− signal;
a C interface master control module comprising a plurality of USB D+/D− differential terminals for inputting the USB D+/D− signal or outputting a billboard signal; and
a USB Type-C interface comprising a plurality of USB D+/D− differential terminals for inputting or outputting the USB D+/D− signal, and configured to connect with an external device;
a switch module connected with the USB D+/D− differential terminals of the SOC chip, connected with the USB D+/D− differential terminals of the C interface master control module, and connected with the USB D+/D− differential terminals of the USB Type-C interface, a USB D+/D− differential pair between the SOC chip and the switch module being a first channel, and a USB D+/D− differential pair between the C interface master control module and the switch module being a second channel; and
a multiplexing switch;
wherein the C interface master control module further comprises a first control signal output pin for outputting a first control signal or a second control signal and electrically connected to a control signal input pin of the switch module, wherein the first control signal is configured to turn on the first channel and turn off the second channel, and wherein the second control signal is configured to turn on the second channel and turn off the first channel;
wherein the SOC chip further comprises a plurality of USB SSTX/RX differential terminals for inputting or outputting a USB3.0 signal, and electrically connected to USB SSTX/RX differential terminals of the multiplexing switch to form a third channel;
wherein the USB Type-C interface further comprises a plurality of USB SSTX/RX differential terminals for inputting or outputting the USB3.0 signal, and electrically connected to the USB SSTX/RX differential terminals of the multiplexing switch;
wherein the SOC chip further comprises an HDMI differential terminal for receiving or transmitting an HDMI signal;
wherein the HDMI differential terminal is electrically connected to an HDMI differential terminal of the multiplexing switch to form a fourth channel which is configured to be selected to turn on and turn off;
wherein the C interface master control module further comprises a second control signal output pin configured to output a third control signal, and electrically connected to a control signal input pin of the multiplexing switch, and wherein the third control signal is configured to turn on the third channel and turn off the fourth channel; and
wherein the C interface master control module further comprises a third control signal output pin configured to output a fourth control signal, and electrically connected to another control signal input pin of the multiplexing switch, and wherein the fourth control signal is configured to turn on the fourth channel and turn off the third channel.

11. The terminal device according to claim 10, wherein the C interface master control module comprises a CC pin which is electrically connected to a CC pin in the USB Type-C interface and is configured for inputting or outputting a CC signal to identify a type of an external device of C interface.

12. The terminal device according to claim 11, wherein the C interface master control module is configured to input the first control signal to the control signal input pin of the switch module when it is determined that the external device of the USB Type-C interface is a USB device and to input the second control signal to the control signal input pin of the switch module when it is determined that the external device of the USB Type-C interface is an ALT MODE device.

* * * * *